US008804317B2

(12) United States Patent
Watanabe

(10) Patent No.: US 8,804,317 B2
(45) Date of Patent: Aug. 12, 2014

(54) DISPLAY DEVICE

(75) Inventor: Hisashi Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 432 days.

(21) Appl. No.: 13/381,668

(22) PCT Filed: Jun. 28, 2010

(86) PCT No.: PCT/JP2010/060965
§ 371 (c)(1),
(2), (4) Date: Dec. 30, 2011

(87) PCT Pub. No.: WO2011/001933
PCT Pub. Date: Jan. 6, 2011

(65) Prior Publication Data
US 2012/0113614 A1   May 10, 2012

(30) Foreign Application Priority Data

Jul. 1, 2009   (JP) ................................ 2009-157268

(51) Int. Cl.
*H05K 7/00* (2006.01)
*G06F 1/16* (2006.01)
*G09G 5/00* (2006.01)
*G09F 9/30* (2006.01)
*G02F 1/1333* (2006.01)
*G09F 9/35* (2006.01)

(52) U.S. Cl.
CPC ................ *G09F 9/35* (2013.01); *G06F 1/1681* (2013.01); *G09F 9/301* (2013.01); *G06F 1/1616* (2013.01); *G02F 1/13336* (2013.01); *G06F 1/1641* (2013.01)
USPC ............ 361/679.06; 361/679.27; 361/679.01; 361/755; 345/1.1; 345/173

(58) Field of Classification Search
CPC .................. G06F 1/162; G06F 1/1652; G06F 1/1613–1/1622; H04M 1/0268
USPC .................. 361/679.01, 679.03–679.07, 755; 345/173, 1.1, 3.2
See application file for complete search history.

(56) References Cited

U.S. PATENT DOCUMENTS

| 5,656,893 | A | 8/1997 | Shino et al. |
| 6,229,502 | B1 * | 5/2001 | Schwab ........................ 345/1.1 |

(Continued)

FOREIGN PATENT DOCUMENTS

| GB | 2 333 391 A | 7/1999 |
| JP | 08-063110 A | 3/1996 |

(Continued)

OTHER PUBLICATIONS

English translation of Official Communication issued in corresponding International Application PCT/JP2010/060965, mailed on Feb. 23, 2012.

(Continued)

*Primary Examiner* — Adrian S Wilson
*Assistant Examiner* — Abhishek Rathod
(74) *Attorney, Agent, or Firm* — Keating & Bennett, LLP

(57) ABSTRACT

A folding type display device (100A) according to the present invention includes first and second display units (100a, 100a') and a biaxial hinge device (30) for coupling the first and second display units such that the first and second display units are rotatable around first and second rotation axes (L1, L2). The first and second display units include first and second display panels (10, 10') and first and second light-transmissive covers (20, 20'). The first and second light-transmissive covers include first and second flat portions (24, 24') having flat viewer-side surfaces (24a, 24a') and first and second curved portions (22, 22') having viewer-side surfaces (22a, 22a') which are parts of cylindrical curved surfaces centered around first and second central axes (C1, C2). The first and second rotation axes of the biaxial hinge device match the first and second central axes. According to the present invention, a folding type display device capable of decreasing a joint in an image in an intermediate state between an open state and a closed state.

15 Claims, 25 Drawing Sheets

(56) References Cited

U.S. PATENT DOCUMENTS

| | | | |
|---|---|---|---|
| 6,483,482 B1 | 11/2002 | Kim | |
| 6,577,496 B1 * | 6/2003 | Gioscia et al. | 361/679.3 |
| 6,927,908 B2 * | 8/2005 | Stark | 359/449 |
| 7,433,179 B2 * | 10/2008 | Hisano et al. | 361/679.27 |
| 7,484,271 B2 | 2/2009 | Oshima et al. | |
| 7,515,406 B2 * | 4/2009 | Kee et al. | 361/679.21 |
| 7,920,320 B2 * | 4/2011 | Watson et al. | 359/296 |
| 2004/0051944 A1 | 3/2004 | Stark | |
| 2004/0217945 A1 | 11/2004 | Miyamoto et al. | |
| 2006/0077544 A1 * | 4/2006 | Stark | 359/448 |
| 2006/0146488 A1 * | 7/2006 | Kimmel | 361/681 |
| 2007/0097014 A1 * | 5/2007 | Solomon et al. | 345/1.1 |
| 2007/0262966 A1 | 11/2007 | Nishimura et al. | |
| 2008/0049389 A1 | 2/2008 | Kim | |
| 2008/0079656 A1 * | 4/2008 | Kee et al. | 345/1.3 |
| 2008/0307608 A1 | 12/2008 | Goto | |
| 2009/0075702 A1 | 3/2009 | Kubodera et al. | |
| 2010/0164973 A1 * | 7/2010 | Huitema et al. | 345/581 |
| 2011/0102302 A1 * | 5/2011 | Watanabe et al. | 345/4 |
| 2011/0109535 A1 * | 5/2011 | Watanabe et al. | 345/87 |

FOREIGN PATENT DOCUMENTS

| | | |
|---|---|---|
| JP | 11-231809 A | 8/1999 |
| JP | 2000-180964 A | 6/2000 |
| JP | 2000-305475 A | 11/2000 |
| JP | 2001-005414 A | 1/2001 |
| JP | 2002-098941 A | 4/2002 |
| JP | 2002-229485 A | 8/2002 |
| JP | 2003-050554 A | 2/2003 |
| JP | 2004-524551 A | 8/2004 |
| JP | 2005-083462 A | 3/2005 |
| JP | 2005-207465 A | 8/2005 |
| JP | 2007-251512 A | 9/2007 |
| JP | 2008-014449 A | 1/2008 |
| JP | 2008-501143 A | 1/2008 |
| JP | 2009-068716 A | 4/2009 |
| JP | 2009-089377 A | 4/2009 |
| WO | 03/019346 A1 | 3/2003 |
| WO | 2006/043660 A1 | 4/2006 |
| WO | 2009/157150 A1 | 12/2009 |

OTHER PUBLICATIONS

Official Communication issued in International Patent Application No. PCT/JP2010/060965, mailed on Jul. 27, 2010.

* cited by examiner

FIG.2
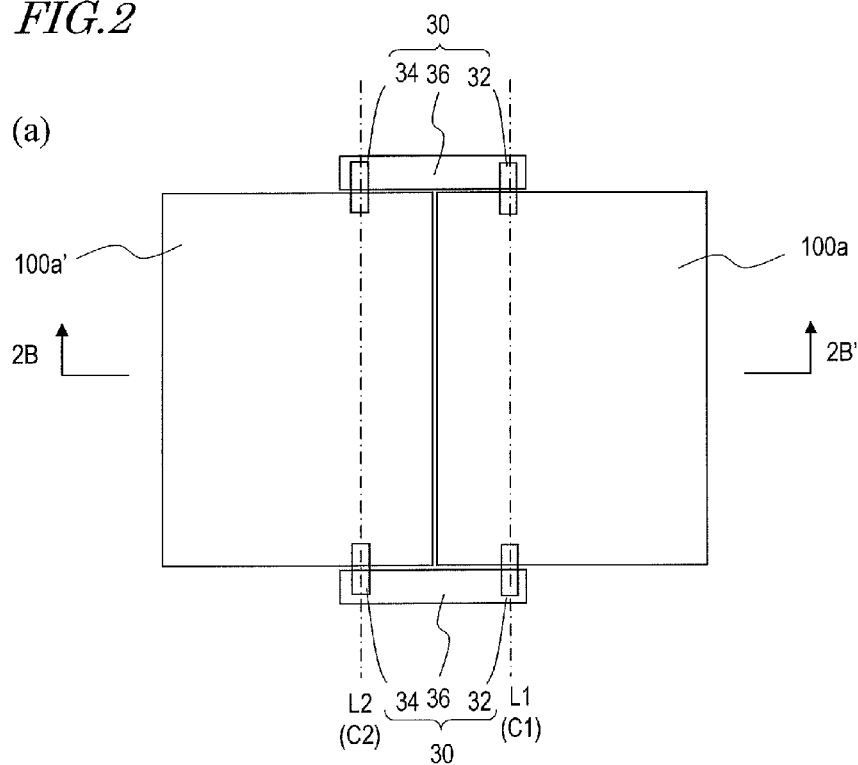
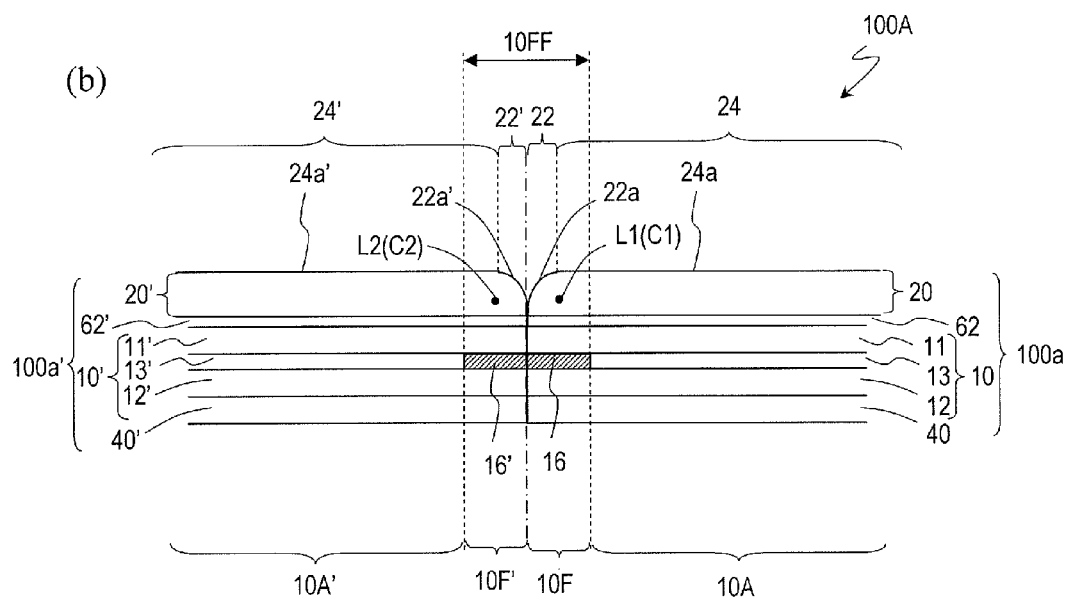

FIG.3
(a) 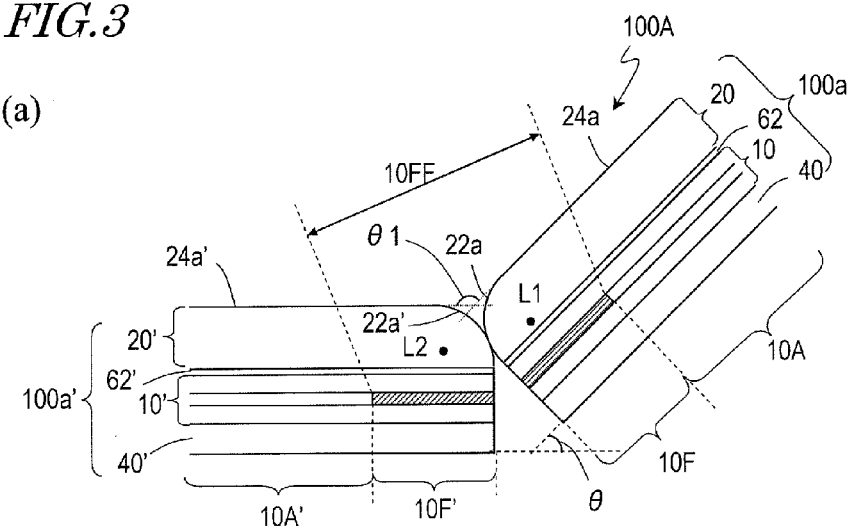
(b) 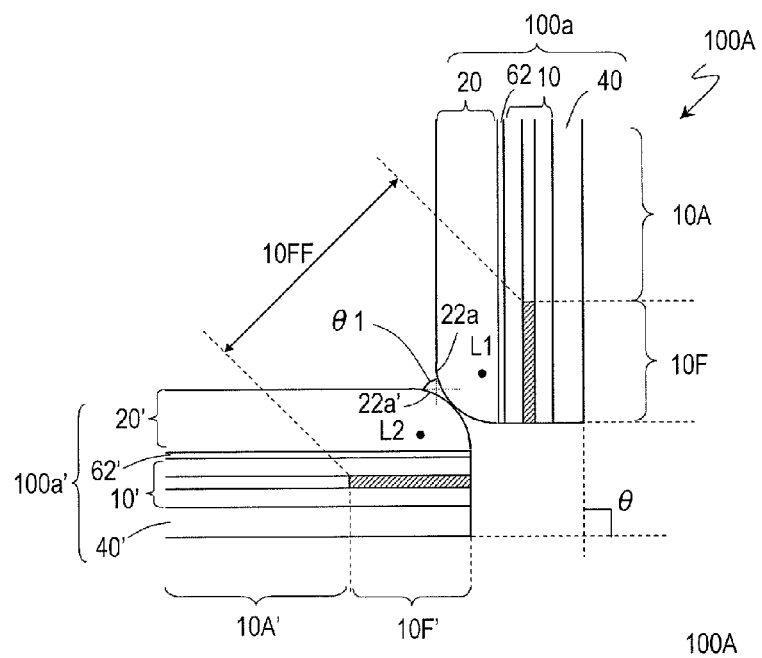
(c) 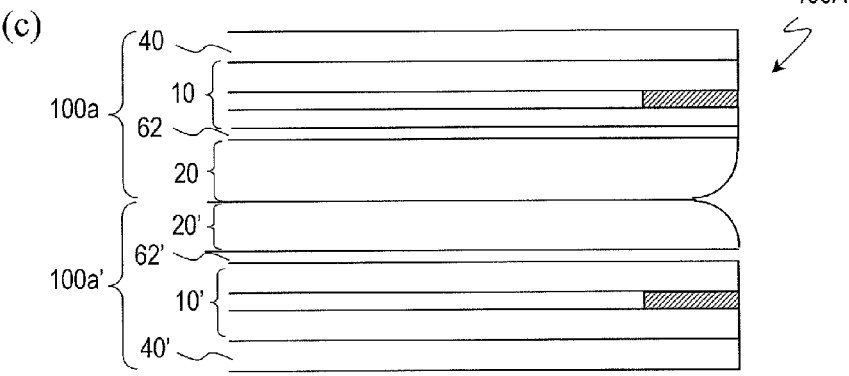

FIG.5
(a) 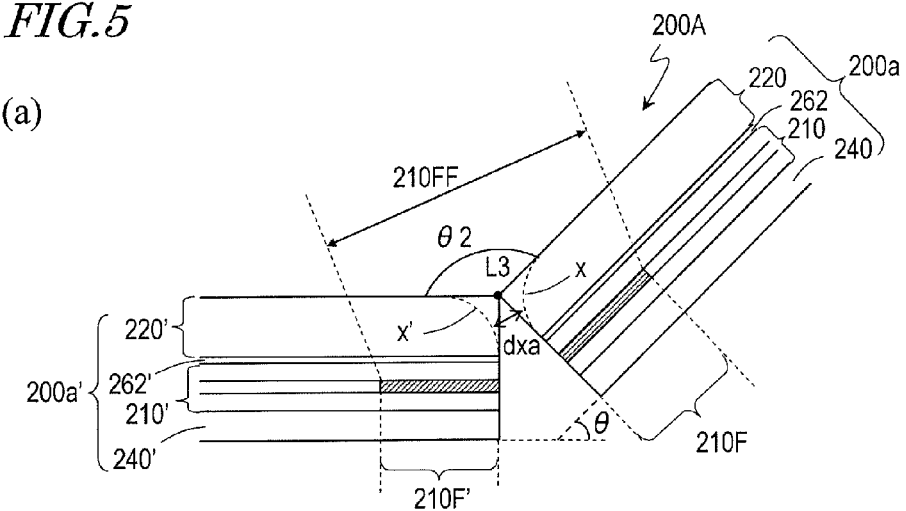
(b) 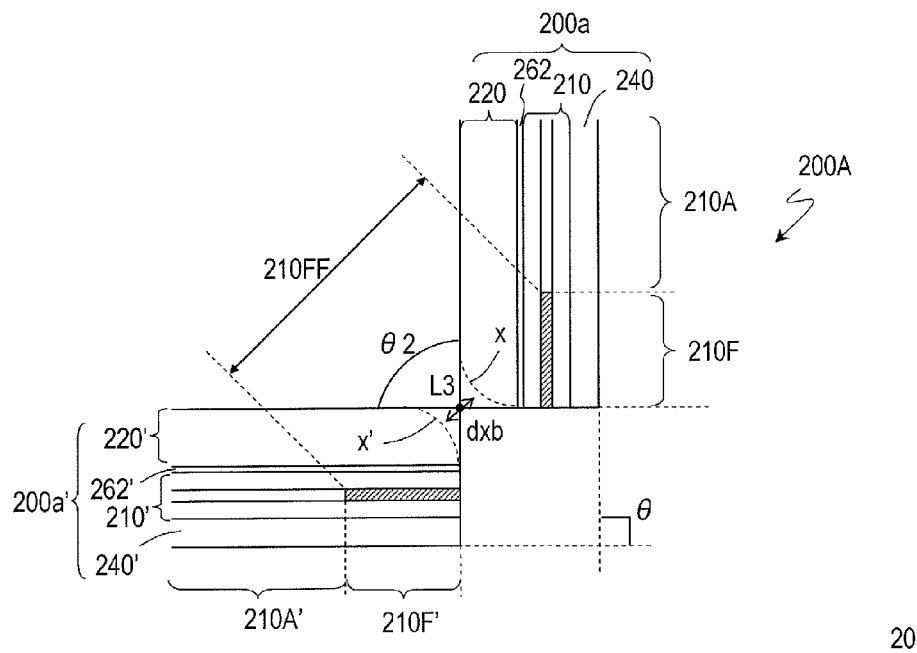
(c) 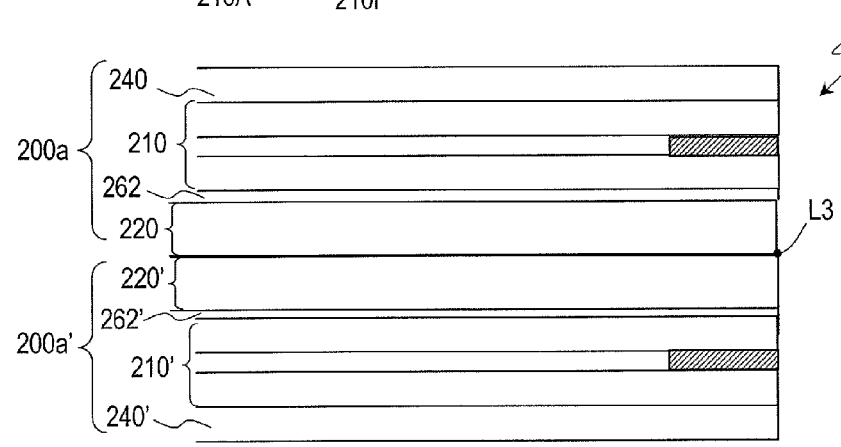

FIG.8
(a)
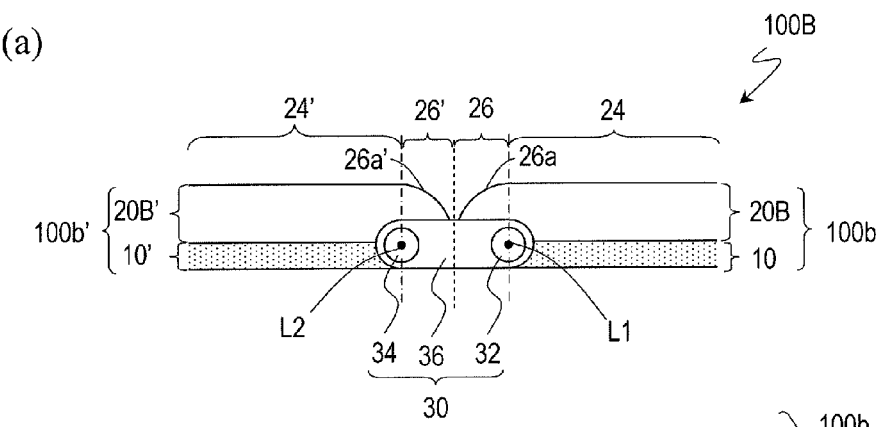
(b)
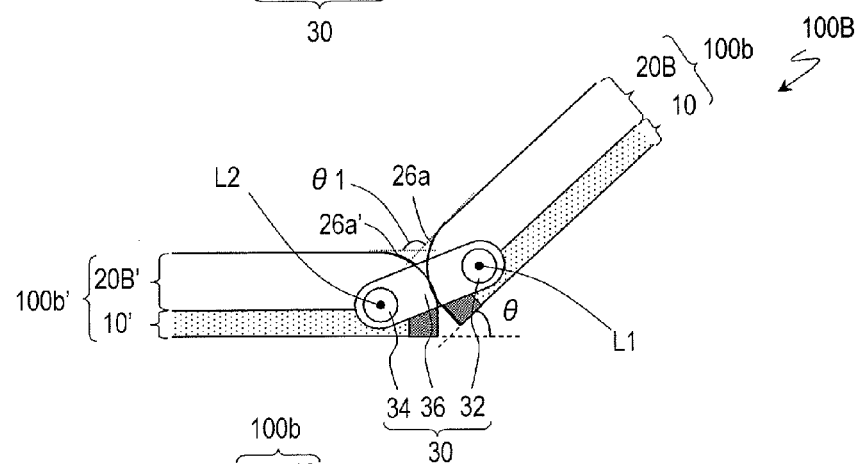
(c)
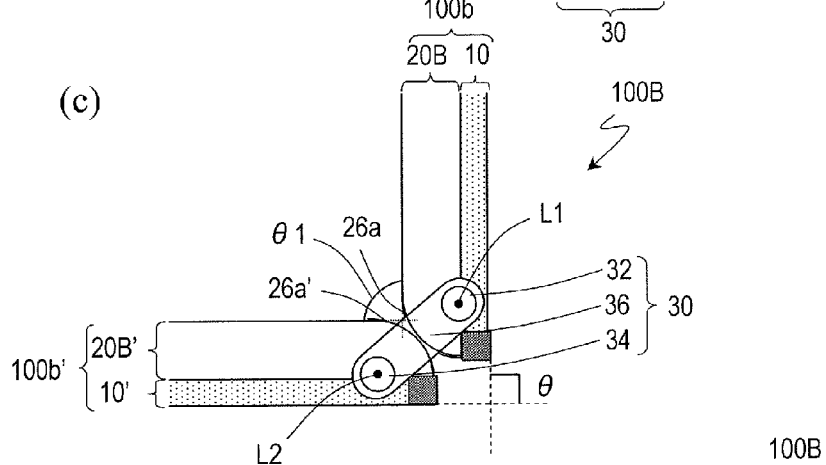
(d)
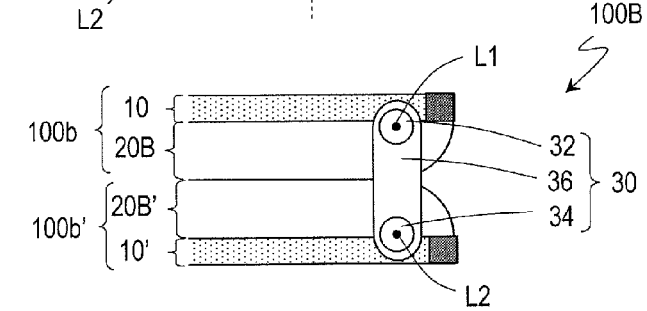

FIG.22
(a)
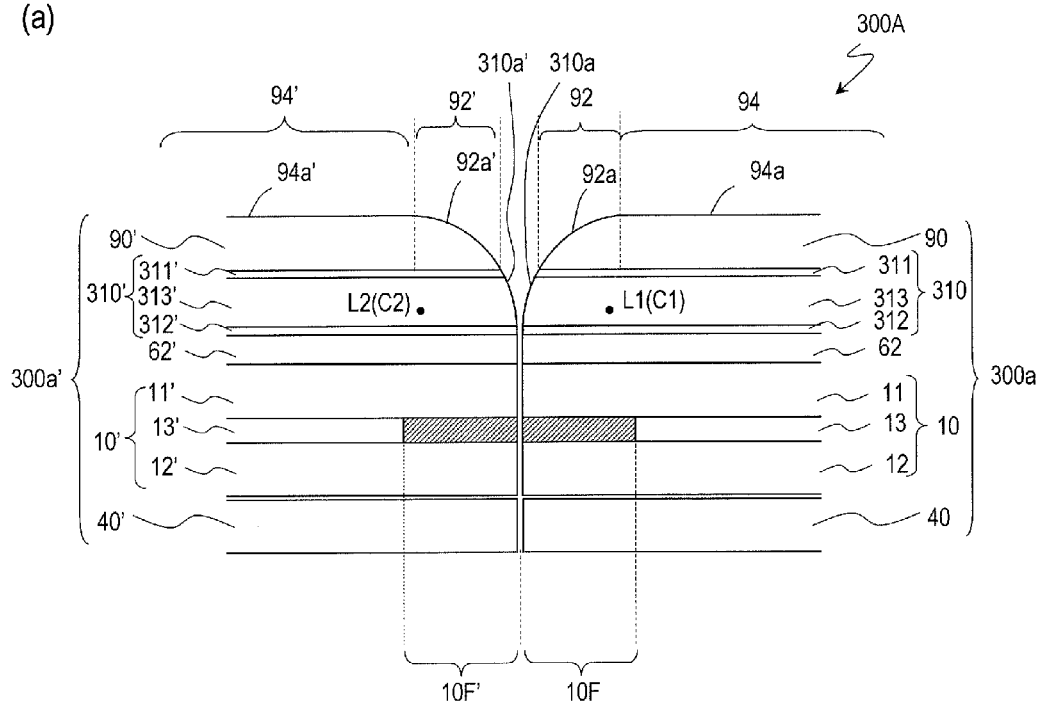
(b)
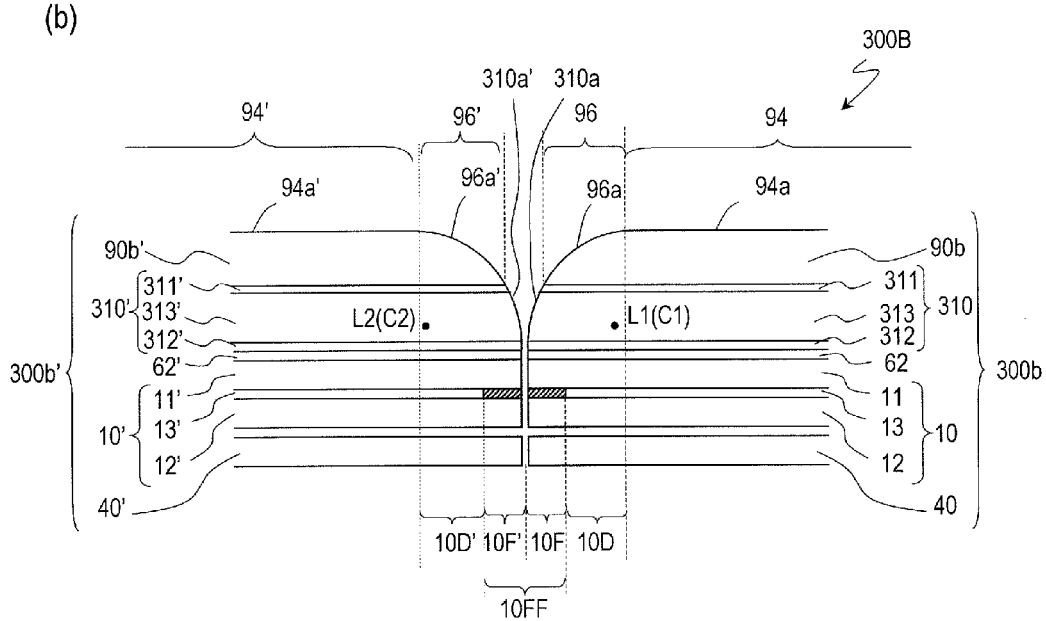

DISPLAY DEVICE

TECHNICAL FIELD

The present invention relates to a display device, and particularly to a direct-viewing type display device.

BACKGROUND ART

A liquid crystal display device includes a liquid crystal display panel, a backlight device, circuits for supplying various electrical signals to the liquid crystal display panel, and a power supply, as well as a housing for accommodating these components. The liquid crystal display panel has a display region in which a plurality of pixels are arrayed and a frame region surrounding the display region. In the display region, pixel electrodes and TFTs are provided. In the frame region, a sealing portion, a portion in which driving circuits are mounted, and the like are provided. The frame region, in which no pixels are arrayed, does not contribute to display. The frame region has been narrowed, but cannot be eliminated in principle.

When a large screen is constructed by arraying a plurality of display panels, joints appear in an image displayed on the large screen because frame regions of the display panels do not contribute to display. Patent Document 1 discloses a display device which has a light-transmissive cover provided on the viewer's side with respect to a display panel in order to display a jointless image. An edge portion of the light-transmissive cover has a curved portion on the viewer's side. The curved portion functions as a lens, and thus will be referred to as a "lens portion", hereinafter. The lens portion of the light-transmissive cover is provided so as to overlap a frame region of the display panel and a part of the display region, the part adjoining the frame region. Such a part of the display region that overlaps the lens portion will be referred to as a "peripheral display region". Light output from pixels arranged in the peripheral display region is refracted by the lens portion toward the frame region. As a result, an image is also displayed on a front surface of the frame region, so that a jointless image is displayed on the entire screen.

Patent Document 1 also describes a display device including a plurality of display panels which are foldable (hereinafter, referred to as a "folding type display device"). Patent Document 1 describes that by making the plurality of display panels foldable, display planes of the display panels can be protected in a closed state.

CITATION LIST

Patent Literature

Patent Document 1: Japanese PCT National Phase Laid-Open Publication No. 2004-524551

SUMMARY OF INVENTION

Technical Problem

However, the folding type display device described in Patent Document 1 is assumed to be used only in an open state, and is not assumed to be used in an intermediate state between an open state and a closed state. Patent Document 1 does not describe how an image is displayed in the intermediate state. Patent Document 1 merely describes that a plurality of display panels are coupled by a hinge, but does not refer to a specific structure of a hinge or a position where the hinge is to be located.

The present invention has an object of providing a folding type display device capable of making a joint in an image small in an intermediate state between the open state and the closed state. Specifically, the present invention has an object of providing a folding type display device capable of displaying an image with no joint in an intermediate state between the open state and the closed state.

Solution to Problem

A direct-viewing type display device of a folding type according to the present invention includes a first display unit including a first display panel and a first light-transmissive cover located on a viewer's side with respect to the first display panel; a second display unit including a second display panel and a second light-transmissive cover located on the viewer's side with respect to the second display panel; and a biaxial hinge device for coupling the first display unit and the second display unit such that the first display unit is rotatable around a first rotation axis and such that the second display unit is rotatable around a second rotation axis parallel to the first rotation axis. The first light-transmissive cover includes a first flat portion and a first curved portion provided outer to the first flat portion; the second light-transmissive cover includes a second flat portion and a second curved portion provided outer to the second flat portion; a viewer-side surface of the first flat portion is flat, and a viewer-side surface of the first curved portion is a part of a cylindrical curved surface centered around a first central axis; a viewer-side surface of the second flat portion is flat, and a viewer-side surface of the second curved portion is a part of a cylindrical curved surface centered around a second central axis; the first rotation axis of the biaxial hinge device matches the first central axis of the first light-transmissive cover; and the second rotation axis of the biaxial hinge device matches the second central axis of the second light-transmissive cover.

In an embodiment, when the first display unit and the second display unit are opened or closed, the viewer-side surface of the first curved portion and the viewer-side surface of the second curved portion contact each other, and the first display unit and the second display unit rotate in opposite directions to each other so as to fulfill the relationship that an angle at which the first display unit rotates around the first rotation axis and an angle at which the second display unit rotates around the second rotation axis are equal to each other.

In an embodiment, when the first display unit and the second display unit are opened or closed, the biaxial hinge device couples the first display unit and the second display unit to each other so as to fulfill the relationship that the viewer-side surface of the first curved portion and the viewer-side surface of the second curved portion are in contact with each other and that an angle made by a plane including the first and second rotation axes and the viewer-side surface of the first flat portion is equal to an angle made by the plane and the viewer-side surface of the second flat portion.

In an embodiment, the first display unit and the second display unit are opened or closed uniformly in the state where the viewer-side surface of the first curved portion and the viewer-side surface of the second curved portion are in contact with each other.

In an embodiment, the first display panel includes a first display region and a first frame region provided outer to the first display region; the second display panel includes a second display region and a second frame region provided outer to the second display region; the first curved portion causes a part of light output from a first peripheral region, in the first display region, which adjoins the first frame region, to be refracted toward the first frame region; and the second curved portion causes a part of light output from a second peripheral region, in the second display region, which adjoins the second frame region, to be refracted toward the second frame region.

In an embodiment, the first display unit further includes a first light-transmissive housing located on a side surface, of the first display panel, which extends parallel to the first central axis; the second display unit further includes a second light-transmissive housing located on a side surface, of the second display panel, which extends parallel to the second central axis; the first light-transmissive housing is located such that an end side of the first curved portion of the first light-transmissive cover is existent on the viewer's side with respect to an end surface of the first light-transmissive housing; the second light-transmissive housing is located such that an end side of the second curved portion of the second light-transmissive cover is existent on the viewer's side with respect to an end surface of the second light-transmissive housing; the first light-transmissive housing and the first light-transmissive cover are integrally formed; the second light-transmissive housing and the second light-transmissive cover are integrally formed; toward the viewer's side with respect to the first light-transmissive housing, a part of the light output from the first peripheral display region of the first display panel is output; and toward the viewer's side with respect to the second light-transmissive housing, a part of the light output from the second peripheral display region of the second display panel is output.

In an embodiment, the end surface of the first light-transmissive housing is formed such that a distance between the end surface of the first light-transmissive housing and the side surface of the first display panel is increased toward a rear side from the viewer's side; and the end surface of the second light-transmissive housing is formed such that a distance between the end surface of the second light-transmissive housing and the side surface of the second display panel is increased toward the rear side from the viewer's side.

In an embodiment, the first display unit further includes a first flat housing portion having a flat viewer-side surface and a first curved housing portion having a viewer-side surface which is a part of a cylindrical curved surface centered around the first central axis; the second display unit further includes a second flat housing portion having a flat viewer-side surface and a second curved housing portion having a viewer-side surface which is a part of a cylindrical curved surface centered around the second central axis; the first flat housing portion is located so as to adjoin the first flat portion of the first light-transmissive cover; the second flat housing portion is located so as to adjoin the second flat portion of the second light-transmissive cover; the first curved housing portion is located so as to adjoin the first curved portion of the first light-transmissive cover; the second curved housing portion is located so as to adjoin the second curved portion of the second light-transmissive cover; a distance between the viewer-side surface of the first curved housing portion and the first central axis is longer than a distance between the viewer-side surface of the first curved portion and the first central axis; and a distance between the viewer-side surface of the second curved housing portion and the second central axis is longer than a distance between the viewer-side surface of the second curved portion and the second central axis.

In an embodiment, the viewer-side surface of the first curved portion is a part of a cylindrical curved surface having a first radius; the viewer-side surface of the second curved portion is a part of a cylindrical curved surface having a second radius; the viewer-side surface of the first curved housing portion is a part of a cylindrical curved surface centered around the first central axis and having a radius longer than the first radius; and the viewer-side surface of the second curved housing portion is a part of a cylindrical curved surface centered around the second central axis and having a radius longer than the second radius.

In an embodiment, the viewer-side surface of the first curved portion is a part of a cylindrical curved surface having a first radius; the viewer-side surface of the second curved portion is a part of a cylindrical curved surface having a second radius; the viewer-side surface of the first curved housing portion is a part of a cylindrical curved surface centered around the first central axis and having a third radius; the viewer-side surface of the second curved housing portion is a part of a cylindrical curved surface centered around the second central axis and having a fourth radius; the third radius is longer than the first radius; and the fourth radius is longer than the second radius.

In an embodiment, the viewer-side surface of the first curved housing portion has a first convexed-concaved structure; and the viewer-side surface of the second curved housing portion has a second convexed-concaved structure engageable with the first convexed-concaved structure.

Another direct-viewing type display device of a folding type according to the present invention includes a first display unit including a first display panel, a first light-transmissive cover located on a viewer's side with respect to the first display panel, and a first housing; a second display unit including a second display panel, a second light-transmissive cover located on the viewer's side with respect to the second display panel, and a second housing; and a biaxial hinge device for coupling the first display unit and the second display unit such that the first display unit is rotatable around a first rotation axis and such that the second display unit is rotatable around a second rotation axis parallel to the first rotation axis. The first housing includes a first flat housing portion having a flat viewer-side surface and a first curved housing portion having a viewer-side surface which is a part of a cylindrical curved surface centered around a first central axis; the second housing includes a second flat housing portion having a flat viewer-side surface and a second curved housing portion having a viewer-side surface which is a part of a cylindrical curved surface centered around a second central axis; the first light-transmissive cover includes a first flat portion having a flat viewer-side surface and a first curved portion having a viewer-side surface, of which a cross-section perpendicular to the first central axis is a curved line defined by an aspherical function; the second light-transmissive cover includes a second flat portion having a flat viewer-side surface and a second curved portion having a viewer-side surface, of which a cross-section perpendicular to the second central axis is a curved line defined by an aspherical function; the first rotation axis of the biaxial hinge device matches the first central axis of the first housing; the second rotation axis of the biaxial hinge device matches the second central axis of the second housing; the first light-transmissive cover is located such that the first curved portion adjoins the first curved housing portion and such that the first flat portion adjoins the first flat housing portion; and the second light-transmissive cover is located such that the second curved portion adjoins the second curved housing portion and such that the second flat portion adjoins the second flat housing portion.

In an embodiment, the first display unit further includes a first touch panel; and the second display unit further includes a second touch panel.

In an embodiment, the first light-transmissive cover has a first concaved portion on the side of the first display panel; the second light-transmissive cover has a second concaved portion on the side of the second display panel; the first touch panel is located between the first concaved portion and a viewer-side surface of the first display panel; and the second touch panel is located between the second concaved portion and a viewer-side surface of the second display panel.

In an embodiment, the first touch panel has an end surface which is a part of a cylindrical curved surface centered around the first central axis; and the second touch panel has an end surface which is a part of a cylindrical curved surface centered around the second central axis.

In an embodiment, the viewer-side surface of the first curved portion and the end surface of the first touch panel form a continuous cylindrical curved surface; and the viewer-side surface of the second curved portion and the end surface of the second touch panel form a continuous cylindrical curved surface.

In an embodiment, the first curved portion has a first side surface formed between the viewer-side surface and a rear-side surface; the second curved portion has a second side surface formed between the viewer-side surface and a rear-side surface; the rear-side surface of the first curved portion is parallel to the viewer-side surface of the first flat portion; the rear-side surface of the second curved portion is parallel to the viewer-side surface of the second flat portion; the first side surface is perpendicular to the rear-side surface of the first curved portion; and the second side surface is perpendicular to the rear-side surface of the second curved portion.

In an embodiment, the first side surface is a part of a cylindrical curved surface centered around the first central axis; and the second side surface is a part of a cylindrical curved surface centered around the second central axis.

In an embodiment, the first touch panel has an end surface which is a part of a cylindrical curved surface centered around the first central axis; the second touch panel has an end surface which is a part of a cylindrical curved surface centered around the second central axis; the first touch panel is located such that at least a part of the end surface thereof is existent on the first display panel side with respect to the first curved portion of the first light-transmissive cover; and the second first touch panel is located such that at least a part of the end surface thereof is existent on the second display panel side with respect to the second curved portion of the second light-transmissive cover.

In an embodiment, the first touch panel is bonded to the first light-transmissive cover with a first adhesive layer; the second touch panel is bonded to the second light-transmissive cover with a second adhesive layer; a refractive index of the first adhesive layer is equal to a refractive index of the first light-transmissive cover; and a refractive index of the second adhesive layer is equal to a refractive index of the second light-transmissive cover.

In an embodiment, the first touch panel includes a first transparent electrode; the second touch panel includes a second transparent electrode; the first transparent electrode is formed on a surface of the first light-transmissive cover, the surface being on the side of the first display panel; and the second transparent electrode is formed on a surface of the second light-transmissive cover, the surface being on the side of the second display panel.

Advantageous Effects of Invention

The present invention provides a folding type display device capable of making a joint in an image small in the middle state between the open state and the closed state.

BRIEF DESCRIPTION OF DRAWINGS

FIGS. 2(a) and (b) each show the liquid crystal display device 100A in the embodiment according to the present invention; FIG. 2(a) is a schematic plan view, and FIG. 2(b) is a schematic cross-sectional view taken along line 2B-2B' in FIG. 2(a).

FIGS. 3(a), (b) and (c) are schematic cross-sectional views of the liquid crystal display device 100A when the opening angle is 135°, 90° and 0°, respectively.

FIGS. 5(a), (b) and (c) are schematic cross-sectional views of the liquid crystal display device 200A when the opening angle is 135°, 90° and 0°, respectively.

FIGS. 8(a), (b), (c) and (d) are schematic cross-sectional views of the liquid crystal display device 100B when the opening angle is 180°, 135°, 90° and 0°, respectively.

FIG. 16(a) is a schematic plan view.

FIG. 18(a) is a schematic cross-sectional view.

FIG. 19(a) is a schematic cross-sectional view.

FIG. 22(a) is a schematic cross-sectional view of a liquid crystal display device 300A including a touch panel, and FIG.

22(b) is a schematic cross-sectional view of a liquid crystal display device 300B including a touch panel.

Figure 23:
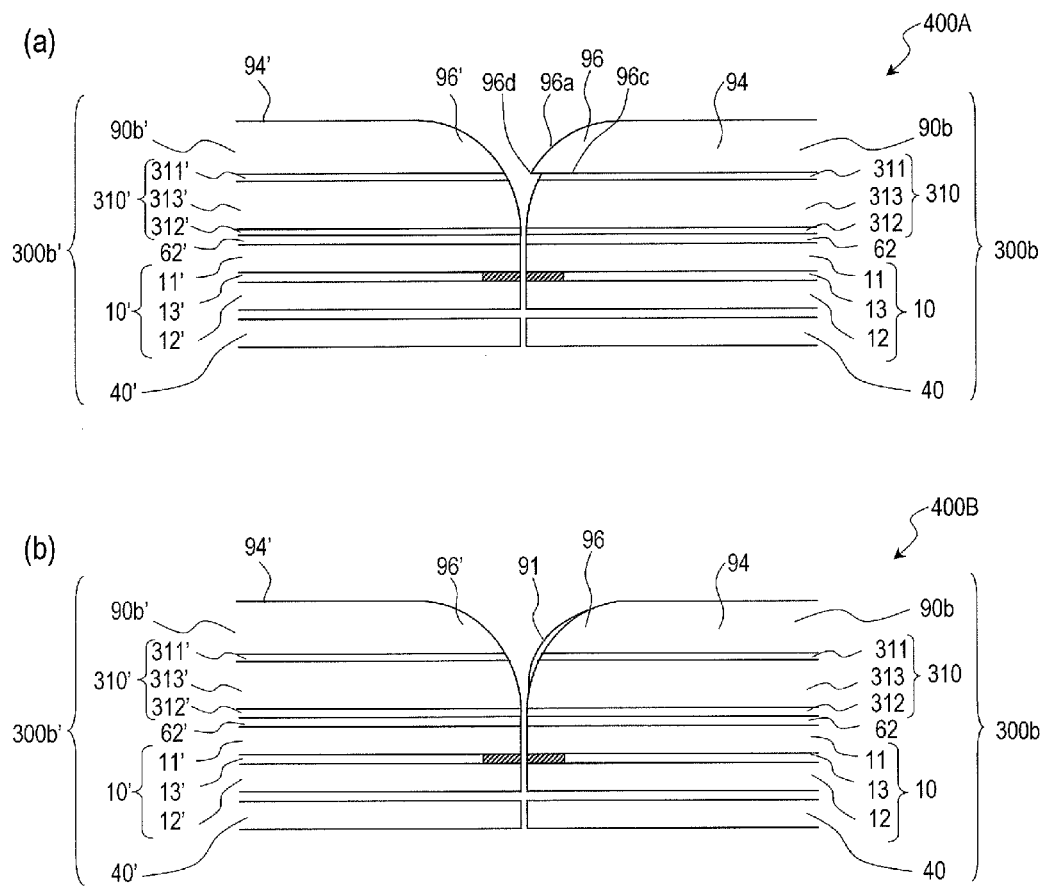

FIG. 23(a) is a schematic cross-sectional view of a liquid crystal display device 400A, and FIG. 23(b) is a schematic cross-sectional view of a liquid crystal display device 400B.

Figure 24:
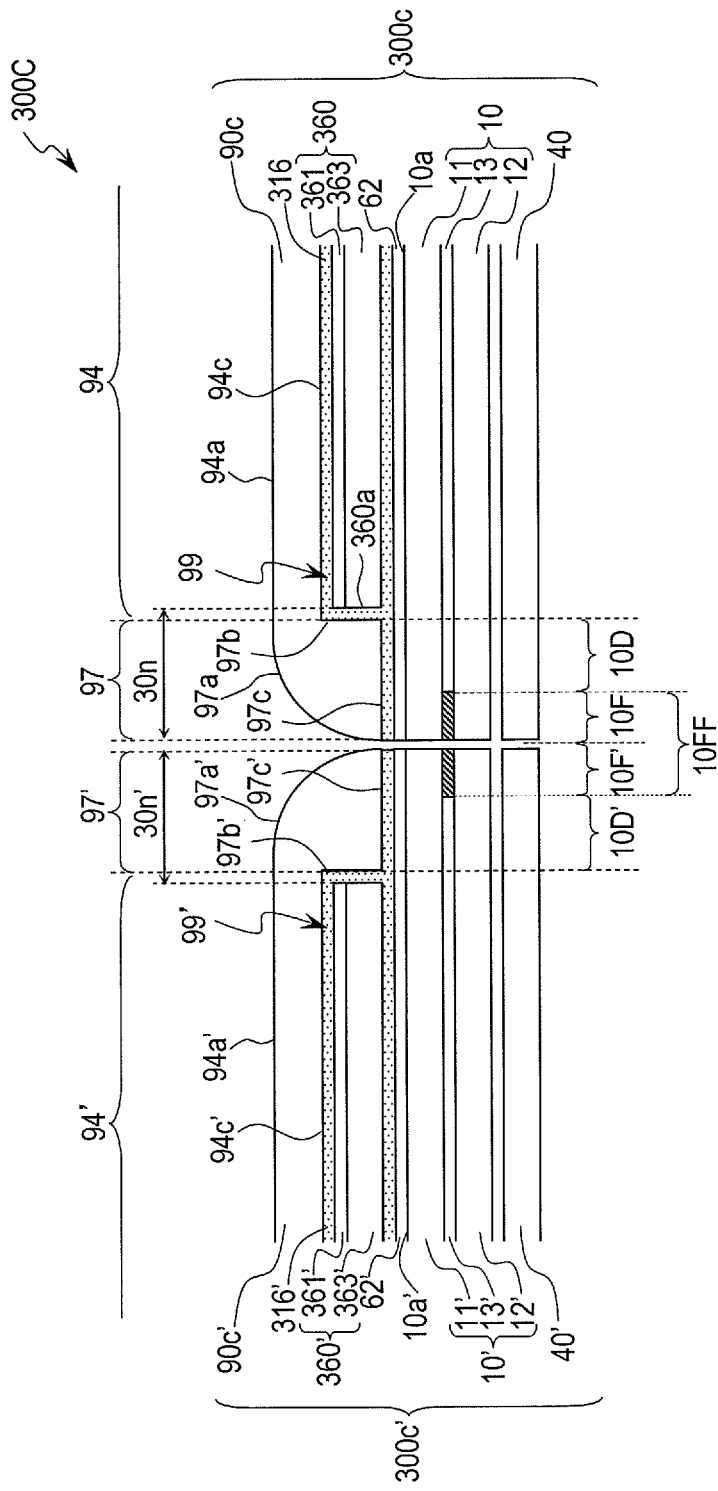

FIG. 24 is a schematic cross-sectional view of a liquid crystal display device 300C.

FIG. 25(a) is a schematic cross-sectional view of a liquid crystal display device 300D, and FIG. 25(b) is a schematic cross-sectional view of a liquid crystal display device 300E.

Figure 26:
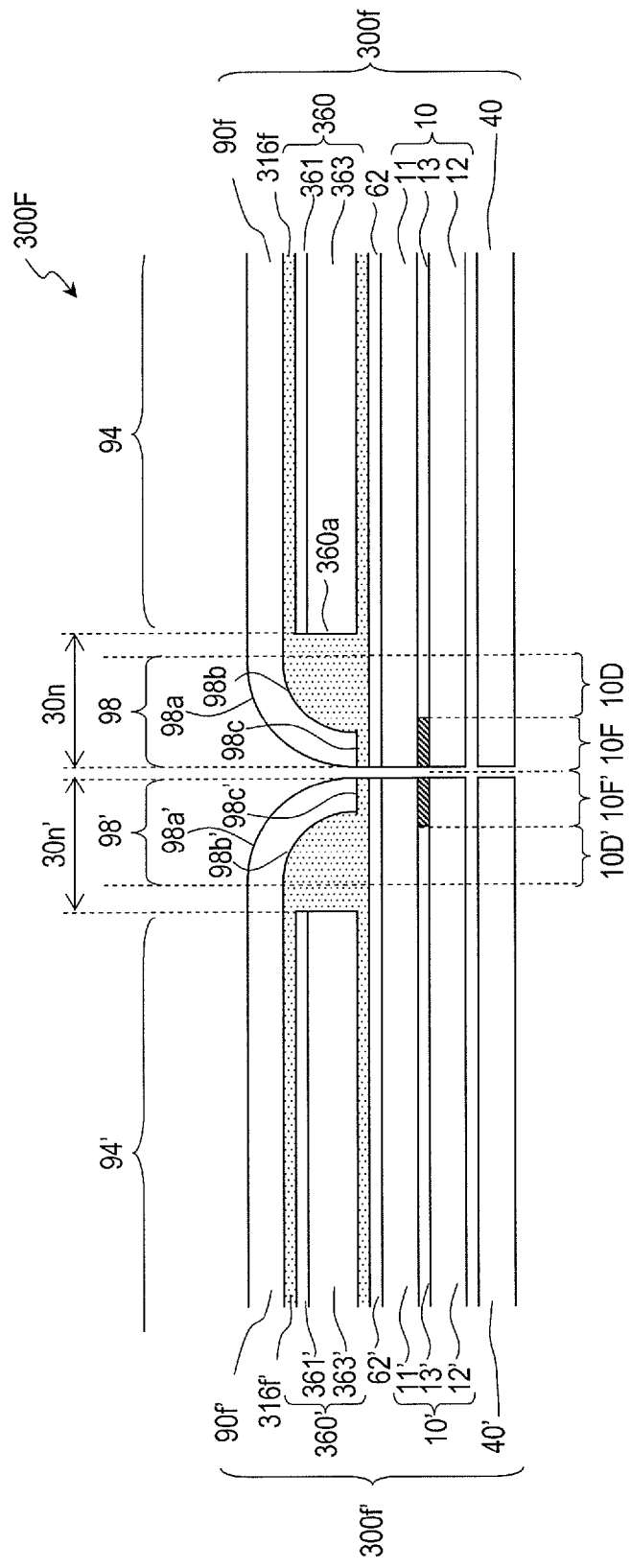

FIG. 26 is a schematic cross-sectional view of a liquid crystal display device 300F.

FIG. 27(a) is a schematic cross-sectional view of a liquid crystal display device 300G, and FIG. 27(b) is a schematic cross-sectional view of a liquid crystal display device 300H.

Figure 28:
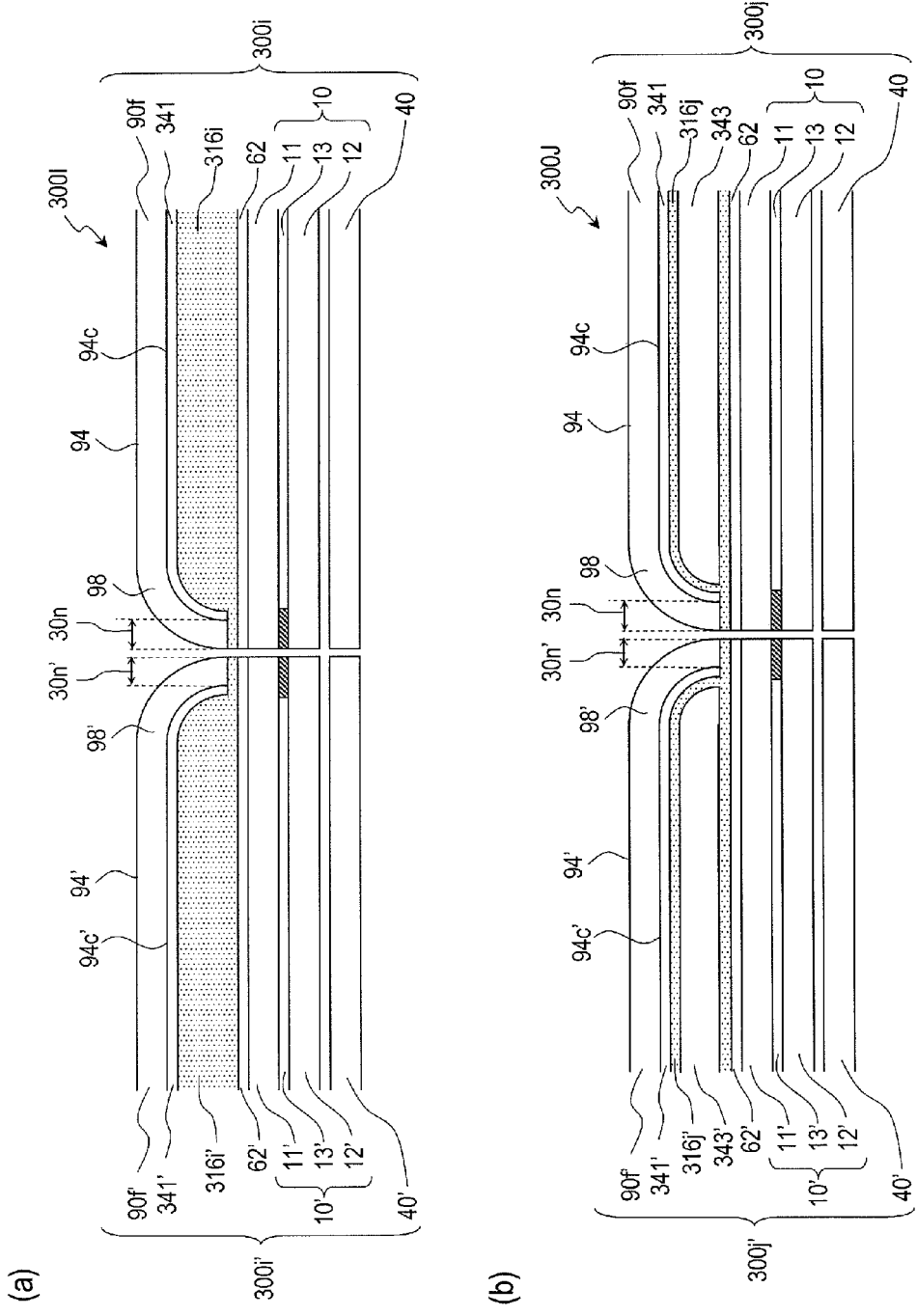

FIG. 28(a) is a schematic cross-sectional view of a liquid crystal display device 300I, and FIG. 28(b) is a schematic cross-sectional view of a liquid crystal display device 300J.

Figure 29:
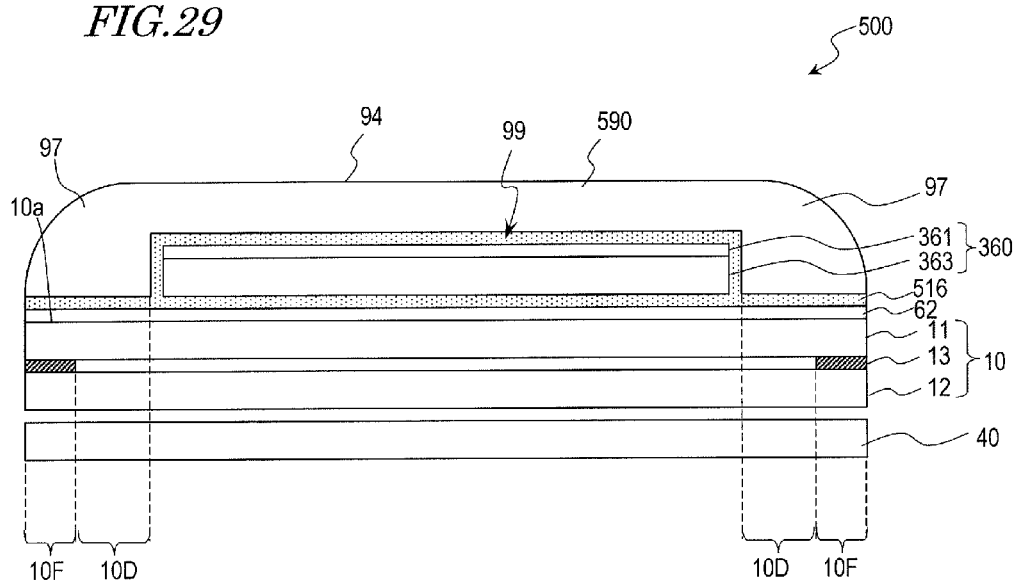

FIG. 29 is a schematic cross-sectional view of a liquid crystal display device 500.

Figure 30:
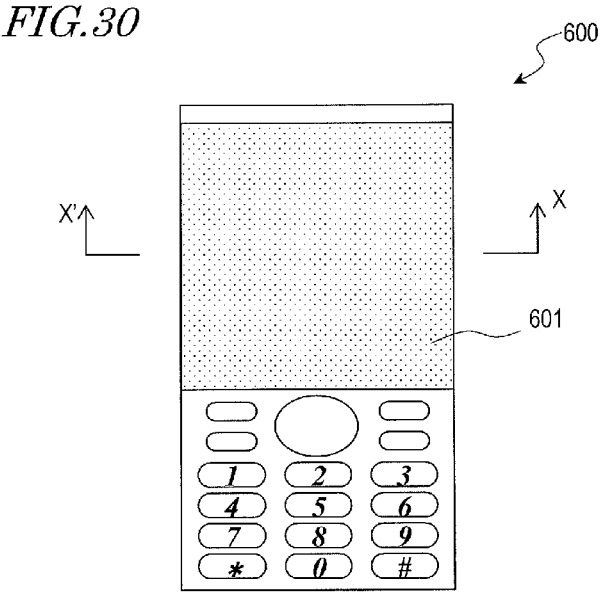

FIG. 30 is a view schematically showing a mobile phone 600.

DESCRIPTION OF EMBODIMENTS

Hereinafter, embodiments of the present invention will be described with reference to the drawings, but the present invention is not limited to the following embodiments.

First, with reference to FIG. 1 through FIG. 3, a structure of a folding type liquid crystal display device 100A in an embodiment according to the present invention will be described.

Figure 1:
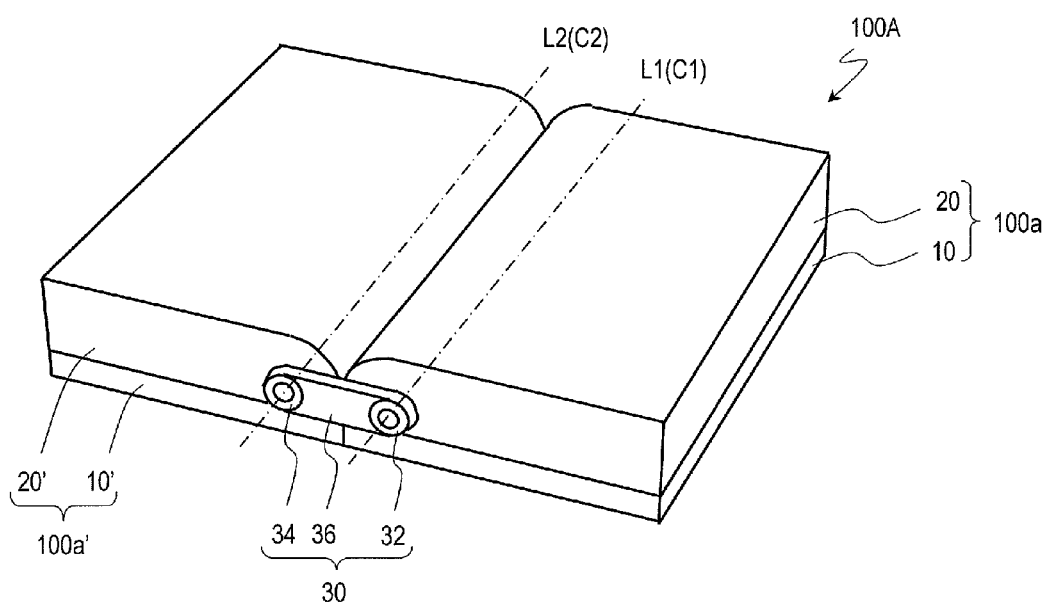
FIG. 1 is a schematic isometric view of a display device 100A in an embodiment according to the present invention.

FIG. 1 is a schematic isometric view of the liquid crystal display device 100A. FIG. 2(a) is a schematic plan view of the liquid crystal display device 100A, and FIG. 2(b) is a schematic cross-sectional view of the liquid crystal display device 100A taken along line 2B-2B' in FIG. 2(a).

As shown in FIG. 1, the liquid crystal display device 100A includes a liquid crystal display unit 100a, a liquid crystal display unit 100a', and biaxial hinge devices 30. As shown in FIG. 2(a), the liquid crystal display device 100A includes two biaxial hinge devices 30 provided so as to face each other with the liquid crystal display units 100a and 100a' interposed therebetween.

The liquid crystal display unit 100a includes a liquid crystal display panel 10 and a light-transmissive cover 20 located on a viewer's side with respect to the liquid crystal display panel 10. Similarly, the liquid crystal display unit 100a' includes a liquid crystal display panel 10' and a light-transmissive cover 20' located on the viewer's side with respect to the liquid crystal display panel 10'. The light-transmissive covers 20 and 20' are formed of, for example, an acrylic resin, and protect display planes of the liquid crystal display panels 10 and 10' from impact, dust and the like.

Each of the biaxial hinge devices 30 includes a first hinge shaft 32, a second hinge shaft 34, and a coupling member for coupling the first hinge shaft 32 and the second hinge shaft 34. The first hinge shaft 32 and the second hinge shaft 34 are located parallel to each other. The first hinge shaft 32 is fixed to the light-transmissive cover 20, and the second hinge shaft 34 is fixed to the light-transmissive cover 20'. The liquid crystal display unit 100a is rotatable around a first rotation axis L1 defined by the first hinge shaft 32, and the liquid crystal display unit 100a' is rotatable around a second rotation axis L2 defined by the second hinge shaft 34. Each biaxial hinge device 30 couples the liquid crystal display unit 100a and the liquid crystal display unit 100a' to each other by the coupling member 36.

As shown in FIG. 2(b), the light-transmissive cover 20 included in the liquid crystal display unit 100a includes a flat portion 24 and a curved portion 22 provided along an end on the side of the liquid crystal display unit 100a'. Similarly, the light-transmissive cover 20' included in the liquid crystal display unit 100a' includes a flat portion 24' and a curved portion 22' provided along an end on the side of the liquid crystal display unit 100a. A viewer-side surface 24a of the flat portion 24 and a viewer-side surface 24a' of the flat portion 24' are flat. As shown in FIG. 2(b), a viewer-side surface 22a of the curved portion 22 and a viewer-side surface 22a' of the curved portion 22' each have a cross-section defined by a circular arc having a central angle of 90°. Namely, the viewer-side surface 22a of the curved portion 22 and the viewer-side surface 22a' of the curved portion 22' are each a part of a cylindrical curved surface (side surface of a cylinder).

The light-transmissive cover 20 is located such that a first central axis C1 of the cylindrical curved surface of the viewer-side surface 22a of the curved portion 22 matches the first rotation axis L1 of the biaxial hinge devices 30. The light-transmissive cover 20' is located such that a second central axis C2 of the cylindrical curved surface of the curved portion 22a' matches the second rotation axis L2 of the biaxial hinge devices 30. In other words, the hinge devices 30 are fixed to the liquid crystal display unit 100a and the liquid crystal display unit 100a' such that the first rotation axis L1 of the biaxial hinge devices 30 matches the first central axis C1 of the curved portion 22a of the light-transmissive cover 20 and such that the second rotation axis L2 matches the second central axis C2 of the curved portion 22a' of the light-transmissive cover 20'.

As shown in FIG. 2(a), the first hinge shaft 32 and the second hinge shaft 34 are partially located in the light-transmissive covers 20 and 20', and therefore are visually recognized by the viewer. Accordingly, it is preferable to conceal the first hinge shaft 32 and the second hinge shaft 34 with printing or the like made on the light-transmissive covers 20 and 20'.

The liquid crystal display panels 10 and 10' are known liquid crystal display panels. As shown in FIG. 2(b), the liquid crystal display panel 10 includes a display region 10A including a plurality of pixels arranged in an array and a frame region 10F provided outer to the display region 10A. Similarly, the liquid crystal display panel 10' includes a display region 10A' and a frame region 10F'. No image is displayed on the frame regions 10F or 10F'. Therefore, when one image is displayed over the liquid crystal display panels 10 and 10', a non-display region 10FF formed of the frame regions 10F and 10F' is visually recognized as a joint.

As described above, in the liquid crystal display device 100A, the curved portions 22a and 22a' of the light-transmissive covers 20 and 20' are coupled so as to face each other by the biaxial hinge devices 30. Therefore, a width of the non-display region 10FF visually recognized as a joint of the image can be made small as described later.

With reference to FIGS. 3(a) through (c), an opening/closing operation of the liquid crystal display panel 10 and 10' of the liquid crystal display device 100A will be described.

As described above, in the liquid crystal display device 100A, the liquid crystal display panels 10 and 10' are opened or closed as a part of the liquid crystal display units 100a and 100a' respectively including the light-transmissive covers 20 and 20'. The liquid crystal display unit 100a is rotatable around the first rotation axis L1 defined by the first hinge shaft 32, and the liquid crystal display unit 100a' is rotatable around the second rotation axis L2 defined by the second hinge shaft 34. The liquid crystal display units 100a and 100a' can assume an open state (opening angle θ1=180°), a closed state (θ1=0°), and an intermediate state therebetween (0°<θ1<180°).

FIGS. 3(a), (b) and (c) are schematic cross-sectional views of the liquid crystal display device 100A when the opening angle θ1 of the liquid crystal display units 100a and 100a' is 135°, 90° and 0°, respectively. As shown in FIGS. 3(a) and (b), the opening angle θ1 is an angle made by a plane extended from the viewer-side surface 24a of the flat portion 24 of the light-transmissive cover 20 and a plane extended from the viewer-side surface 24a' of the flat portion 24' of the light-transmissive cover 20'. In this example, 0°≤θ1≤180°.

The liquid crystal display unit 100a rotates around the first rotation axis L1 defined by the first hinge shaft 32, and the liquid crystal display unit 100a' rotates around the second rotation axis L2 defined by the second hinge shaft 34. The viewer-side surface 22a of the curved portion 22 is a part of the cylindrical curved surface having the first rotation axis L1 as the central axis C1, and the viewer-side surface 22a' of the curved portion 22' is a part of the cylindrical curved surface having the second rotation axis L2 as the central axis C2. These two cylindrical curved surfaces have an equal radius (labeled as "$r_0$"). A distance between the first rotation axis L1 (central axis C1) and the second rotation axis L2 (central axis C2) is $2r_0$, and the viewer-side surfaces 22a and 22a' contact each other. As a matter of course, the distance between the first rotation axis L1 and the second rotation axis L2 do not change even when the liquid crystal display unit 100a rotates around the first rotation axis L1 or even when the liquid crystal display unit 100a' rotates around the second rotation axis L2. Accordingly, the liquid crystal display device 100A is opened or closed while the viewer-side surface 22a of the curved portion 22 and the viewer-side surface 22a' of the curved portion 22' are in contact with each other, as shown in FIG. 3(a) regarding when the opening angle θ1=135° and in FIG. 3(b) regarding when the opening angle θ1=90°.

The liquid crystal display units 100a and 100a' are independently rotatable around the rotation axes L1 and L2 respectively. It is preferable that as shown in FIGS. 3(a) and (b), the liquid crystal display units 100a and 100a' rotate uniformly. Now, a case where as shown in FIGS. 3(a) and (b), the liquid crystal display unit 100a' is fixed while the liquid crystal display unit 100a is rotated will be discussed.

As shown in FIG. 3(a), when the liquid crystal display unit 100a is rotated at θ=45° counterclockwise, the opening angle θ1 is 135°. At this point, a line segment connecting the first hinge shaft 32 and the second hinge shaft 34 (corresponding to the first rotation axis L1 and the second rotation axis L2 in this figure) of the biaxial hinge devices 30 (not shown in this figure) makes an angle of 22.5° with respect to the horizontal line. This means that the liquid crystal display unit 100a is rotated around the first rotation axis L1 at 22.5° counterclockwise while the liquid crystal display unit 100a' is rotated around the second rotation axis L2 at 22.5° clockwise.

The case shown in FIG. 3(b) is substantially the same. When the liquid crystal display unit 100a is rotated at θ=90° counterclockwise, the opening angle θ1 is 90°. At this point, a line segment connecting the first hinge shaft 32 and the second hinge shaft 34 (corresponding to the first rotation axis L1 and the second rotation axis L2 in this figure) of the biaxial hinge devices 30 (not shown in this figure) makes an angle of 45° with respect to the horizontal line. This means that the liquid crystal display unit 100a is rotated around the first rotation axis L1 at 45° counterclockwise while the liquid crystal display unit 100a' is rotated around the second rotation axis L2 at 45° clockwise.

In the case where liquid crystal display units 100a and 100a' are opened or closed so as to maintain this relationship, the ratio of the frame region 10F and the ratio of the frame region 10F' with respect to the non-display region 10FF are equal to each other in any intermediate state, for a viewer viewing in a direction equally dividing the opening angle θ1 into two. Therefore, the unnatural feeling given to the viewer can be alleviated.

Hereinafter, the feature of the liquid crystal display device 100A that the non-display region can be decreased in an intermediate state (0°<θ1<180°) between the open state and the closed state will be described in comparison with a comparative example.

Figure 4:
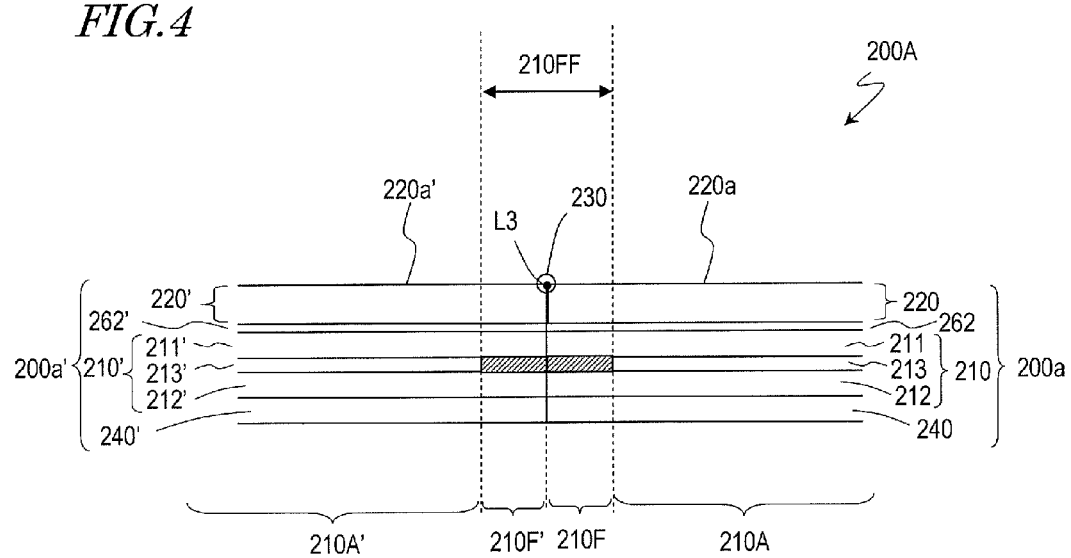
FIG. 4 is a schematic cross-sectional view of a liquid crystal display device 200A in a comparative example.

With reference to FIG. 4 and FIG. 5, a folding type liquid crystal display device 200A in a comparative example will be described. FIG. 4, and FIGS. 5(a), (b) and (c) are schematic cross-sectional views of the liquid crystal display device 200A when an opening angle θ2 is 180°, 135°, 90° and 0°, respectively. Unlike the liquid crystal display device 100A described above, the liquid crystal display device 200A in the comparative example shown in FIG. 4 includes hinge devices 230 having a single hinge shaft and a light-transmissive cover 220 having an entirely flat viewer-side surface 220a.

As shown in FIG. 4, the liquid crystal display device 200A in the comparative example includes a liquid crystal display unit 200a, a liquid crystal display unit 200a', and the hinge devices 230. The liquid crystal display unit 200a includes a liquid crystal display panel 210 and the light-transmissive cover 220. As shown in FIG. 4, the light-transmissive cover 220 has the entirely flat viewer-side surface 220a. The liquid crystal display panel 210 includes a top substrate 211 and a bottom substrate 212, and a liquid crystal layer 213 is provided between the top substrate 211 and the bottom substrate 212. Similarly, the liquid crystal display unit 200a' includes a liquid crystal display panel 210' and a light-transmissive cover 220'. The light-transmissive cover 220' has an entirely flat viewer-side surface 220a'. The liquid crystal display panel 210' includes a top substrate 211' and a bottom substrate 212', and a liquid crystal layer 213' is provided between the top substrate 211' and the bottom substrate 212'.

The hinge devices 230 are each a monoaxial hinge device having a single hinge shaft. The liquid crystal display units 200a and 200a' are both rotatable around a rotation axis L3 defined by the hinge shaft. The liquid crystal display units 200a and 200a' are coupled to each other by the hinge devices 230, and can assume an open state (opening angle θ2=180°), a closed state (θ2=0°), and an intermediate state therebetween (0°<θ2<180°).

FIGS. 5(a), (b) and (c) are schematic cross-sectional views of the liquid crystal display device 200A when the opening angle θ2 is 135°, 90° and 0°, respectively. The opening angle θ2 is an angle made by the viewer-side surface 220a of the light-transmissive cover 220 and the viewer-side surface 220a' of the light-transmissive cover 220'.

In FIGS. 5(a) and (b), the viewer-side surface 22a of the curved portion 22 of the liquid crystal display device 100A in this embodiment and the viewer-side surface 22a' of the curved portion 22' of the liquid crystal display device 100A are represented by dashed lines x and x', respectively. As described above, the dashed lines x and x' are cylindrical curved surfaces and are in contact with each other. Now, a case where an image is viewed in a direction equally dividing the opening angle (θ1, θ2) into two will be discussed. As is seen from FIG. 5(a), when the opening angle (θ1, θ2) is 135°, a width of the non-display region 10FF, of the liquid crystal display device 100A in this embodiment, in a direction perpendicular to the direction equally dividing the opening angle into two is shorter by a distance $dx_a$ between the dashed line x and the dashed line x' than a width of a non-display region 210FF, of the liquid crystal display device 200A in the comparative example, in a direction equally dividing the opening angle into two. Similarly, when the opening angle (θ1, θ2) is 90°, as shown in FIG. 5(b), the width of the non-display region 10FF of the liquid crystal display device 100A in this embodiment is shorter by a distance $dx_b$ between the dashed line x and the dashed line x' than the width of the non-display region 210FF of the liquid crystal display device 200A in the comparative example.

Also when the opening angle (θ1, θ2) is an angle different from 90° or 135°, the width of the non-display region 10FF of the liquid crystal display device 100A in this embodiment is shorter than the width of the non-display region 210FF of the liquid crystal display device 200A in the comparative example.

Figure 6:
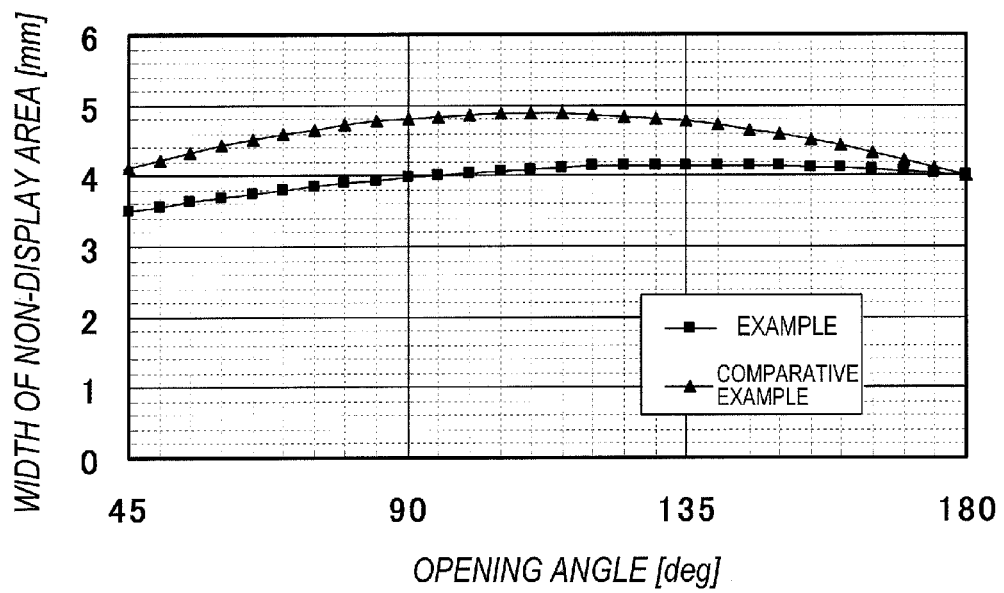
FIG. 6 is a graph showing calculation results of a width of a non-display region 10FF of the liquid crystal display device 100A in an example and calculation results of a width of a non-display region 210FF of the liquid crystal display device 200A in the comparative example.

FIG. 6 shows calculation results of a width of a non-display region as viewed in a direction equally dividing the opening angle (θ1) into two in a liquid crystal display device in an example having the same structure as that of the liquid crystal display device 100A in this embodiment (hereinafter, the liquid crystal display device in the example will be referred to as the "liquid crystal display device 100A in the example"). The calculation results shown in FIG. 6 are for a range of the opening angle of 45° or greater and 180° or less. FIG. 6 also shows calculation results of the width of the non-display region 210FF as viewed in a direction equally dividing the opening angle (θ2) into two in the liquid crystal display device 200A in the comparative example. In FIG. 6, the widths of the non-display regions 10FF and 210FF as viewed in the direction equally dividing the opening angle (θ1, θ2) into two are represented by ■ and ▲, respectively.

As shown in FIG. 2(b), the liquid crystal display panel 10 of the liquid crystal display device 100A in this embodiment includes a top substrate 11 and a bottom substrate 12, and a liquid crystal layer 13 is provided between the top substrate 11 and the bottom substrate 12. An optical film section 62 is provided between the liquid crystal display panel 10 and the light-transmissive cover 20. Similarly, the liquid crystal display panel 10' includes a top substrate 11' and a bottom substrate 12', and a liquid crystal layer 13' is provided between the top substrate 11' and the bottom substrate 12'. An optical film section 62' is provided between the liquid crystal display panel 10' and the light-transmissive cover 20'. For conducting the calculations shown in FIG. 6 of the width of the non-display region 10FF of the liquid crystal display device 100A in the example, the thickness of the top substrates 11 and 11', the thickness of the bottom substrates 12 and 12', the width of the frame regions 10F and 10F', the thickness of the optical film sections 62 and 62', and the thickness of the light-transmissive covers 20 and 20' were respectively set to 0.3 mm, 0.3 mm, 2 mm, 0.1 mm and 1 mm. The distance between the viewer-side surface 22a of the curved portion 22 and the first central axis C1, and the distance between the viewer-side surface 22a' of the curved portion 22' and the second central axis C2, were each set to 1 mm. As shown in FIG. 4, the liquid crystal display panel 210 of the liquid crystal display device 200A in the comparative example includes the top substrate 211 and the bottom substrate 212, and the liquid crystal layer 213 is provided between the top substrate 211 and the bottom substrate 212. An optical film section 262 is provided between the liquid crystal display panel 210 and the light-transmissive cover 220. Similarly, the liquid crystal display panel 210' includes the top substrate 211' and the bottom substrate 212', and the liquid crystal layer 213' is provided between the top substrate 211' and the bottom substrate 212'. An optical film section 262' is provided between the liquid crystal display panel 210' and the light-transmissive cover 220'. For conducting the calculations of the width of the non-display region 210FF of the liquid crystal display device 200A in the comparative example, the thickness of the top substrates 211 and 211', the thickness of the bottom substrates 212 and 212', the width of the frame regions 210F and 210F', the thickness of the optical film sections 262 and 262', and the thickness of the light-transmissive covers 220 and 220' were respectively set to 0.3 mm, 0.3 mm, 2 mm, 0.1 mm and 1 mm, like for the liquid crystal display device 100A in the example.

As shown in FIG. 6, when the opening angle is 180°, the width of the non-display regions 10FF and the width of the non-display region 210FF are each 4 mm. By contrast, as shown in FIG. 6, when the opening angle is 45° or greater and less than 180°, the width of the non-display region 10FF is smaller than the width of the non-display region 210FF.

For example, when the opening angle θ1=θ2=90°, the width of the non-display region 10FF and the width of the non-display region 210FF are respectively 3.98 mm and 4.81 mm. Thus, the non-display region 10FF of the liquid crystal display device 100A in the example is smaller by $dx_b$=0.83 mm than the non-display region 210FF of the liquid crystal display device 200A in the comparative example. Similarly, when the opening angle θ1=θ2=135°, the width of the non-display region 10FF and the width of the non-display region 210FF are respectively 4.15 mm and 4.77 mm. The non-display region 10FF of the liquid crystal display device 100A in the example is smaller by $dx_a$=0.62 mm than the non-display region 210FF of the liquid crystal display device 200A in the comparative example.

As can be seen, the liquid crystal display device 100A can decrease the non-display region 10FF in an intermediate state (0<θ1<180°) between the open state and the closed state.

In the liquid crystal display device 100A provided as an example, the viewer-side surface 22a of the curved portion 22 and the viewer-side surface 22a' of the curved portion 22' are both a part of a cylindrical curved surface having a radius $r_0$. Alternatively, the viewer-side surface 22a and the viewer-side surface 22a' may be parts of cylindrical curved surfaces having different radii. The non-display region 10FF can be made smaller even in a structure in which the angle at which the liquid crystal display unit 100a rotates around the first rotation axis L1 to be opened or closed and the angle at which the liquid crystal display unit 100a' rotates around the second rotation axis L2 to be opened or closed are not equal to each other. However, in the case where the liquid crystal display unit 100a and the liquid crystal display unit 100a' are structured to rotate in different directions from each other at an equal angle for being opened or closed as in the liquid crystal display device 100A, there is the following advantage. For a viewer viewing an image in a direction equally dividing the opening angle θ1 into two in an intermediate state, the ratio of the frame region 10F and the ratio of the frame region 10F' with respect to the non-display region 10FF are equal to each other as described above, and therefore the unnatural feeling given to the viewer can be alleviated.

The viewer-side surface 22a and the viewer-side surface 22a' do not need be in contact with each other while the liquid crystal display device 100A is opened or closed. For example, in the case where the viewer-side surface 22a and the viewer-side surface 22a' may possibly be rubbed or scratched if being in contact with each other for opening or closing the liquid crystal display device 100A, the liquid crystal display device 100A may be structured so as to be opened or closed while the viewer-side surface 22a and the viewer-side surface 22a' have a gap therebetween. The viewer-side surface 22a and the viewer-side surface 22a' may be treated with hardcoat for the purpose of being protected against rubbing or scratching.

As described above, the liquid crystal display panel 10 of the liquid crystal display device 100A may be any known liquid crystal display panel, and is, for example, a TFT-type VA-mode liquid crystal display panel. The liquid crystal display panel 10 includes the top substrate 11 and the bottom substrate 12, and the liquid crystal layer 13 is provided between the top substrate 11 and the bottom substrate 12. In the bottom substrate 12, TFTs and pixel electrodes, for example, are provided. In the top substrate 11, a color filter layer and a counter electrode, for example, are provided. In the frame region 10F of the liquid crystal display panel 10, a sealing section 16, a driving circuit and the like are formed.

The liquid crystal display device 100A provided as an example includes the liquid crystal display panels 10 and 10' of a light-transmissive type, and therefore includes backlight devices 40 and 40'. The backlight devices 40 and 40' are each an edge-light type backlight device including, for example, an LED, a light guide plate, and optical sheets including a diffuser, a prism sheet and the like. As the liquid crystal display panels 10 and 10', polymer dispersed liquid crystal display panels or reflective liquid crystal display panels, for example, may be used. In the case where the reflective liquid crystal display panels are used as the liquid crystal display panels 10 and 10', the backlight devices 40 and 40' are not necessary.

The optical film section 62 is provided between the liquid crystal display panel 10 and the light-transmissive cover 20, and the optical film section 62 includes, for example, a polarizer plate, a phase plate and the like. The optical film section 62 may be omitted.

In this embodiment, a liquid crystal display device is described as an example, but a display panel other than the liquid crystal display device may be used. For example, a PDP display panel, an organic EL display panel, an electrophoretic display panel or the like is usable. In the case where a self-light-emitting type display panel such as the organic EL display panel is used, the backlight device is omitted.

As each of biaxial hinge devices 30, any known biaxial device including two rotation shafts parallel to each other is usable. For example, a biaxial hinge device used for a folding type mobile phone is usable. For example, biaxial hinge devices described in Japanese Laid-Open Patent Publications Nos. 2005-83462, 2005-207465, 2007-251512, 2008-14449, and 2009-68716 are usable. Examples of the biaxial hinge device capable of rotating the liquid crystal display unit 100a around the rotation axis L1 and the liquid crystal display panel 100a' around the second rotation axis L2 at an equal angle are described in Japanese Laid-Open Patent Publications Nos. 2005-207465 and 2008-14449. The coupling member 36 of the biaxial hinge device 30 is formed of, for example, a resin or a metal.

Now, with reference to FIG. 7 and FIG. 8, a folding type liquid crystal display device in another embodiment according to the present invention (liquid crystal display device 100B shown in FIG. 7) will be described.

Figure 7:
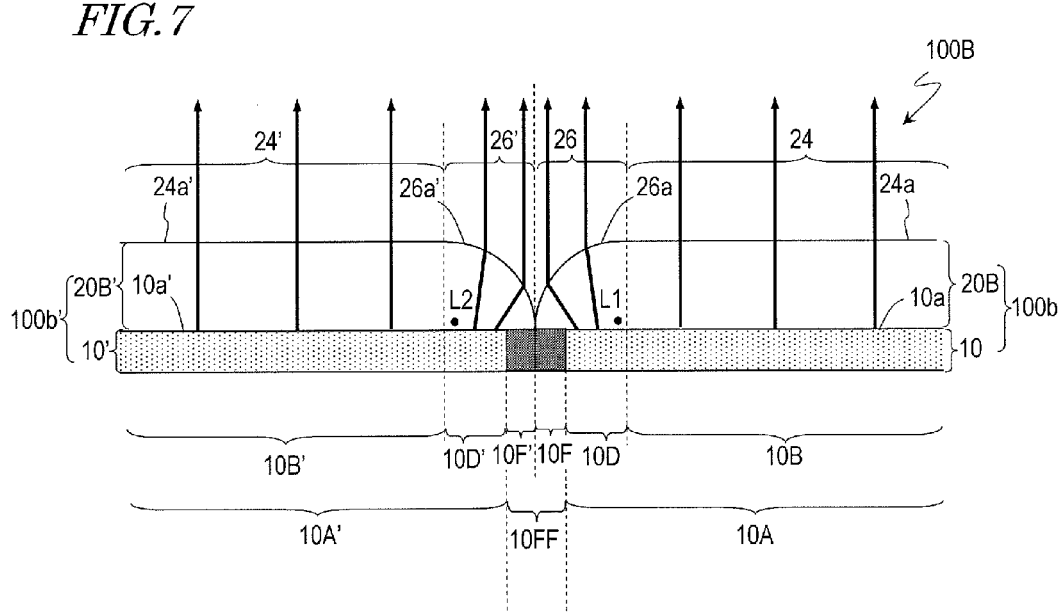
FIG. 7 is a schematic cross-sectional view of a liquid crystal display device 100B.

Unlike the liquid crystal display device 100A (FIG. 1), the liquid crystal display device 100B shown in FIG. 7 can obscure a joint in an image by displaying the image on the viewer's side of the frame regions 10F and 10F'. Curved portions 26 and 26' of light-transmissive covers 20B and 20B' of the liquid crystal display device 100B each act as a lens like the "lens portion" of the light-transmissive cover of the display device described in Patent Document 1 mentioned above.

FIG. 7 is a schematic cross-sectional view of the liquid crystal display device 100B. The liquid crystal display device 100B includes a liquid crystal display unit 100b, a liquid crystal display unit 100b', and biaxial hinge devices (not shown). Like in the liquid crystal display device 100A (FIG. 2), the liquid crystal display unit 100b and the liquid crystal display unit 100b' of the liquid crystal display device 100B are coupled to each other by the biaxial hinge devices so as to be respectively rotatable around a first rotation axis L1 and a second rotation axis L2. The liquid crystal display unit 100b includes a liquid crystal display panel 10 and a light-transmissive cover 20. Similarly, the liquid crystal display unit 100b' includes a liquid crystal display panel 10' and a light-transmissive cover 20'. The light-transmissive cover 20 includes a flat portion 24 and the curved portion 26. Similarly, the light-transmissive cover 20' includes a flat portion 24' and the curved portion 26'. A viewer-side surface 26a of the curved portion 26 and a viewer-side surface 26a' of the curved portion 26' are parts of cylindrical curved surfaces centered around a first central axis C1 and a second central axis C2. These two cylindrical curved surfaces have an equal radius.

As shown in FIG. 7, the curved portion 26 of the light-transmissive cover 20B of the liquid crystal display unit 100b is located at a position overlapping an area, of the liquid crystal display panel 10, including the frame region 10F and a peripheral display region 10D in a display region 10A, the peripheral display region 10D adjoining the frame region 10F. The flat portion 24 is located at a position overlapping a central display region 10B. Similarly, the curved portion 26' of the light-transmissive cover 20B' of the liquid crystal display unit 100b' is located at a position overlapping an area, of the liquid crystal display panel 10', including a frame region 10F' and a peripheral display region 10D'. The flat portion 24' is located at a position overlapping a central display region 10B'.

FIG. 7 also schematically shows light rays which are output from the liquid crystal display panels 10 and 10' and incident on the light-transmissive covers 20B and 20B'. As shown in FIG. 7, light output from the peripheral display region 10D is incident on the curved portion 26, is refracted by the viewer-side surface 26a of the curved portion 26, and proceeds in the normal direction to a display surface 10a of the liquid crystal display panel 10. Therefore, an image formed on the peripheral display region 10D is enlarged to cover an area including the peripheral display region 10D and the frame region 10F. The frame region 10F of the liquid crystal display panel 10 does not include any pixel, and therefore no image is displayed on the frame region 10F. However, by providing the light-transmissive cover 20B having the curved portion 26 on the viewer's side with respect to the liquid crystal display panel 10, the frame region 10F can be obscured. Similarly, also in the liquid crystal display unit 100b', light output from the peripheral display region 10D' is refracted by the curved portion 26'. Therefore, an image formed on the peripheral display region 10D' is enlarged to cover an area including the peripheral display region 10D' and the frame region 10F'. Therefore, the frame region 10F' can be obscured. The liquid crystal display device 100B includes a non-display region 10FF including the frame regions 10F and 10F'. However, the frame regions 10F and 10F' can be obscured by the curved portions 26 and 26', and therefore the non-display region 10FF can be obscured.

As shown in FIG. 7, light output from a central display region 10B is incident on the flat portion 24 and proceeds in the normal direction to the display region 10a of the liquid crystal display panel 10. Therefore, an image formed on the central display region 10B is displayed on the viewer's side of the flat portion 24. On the viewer's side of the curved portion 26, the image formed on the peripheral display region 10D is displayed. Accordingly, in the liquid crystal display unit 100b, an image can be displayed on the entirety of the flat portion 24 and the curved portion 26. Similarly, also in the liquid crystal display unit 100b', an image formed on a central display region 10B is displayed on the viewer's side of the flat portion 24', and the image formed on the peripheral display region 10D' is displayed on the viewer's side of the curved portion 26'. Accordingly, in the liquid crystal display unit 100b', an image can be displayed on the entirety of the flat portion 24' and the curved portion 26'. Thus, the liquid crystal display device 100B can display an image on the entirety of the viewer's side surface of the flat portion 24, the flat portion 24', the curved portion 26 and the curved portion 26'. Accordingly, the liquid crystal display device 100B can display an image with no joint.

FIGS. 8(a), (b), (c) and (d) are schematic cross-sectional views of the liquid crystal display device 100B when the opening angle θ1 is 180°, 135°, 90° and 0°, respectively. As shown in FIGS. 8(a) through (d), like in the liquid crystal display device 100A, the liquid crystal display units 100b and 100b' of the liquid crystal display device 100B are opened or closed in the state where the viewer-side surface 26a of the curved portion 26 and the viewer-side surface 26a' of the curved portion 26' are in contact with each other. The liquid crystal display units 100b and 100b' respectively rotate around the first rotation axis L1 and the second rotation axis L2 in opposite directions to each other at an equal angle.

As described above, the liquid crystal display device 100B can display an image on the viewer-side surfaces 26a and 26a' of the curved portions 26 and 26'. Accordingly, for example, when the opening angle θ1=135° (FIG. 8(b)), the viewer-side surface 26a of the curved portion 26 and the viewer-side surface 26a' of the curved portion 26' are in contact with each other. Therefore, the liquid crystal display device 100B can display an image with no joint on the entirety of the viewer-side surface thereof including the area at which the viewer-side surface 26a and the viewer-side surface 26a' are in contact with each other. Similarly, when the opening angle θ1=90° (FIG. 8(C)), the liquid crystal display device 100B can display an image with no joint on the entirety of the viewer-side surface thereof including the area at which the viewer-side surface 26a and the viewer-side surface 26a' are in contact with each other. When θ1 is an angle different from 90° or 135° also, the viewer-side surface 26a of the curved portion 26 and the viewer-side surface 26a' of the curved portion 26' are in contact with each other in an intermediate state (0°<θ1<180°). Therefore, in the intermediate state (0°<θ1<180°), the liquid crystal display device 100B can display an image with no joint on the entirety of the viewer-side surface thereof by displaying an image on the viewer-side surfaces 26a and 26a' of the curved portions 26 and 26'.

Figure 9:
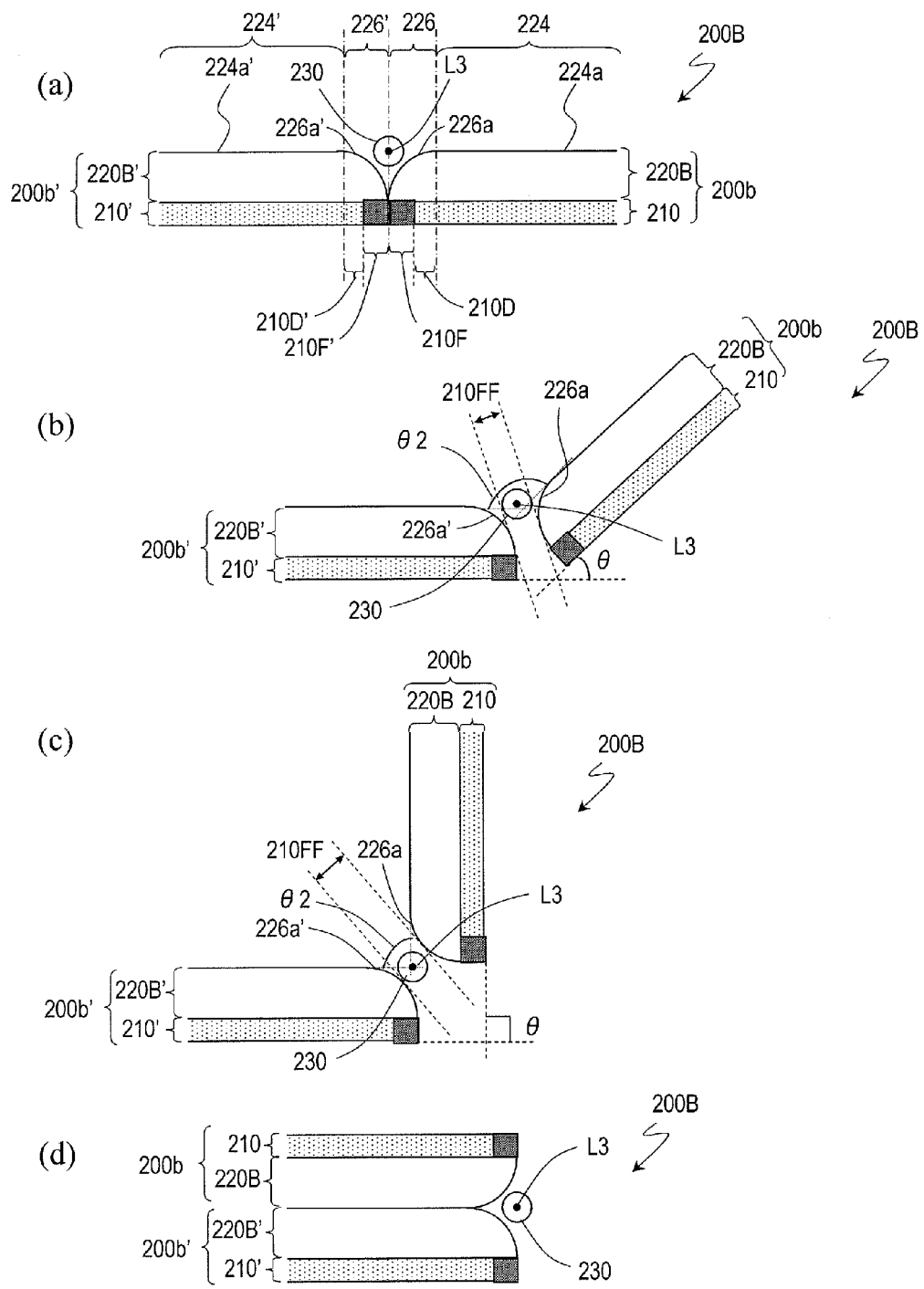
FIGS. 9(a), (b), (c) and (d) are schematic cross-sectional views of a liquid crystal display device 200B when the opening angle is 180°, 135°, 90° and 0°, respectively.

Now, with reference to FIG. 9, a liquid crystal display device 200B in a comparative example will be described.

FIGS. 9(a), (b), (c) and (d) are schematic cross-sectional views of the liquid crystal display device 200B when the opening angle θ2 is 180°, 135°, 90° and 0°, respectively. The liquid crystal display device 200B includes liquid crystal display units 200b and 200b' having the same structure as that of the liquid crystal display units 100b and 100b' of the liquid crystal display device 100B (FIG. 7) and hinge devices 230 having a single hinge shaft also included the liquid crystal display device 200A. The liquid crystal display units 200b and 200b' are coupled to each other by the hinge devices 230 so as to be rotatable around a single rotation axis L3 defined by the single hinge shaft. The liquid crystal display units 200b and 200b' can display images, formed on peripheral display regions 210D and 210D', on viewer-side surfaces of the curved portions 226 and 226a'.

Like in the liquid crystal display device 100B shown in FIG. 7, in the liquid crystal display device 200B, images displayed on the peripheral display regions 210D and 210D' are displayed on the viewer-side surfaces of the curved portions 226 and 226'. Therefore, when the opening angle is 180° (FIG. 9(a)), an image with no joint can be displayed.

However, the liquid crystal display device 200B cannot display an image with no joint in an intermediate state (0°<θ2<180°). For example, as shown in FIG. 9(b), when the opening angle is 135°, the viewer-side surface 226a of the curved portion 226 and the viewer-side surface 226a' of the curved portion 226' are separated from each other. Accordingly, even through images are displayed on the curved portions 226 and 226', an area between the viewer-side surface 226a of the curved portion 226 and the viewer-side surface 226a' of the curved portion 226 is visually recognized as a non-display region 210FF. Similarly, when the opening angle is 90° (FIG. 9(c)), the area between the viewer-side surface 226a of the curved portion 226 and the viewer-side surface 226a' of the curved portion 226 is visually recognized as the non-display region 210FF.

By contrast, in the liquid crystal display device 100B, the liquid crystal display units 100b and 100b' are opened or closed in the state where the viewer-side surface 26a of the curved portion 26 and the viewer-side surface 26a' of the curved portion 26' are in contact with each other as described above. Therefore, an image with no joint can be displayed in the open state and also in an intermediate state (0°<θ1<180°).

In the liquid crystal display device 200B in the comparative example, when the opening angle θ2 is 180° (FIG. 9(a)), the hinge devices 230 protrude from outermost surfaces of the light-transmissive covers 220B and 220B'. Therefore, the display plane is not entirely flat. By contrast, in the liquid crystal display device 100B in the embodiment, when the opening angle θ1 is 180° (FIG. 8(a)), the hinge devices 30 do not protrude and the display plane is flat. Recently for mobile phones, mobile information terminals and the like, designs with a flat display plane tend to be preferred. From this point of view also, the structure of this embodiment is advantageous.

Figure 10:
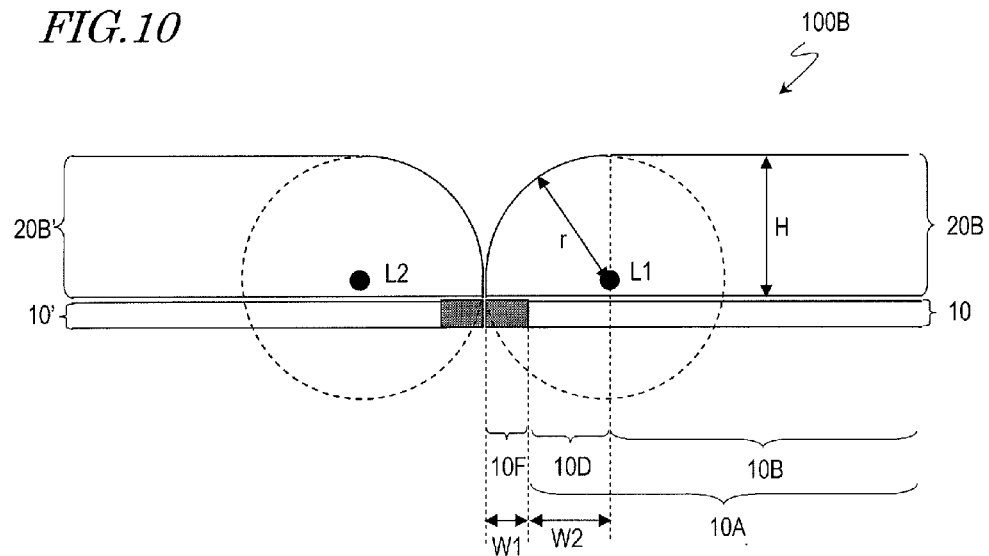
FIG. 10 is a view illustrating design values of the liquid crystal display device 100B.

Now, with reference to FIG. 10, an example of design values of the liquid crystal display device 100B will be described. The light-transmissive cover 20B can be formed of, for example an acrylic resin. In the case where an acrylic resin having a refractive index of 1.49 is used as the material of the light-transmissive cover 20B, a thickness H of the light-transmissive cover 20B is preferably at least three times a width W1 of the frame region 10F. In the case where the light-transmissive cover 20B is formed such that the thickness H is at least three times the width W1 of the frame region 10F, an image can be displayed to an end of the curved portion 26. Therefore, the entirety of the frame region 10F is made visually unrecognizable. Similarly, a thickness of the light-transmissive cover 20B' is preferably three times a width of the frame region 10F', so that the entirety of the frame region 10F' can be made visually unrecognizable. As a result, no joint can be visually recognizable in the liquid crystal display device 100B. For example, when the width W1 of the frame region 10F is 2.0 mm, the thickness H of the light-transmissive cover and a radius of curvature r of the viewer-side surface 26a of the curved portion 26 are set to 8.0 mm and 5.0 mm. Thus, the entirety of the frame region 10F can be made visually unrecognizable. At this point, since the area in which the curved portion 26 is located has a width of 5.0 mm, a width W2 of the peripheral display region 10D is 3.0 mm.

In the above, the liquid crystal display device 100B including the light-transmissive covers 20B and 20B' allowing an image to be displayed to ends of the curved portions 26 and 26' is described as an example. Depending on the width of the frame regions 10F and 10F', the thickness of the light-transmissive covers 20B and 20B', and the radius of curvature of the curved portions 26 and 26', a joint may possibly be visually recognized in an intermediate state (0°<θ1<180°) when the opening angle θ1 is of a certain value. However, as compared with the liquid crystal display device 200B which is the same as the liquid crystal display device 100B in terms of the width of the frame regions 210F and 210F', the thickness of the light-transmissive covers 220B and 220B' and the radius of curvature of the curved portions 226 and 226', the liquid crystal display device 100B has a larger range of opening angle θ1 in which the joint can be made visually unrecognizable. Even if the joint is visually recognized, the width of the joint is smaller.

Now, with reference to FIG. 11, a liquid crystal display device 100C in still another embodiment will be described.

Figure 11:
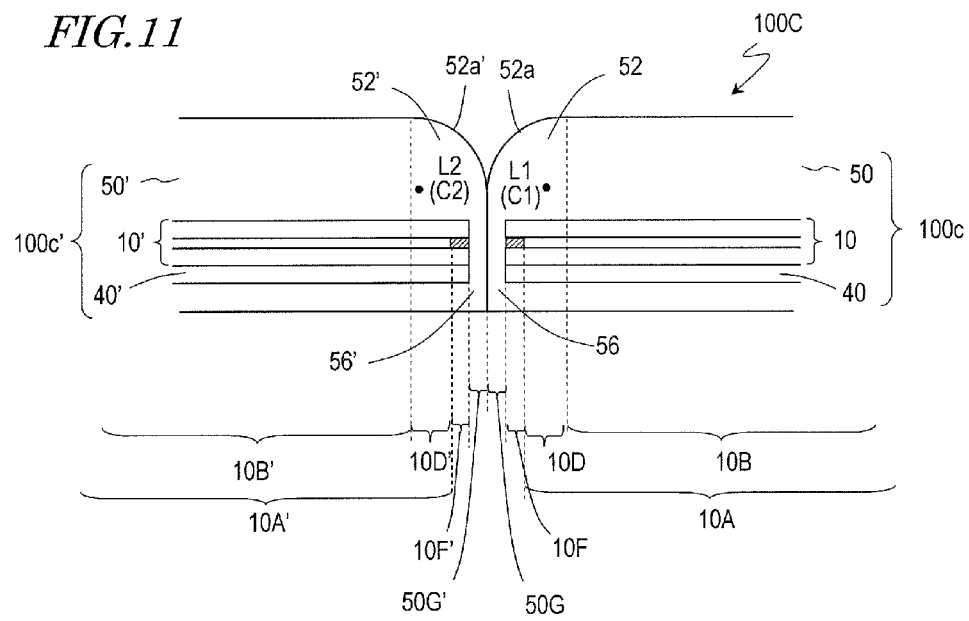
FIG. 11 is a schematic cross-sectional view of a liquid crystal display device 100C.

As shown in FIG. 11, the liquid crystal display device 100C includes a liquid crystal display unit 100c, a liquid crystal display unit 100c', and biaxial hinge devices (not shown). The liquid crystal display unit 100c includes a display panel 10, a housing 50 and a backlight device 40. The liquid crystal display unit 100c' includes a display panel 10', a housing 50' and a backlight device 40'. Like in the liquid crystal display device 100A (FIG. 1) and the liquid crystal display device 100B (FIG. 7), the liquid crystal display unit 100c and the liquid crystal display unit 100c' of the liquid crystal display device 100C are coupled to each other by biaxial hinge devices so as to be respectively rotatable around a first rotation axis L1 and a second rotation axis L2. Unlike in the liquid crystal display device 100A and the liquid crystal display device 100B, the liquid crystal display units 100c and 100c' of the liquid crystal display device 100C respectively include the light-transmissive housings 50 and 50' instead of the light-transmissive covers 20 and 20' or the light-transmissive covers 20B and 20B'. The housings 50 and 50' respectively have curved portions 52 and 52' for refracting light which is output from peripheral display regions 10D and 10D' of the liquid crystal display panels 10 and 10'. However, unlike the curved portions 26 and 26' of the liquid crystal display device 100B, the curved portions 52 and 52' are respectively located at positions overlapping areas including the peripheral display regions 10D and 10D', frame regions 10F and 10F', and close-to-panel portions 50G and 50G' described later. The liquid crystal display device 100C shown in FIG. 11 also include the liquid crystal display panel 10, the backlight device 40 and the like, but these elements are the same as the liquid crystal display panel 10, the backlight device 40 and the like of the liquid crystal display device 100A and will not be described.

Figure 12:
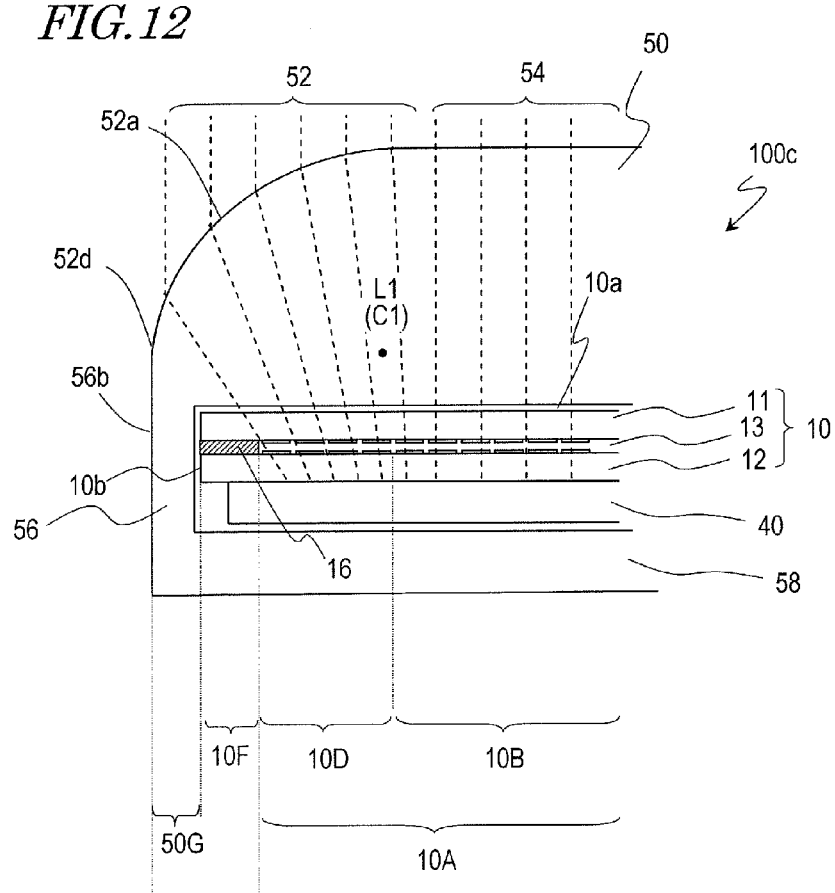
FIG. 12 is a schematic cross-sectional view of an end of a liquid crystal display unit 100c.

FIG. 12 is a schematic enlarged cross-sectional view of an end of the liquid crystal display unit 100c. Hereinafter, a part of the housing will be referred to as the "housing portion". The housing 50 is light-transmissive, and as shown in FIG. 12, includes the curved portion 52, a flat portion 54, a side housing portion 56, and a bottom housing portion 58. The side housing portion 56 is provided for protecting the liquid crystal display panel 10. Owing to including the side housing portion 56, the liquid crystal display unit 100c can prevent the liquid crystal display panel 10 from being exposed to dust or water, and also from directly receiving impact.

The side housing portion 56 is located on a side surface 10b of the liquid crystal display panel 10, and the bottom housing portion 58 is located below the backlight device 40. The curved portion 52 is located at a position overlapping an area including the peripheral display region 10D of the liquid crystal display panel 10, the frame region 10F of the liquid crystal display panel 10, and an area outer to the liquid crystal display panel 10 where the side housing portion 56 is located. Hereinafter, the area where the side housing portion 56 is located will be referred to also as the "close-to-panel portion 50G". As shown in FIG. 12, the curved portion 52 is located such that an outer end 52d thereof is existent on the viewer's side with respect to an end surface (also refereed to as the "side surface") 56b of the side housing portion 56. A viewer-side surface 52a of the curved portion 52 is a part of a cylindrical curved surface centered around a first central axis C1, and the first central axis C1 matches the first rotation axis L1 of the biaxial hinge devices. The flat portion 54 is located at a position overlapping a central display region 10B of the liquid crystal display panel 10. A viewer-side surface 54a of the flat portion 54 is flat and is parallel to a display plane 10a of the liquid crystal display panel 10.

In FIG. 12, light rays output from pixels arranged in a display region 10A and incident on the curved portion 52 and the flat portion 54 are represented by dashed lines. Light output from the pixels arranged in the peripheral display region 10D is incident on the curved portion 52 and is refracted outward. At this point, the light incident on the curved portion 52 is refracted by the viewer-side surface 52a of the curved portion 52 and is output from the viewer-side surface 52a of the curved portion 52 located on the peripheral display region 10D, the frame region 10F and the close-to-panel portion 50G. The light output from the viewer-side surface 52a of the curved portion 52 proceeds straight in a direction perpendicular to the display plane 10a of the liquid crystal display panel 10. Therefore, an image formed on the peripheral display region 10D of the liquid crystal display panel 10 is enlarged to cover an area including the peripheral display region 10D, the frame region 10F and the close-to-panel portion 50G. The light output from the pixels arranged in the central display region 10B is incident on the flat portion 54 and proceeds straight in the direction perpendicular to the display plane 10a. Therefore, on the viewer's side of the flat portion 54, an image formed on the central display region 10B is displayed.

In the liquid crystal display unit 100c, a part of the image is displayed on the viewer's side of the side housing portion 56. Therefore, the side housing portion 56 can be obscured. Accordingly, the frame (frame region 10F and side housing portion 56) of the liquid crystal display unit 100c is obscured. An image formed on the peripheral display region 10D is displayed on the viewer's side of the curved portion 52 and an image formed on the central display region 10B is displayed on the viewer's side of the flat portion 54. Therefore, an image can be displayed on the entirety of the viewer-side surface of the liquid crystal display unit 100c.

Also in the liquid crystal display unit 100c', an image formed on a peripheral display region 10D' is displayed on the viewer's side of the peripheral display region 10D', a frame region 10F' and a side housing portion 56'. Therefore, the frame (frame region 10F' and side housing portion 56') of the liquid crystal display unit 100c' is obscured. Since an image formed on the central display region 10B is displayed on the viewer's side of the flat portion 54, an image can be displayed on the entirety of the viewer-side surface of the liquid crystal display unit 100c'.

The liquid crystal display device 100C includes the housings 50 and 50' having the above-described structure, and therefore can display an image with no joint on the entirety of the viewer-side surface thereof when the opening angle is 180° (FIG. 11).

The liquid crystal display units 100c and 100c' of the liquid crystal display device 100C are coupled to each other by biaxial hinge devices substantially the same as the biaxial hinge devices 30 (FIG. 7 and FIG. 8) of the liquid crystal display device 100B. The liquid crystal display units 100c and 100c' are opened or closed in the state where the viewer-side surface 52a of the curved portion 52 of the housing 50 and a viewer-side surface 52a' of the curved portion 52' of the housing 50' are in contact with each other. As described above, an image can be displayed on the viewer's side of the curved portions 52 and 52'. Therefore, like the liquid crystal display device 100B, the liquid crystal display device 100C can display an image with no joint in an intermediate state between the open state and the closed state. The liquid crystal display device 100C has an advantage that in the intermediate state and the closed state, the side surfaces 10b and 10b' of the liquid crystal display panels 10 and 10' are respectively protected by the side housing portions 56 and 56'.

In the liquid crystal display device 100C, the side housing portions 56 and 56' are located outer to the frame regions 10F and 10F'. Therefore, as compared with in the liquid crystal display device 100A (FIG. 1) and the like with no side housing portions, the frames of the liquid crystal display units 100c and 100c' are larger and the non-display region 10FF is larger. However, the curved portions 52 and 52' are respectively located in areas including the peripheral display regions 10D and 10D', the frame regions 10F and 10F' and the close-to-panel portions 50G and 50G'. Therefore, the side housing portion 56 can be obscured, and an image with no joint can be displayed.

The liquid crystal display device 100C shown in FIG. 11 has a maximum opening angle of 180°. Also in a display device having a maximum opening angle of less than 180°, a light-transmissive housing can be used instead of the light-transmissive cover.

Figure 13:
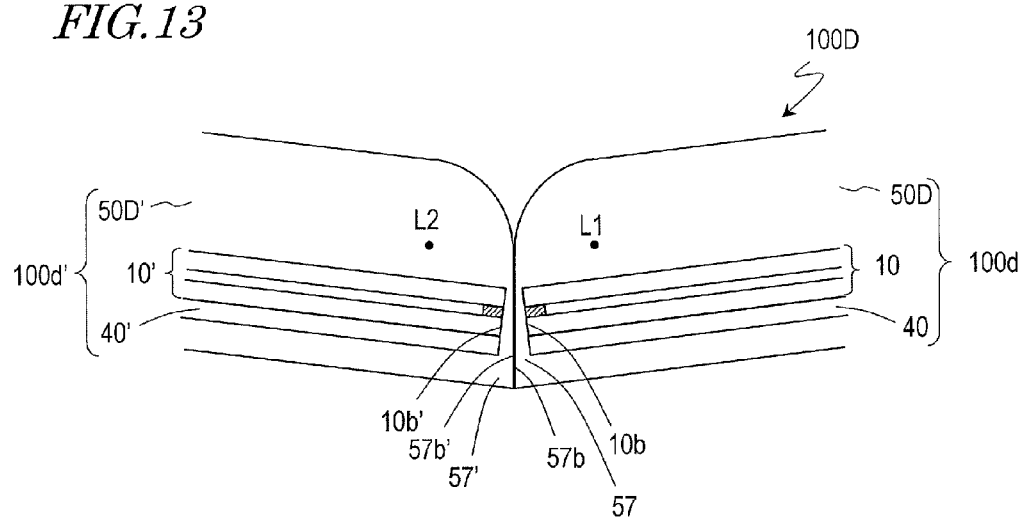
FIG. 13 is a schematic cross-sectional view of a liquid crystal display device 100D.

FIG. 13 is a schematic cross-sectional view of a liquid crystal display device 100D having a maximum opening angle of less than 180° and including a light-transmissive housing 50D having a curved portion, a flat portion, a side housing portion, and a bottom housing portion instead of the light-transmissive cover. As shown in FIG. 13, a liquid crystal display unit 100d of the liquid crystal display device 100D includes the housing 50D, and an end surface 57b of a side housing portion 57 of the housing 50D is formed such that a distance between the end surface 57d and a side surface 10b of the liquid crystal display panel 10 is increased from the viewer's side toward a rear surface of the liquid crystal display unit 100d. A housing 50D' of a liquid crystal display unit 100d' is also formed such that a distance between an end surface 57b' of a side housing portion 57' and a side surface 10b' of a liquid crystal display panel 10' is increased from the viewer's side toward a rear surface of the liquid crystal display unit 100d'. In this manner, in the case where a housing is provided in a display device having a maximum opening angle of less than 180° like the liquid crystal display device 100D shown in FIG. 13, a side surface of the housing may be formed to be inclined.

In the liquid crystal display device 100A and the liquid crystal display device 100B with no side housing portion, as shown in FIG. 3(c) and FIG. 8(d), side surfaces of the liquid crystal display panel 10 and 10' are exposed outside in the closed state. Even in an intermediate state (FIGS. 3(a) and (b) and FIGS. 8(b) and (c)), the side surfaces of the liquid crystal display panel 10 and 10' are exposed outside. The liquid crystal display device 100C and the liquid crystal display device 100D, which respectively have the side housing portions 56 and 56' and the side housing portions 57 and 57', have an advantage of preventing the side surfaces 10b and 10b' of the liquid crystal display panels 10 and 10' from being exposed outside in the closed state and also in an intermediate state.

Figure 14:
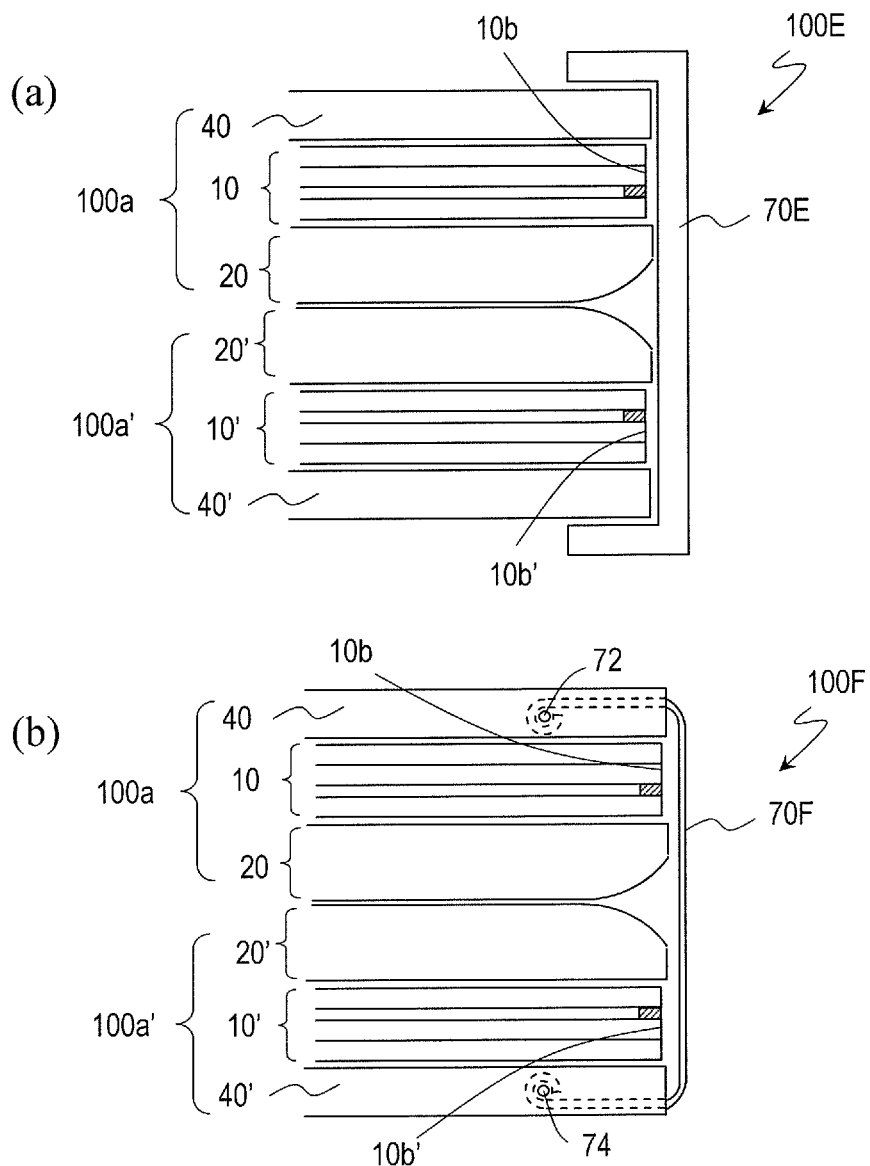
FIG. 14(a) is a schematic cross-sectional view of a liquid crystal display device 100E.
FIG. 14(b) is a schematic cross-sectional view of a liquid crystal display device 100F.

As described above, in the liquid crystal display device 100A, the side surfaces of the liquid crystal display panels 10 and 10' are exposed outside when the opening angle is 0° (closed state (FIG. 3(c)), and therefore may include a protecting member for protecting the side surface of the liquid crystal display panel 10 when the opening angle is 0°. FIGS. 14(a) and (b) respectively show a liquid crystal display device 100E including a protective member 70E and a liquid crystal display device 100F including a protective member 70F.

As in the liquid crystal display device 100E shown in FIG. 14(a), the protective member 70E may be attached only when the opening angle is 0°. Alternatively, as in the liquid crystal display device 100F shown in FIG. 14(b), the protecting member 70F of a film type may be provided so that when the opening angle exceeds 0°, the film type protecting member 70F is wound around winding shafts 72 and 74 respectively provided in the liquid crystal display units 100a and 100a'. The liquid crystal display device 100F has an advantage of protecting the side surfaces of the liquid crystal display panels 10 and 10' in the closed state and also in an intermediate state.

In the case where the side housing portions are provided on the side surfaces 10b and 10b' of the liquid crystal display panels 10 and 10' as in the liquid crystal display device 100C shown in FIG. 11 and the liquid crystal display device 100D shown in FIG. 13, it is not necessary to provide a protecting member. Even without the protecting member, the side surfaces 10b and 10b' of the liquid crystal display panels 10 and 10' can be protected in the closed state and an intermediate state.

Now, with reference to FIG. 15 and FIG. 16, a liquid crystal display device 100G in still another embodiment will be described. Unlike the liquid crystal display device 100A (FIG. 1) and the like, the liquid crystal display device 100G includes liquid crystal display units 100g and 100g', which respectively include housings 80 and 80' described later.

Figure 15:
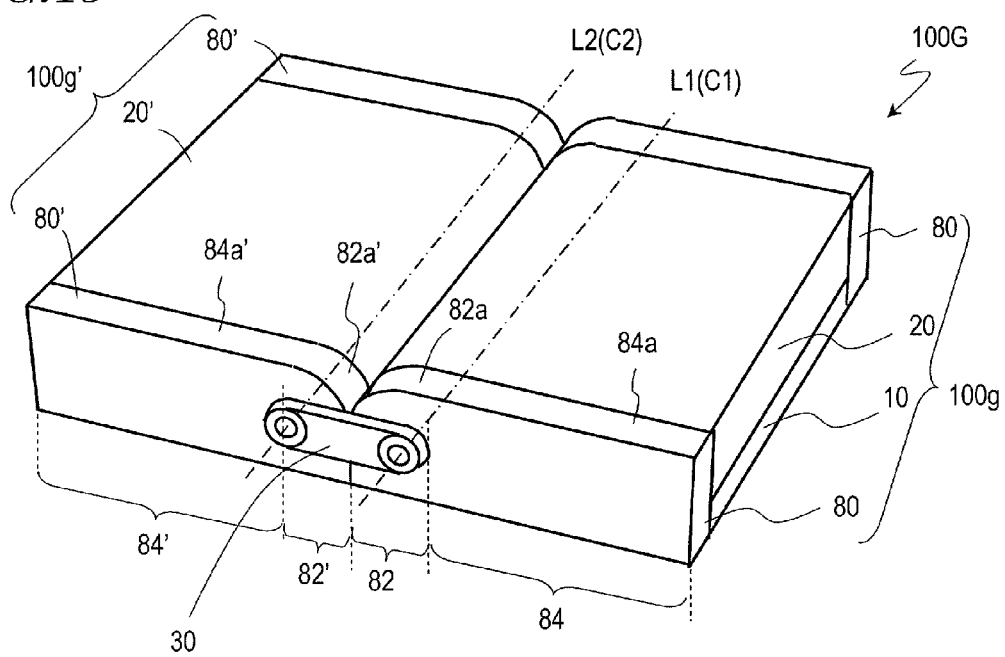
FIG. 15 is a schematic isometric view of a liquid crystal display device 100G.

FIG. 15 is a schematic isometric view of the liquid crystal display device 100G. FIG. 16(a) is a schematic plan view of the liquid crystal display device 100G, and FIG. 16(b) is a schematic cross-sectional view of the liquid crystal display device 100G taken long line 16B-16B' in FIG. 16(a).

As shown in FIG. 15, the liquid crystal display device 100G includes the liquid crystal display unit 100g, the liquid crystal display unit 100g', and biaxial hinge devices 30. As shown in FIG. 16(a), the liquid crystal display device 100G includes two biaxial hinge devices 30 provided so as to face each other with the liquid crystal display units 100g and 100g' interposed therebetween.

The liquid crystal display unit 100g includes a liquid crystal display panel 10, a light-transmissive cover 20, and housings 80. The light-transmissive cover 20 is located on the viewer's side with respect to the liquid crystal display panel 10. The housings 80 are located on side surfaces, of the liquid crystal display panel 10 and the light-transmissive cover 20, which are perpendicular to a first central axis C1 described later. The two housings 80 of the liquid crystal display unit 100g are provided so as to face each other with the liquid crystal display panel 10 and the light-transmissive cover 20 interposed therebetween. Similarly, the liquid crystal display unit 100g' includes a liquid crystal display panel 10', a light-transmissive cover 20' provided on the viewer's side with respect to the liquid display panel 10', and housings 80'.

Each of the biaxial hinge devices 30 includes a first hinge shaft 32, a second hinge shaft 34, and a coupling member 36 for coupling the first hinge shaft 32 and the second hinge shaft 34. The first hinge shaft 32 and the second hinge shaft 34 are located parallel to each other. The first hinge shaft 32 is fixed to the housing 80, and the second hinge shaft 34 is fixed to the housing 80'. The liquid crystal display unit 100g is rotatable around a first rotation axis L1 defined by the first hinge shaft 32, and the liquid crystal display unit 100g' is rotatable around a second rotation axis L2 defined by the second hinge shaft 34. Each biaxial hinge device 30 couples the liquid crystal display unit 100g and the liquid crystal display unit 100g' to each other by the coupling member 36.

As shown in FIG. 15, the housings 80 of the liquid crystal display unit 100g each include a curved housing portion 82 and a flat housing portion 84. Similarly, the housings 80' of the liquid crystal display unit 100g' each include a curved housing portion 82' and a flat housing portion 84'. A viewer-side surface 84a of each flat housing portion 84 and a viewer-side surface 84a' of each flat housing portion 84' are flat. A viewer-side surface 82a of each curved housing portion 82 and a viewer-side surface 82a' of each curved housing portion 82' are respectively parts of cylindrical curved surfaces centered around the first central axis C1 and a second central axis C2. The light-transmissive covers 20 and 20' respectively include curved portions 22 and 22' and flat portions 24 and 24'. A viewer-side surface 24a of the flat portion 24 and a viewer-side surface 24a' of the flat portion 24' are flat. A viewer-side surface 22a of the curved portion 22 and a viewer-side surface 22a' of the curved portion 22' are respectively parts of cylindrical curved surfaces centered around the first central axis C1 and the second central axis C2. As shown in FIG. 16(a), the curved housing portion 82 is located to adjoin the curved portion 22 of the light-transmissive cover 20. The curved housing portion 82' is located to adjoin the curved portion 22' of the light-transmissive cover 20'. The flat housing portion 84 is located to adjoin the flat portion 24 of the light-transmissive cover 20. The flat housing portion 84' is located to adjoin the flat portion 24' of the light-transmissive cover 20'. The housings 80 and the light-transmissive cover 20 are located such that the first central axis C1 matches the first rotation axis L1 of the biaxial hinge devices 30. Similarly, the housings 80' and the light-transmissive cover 20' are located such that the second central axis C2 matches the second rotation axis L2 of the biaxial hinge devices 30.

The viewer-side surface 22a of the curved portion 22 and the viewer-side surface 82a of the curved housing portion 82 are different from each other in terms of the distance from the first central axis C1. Namely, the radius of the cylindrical curved surface of the viewer-side surface 22a and the radius of the cylindrical curved surface of the viewer-side surface 82a are different from each other. Similarly, the viewer-side surface 22a' of the curved portion 22' and the viewer-side surface 82a' of the curved housing portion 82' are different from each other in terms of the distance from the second central axis C2.

FIG. 16(b) also shows the viewer-side surface 22a of the curved portion 22 and the viewer-side surface 82a of the curved housing portion 82. As shown in FIG. 16(b), the viewer-side surface 82a of the curved housing portion 82 is larger than the viewer-side surface 22a of the curved portion 22. As described above, the curved housing portion 82 and the curved portion 22 are both parts of cylindrical curved surfaces centered around the first central axis C1. Therefore, the distance between the viewer-side surface 82a of the curved housing portion 82 and the first central axis C1 is longer than the distance between the viewer-side surface 22a of the curved portion 22 and the first central axis C1. Similarly, the distance between the viewer-side surface 82a' of the curved housing portion 82' and the second central axis C2 is longer than the distance between the viewer-side surface 22a' of the curved portion 22' and the second central axis C2.

In other words, where the viewer-side surface 22a of the curved portion 22 is a part of a cylindrical curved surface having a first radius r1, the viewer-side surface 82a of the curved housing portion 82 is a part of a cylindrical curved surface centered around the first central axis C1 and having a radius longer than r1. Similarly, where the viewer-side surface 22a' of the curved portion 22' is a part of a cylindrical curved surface having a second radius r2, the viewer-side surface 82a' of the curved housing portion 82' is a part of a cylindrical curved surface centered around the second central axis C2 and having a radius longer than r2. Namely, where the viewer-side surface 82a of the curved housing portion 82 is a part of a cylindrical curved surface centered around the first central axis C1 and having a third radium r3, r3>r1. Similarly, where the viewer-side surface 82a' of the curved housing portion 82' is a part of a cylindrical curved surface centered around the second central axis C2 and having a fourth radium r4, r4>r2.

Accordingly, in the liquid crystal display device 100G, at the time of opening or closing, the viewer-side surface 22a of the curved portion 22 and the viewer-side surface 22a' of the curved portion 22' do not contact each other, and the viewer-side surface 82a of the curved housing portion 82 and the viewer-side surface 82a' of the curved housing portion 82' contact each other.

Regarding the liquid crystal display device 100A, when the liquid crystal display units 100a and 100a' are opened or closed in the state where the viewer-side surface 22a of the curved portion 22 of the light-transmissive cover 20 and the viewer-side surface 22a' of the curved portion 22' of the light-transmissive cover 20' are in contact with each other, the viewer-side surface 22a or the viewer-side surface 22a' may possibly be rubbed or scratched. In the liquid crystal display device 100G, the viewer-side surfaces 82a and 82a' of the curved housing portions 82 and 82' are larger than the viewer-side surfaces 22a and 22a' of the curved portions 22 and 22'. Therefore, the opening/closing operation can be performed without the viewer-side surface 22a of the curved portion 22 and the viewer-side surface 22a' of the curved portion 22' contacting each other. Accordingly, the liquid crystal display device 100G has an advantage that rubbing or scratching of the viewer-side surface 22a and the viewer-side surface 22a' can be prevented.

A difference between the distance from the viewer-side surface 22a of the curved portion 22 to the first central axis C1 and the distance from the viewer-side surface 82a of the curved housing portion 82 to the first central axis C1 (represented by "$dr_1$" in FIG. 16(b)) is preferably 0.05 mm or greater and 0.5 mm or less. The viewer-side surfaces 82a and 82a' of the curved housing portions 82 and 82' are larger than the viewer-side surfaces 22a and 22a' of the curved portions 22 and 22'. Therefore, in the liquid crystal display device 100G, a gap between the viewer-side surface 22a of the curved portion 22 and the viewer-side surface 22a' of the curved portion 22' (joint $dr_2$ shown in FIG. 16(b)) is visually recognized. When $dr_1$ exceeds 1.5 mm, the joint $dr_2$ may be conspicuous. When $dr_1$ is less than 0.5 mm, the viewer-side surface 22 or the viewer-side surface 22' may be rubbed or scratched. As described above, the viewer-side surface 22a and the viewer-side surface 22a' may be treated with hardcoat for the purpose of being protected against rubbing or scratching.

It is preferable that the liquid crystal display device 100G has a structure of displaying an image on the viewer's side of the curved portions 22 and 22' of the light-transmissive covers 20 and 20' like the curved portions 26 and 26' of the liquid crystal display device 100B shown in FIG. 8. With this structure, an image with no joint can be displayed in the open state and an intermediate state. Even when the liquid crystal display device 100G does not have the structure of displaying an image on the viewer's side of the curved portions 22 and 22', the liquid crystal display device 100G can decrease the non-display region like the liquid crystal display device 100A described with reference to FIG. 1 through FIG. 3.

Figure 17:
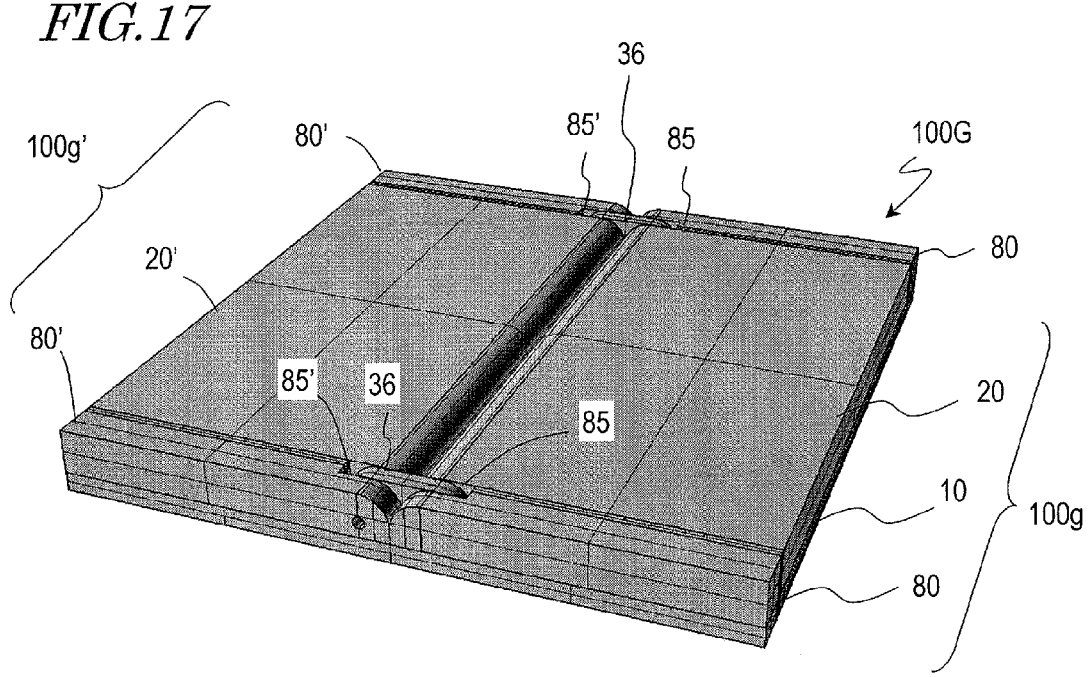
FIG. 17 is a schematic isometric view of the liquid crystal display device 100G.

In the case where the housings 80 and 80' are provided as in the liquid crystal display device 100G, as shown in FIG. 17, grooves 85 and 85' may be provided in the curved housing portions 82 and 82' and the coupling members 36 of the biaxial hinge devices 30 may be located in the grooves 85 and 85'.

In a display device, like the liquid crystal display device 100G, in which the liquid crystal display units 100g and 100g' are opened or closed in the state where the viewer-side surface 82a of the curved housing portion 82 and the viewer-side surface 82a' of the curved housing portion 82' are in contact with each other, the following may occur. When one of the viewer-side surface 82a of the curved housing portion 82 and the viewer-side surface 82a' of the curved housing portion 82' is relatively slid against the other, the liquid crystal display units 100g and 100g' are not stably opened or closed uniformly. Namely, the liquid crystal display unit 100g and the liquid crystal display unit 100g' cannot be stably rotated uniformly such that the rotating angle of the liquid crystal display unit 100g around the first rotation axis L1 is equal to the rotating angle of the liquid crystal display unit 100g' around the second rotation axis L2. Accordingly, like in a liquid crystal display device 100H and a liquid crystal display device 100I described below, a structure of stabilizing the opening/closing operation may be provided.

Figure 16:
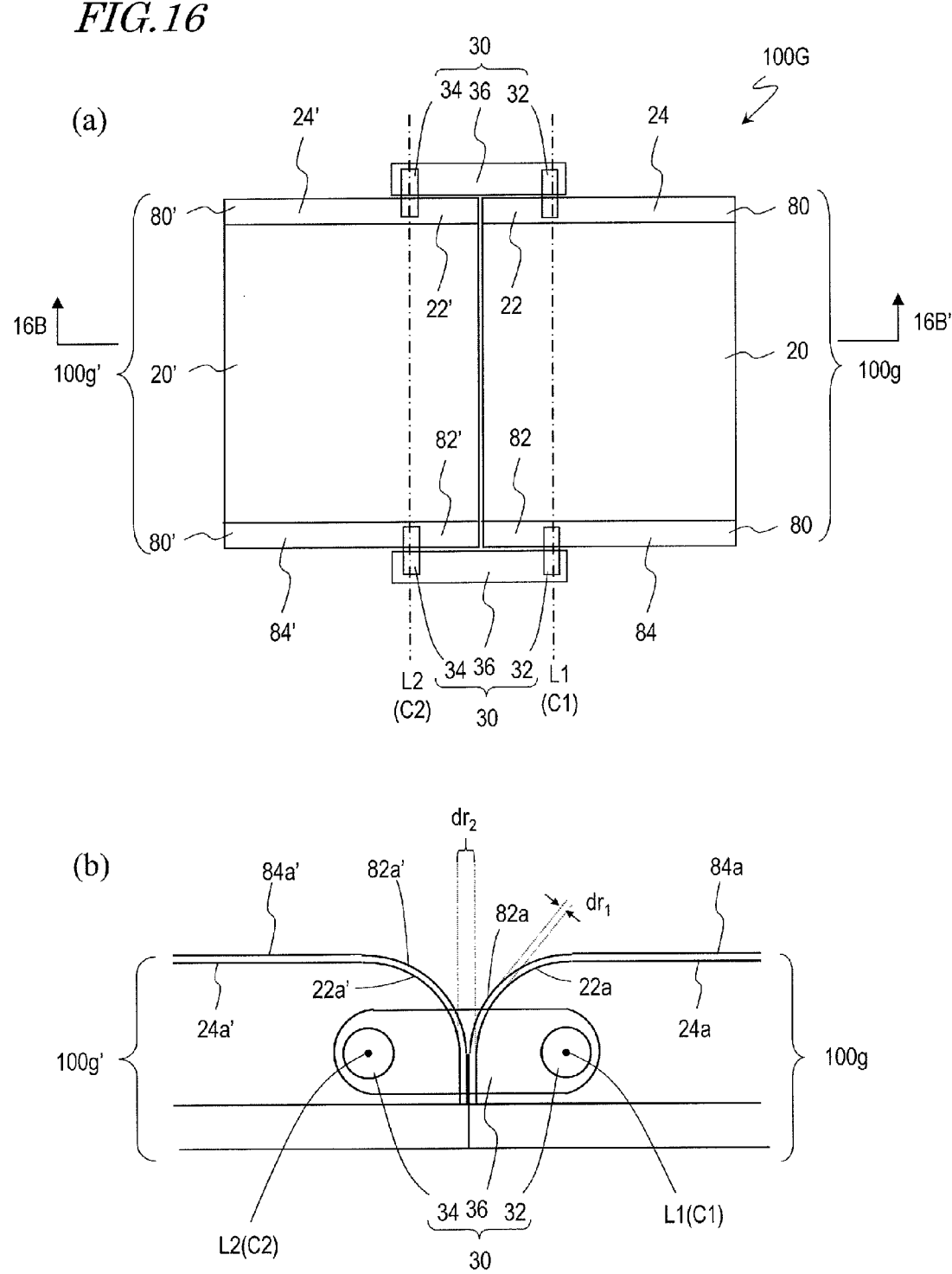
FIGS. 16(a) and (b) each show the liquid crystal display device 100G.
FIG. 16(b) is a schematic cross-sectional view taken along line 16B-16B' in FIG. 16(a).
Figure 18:
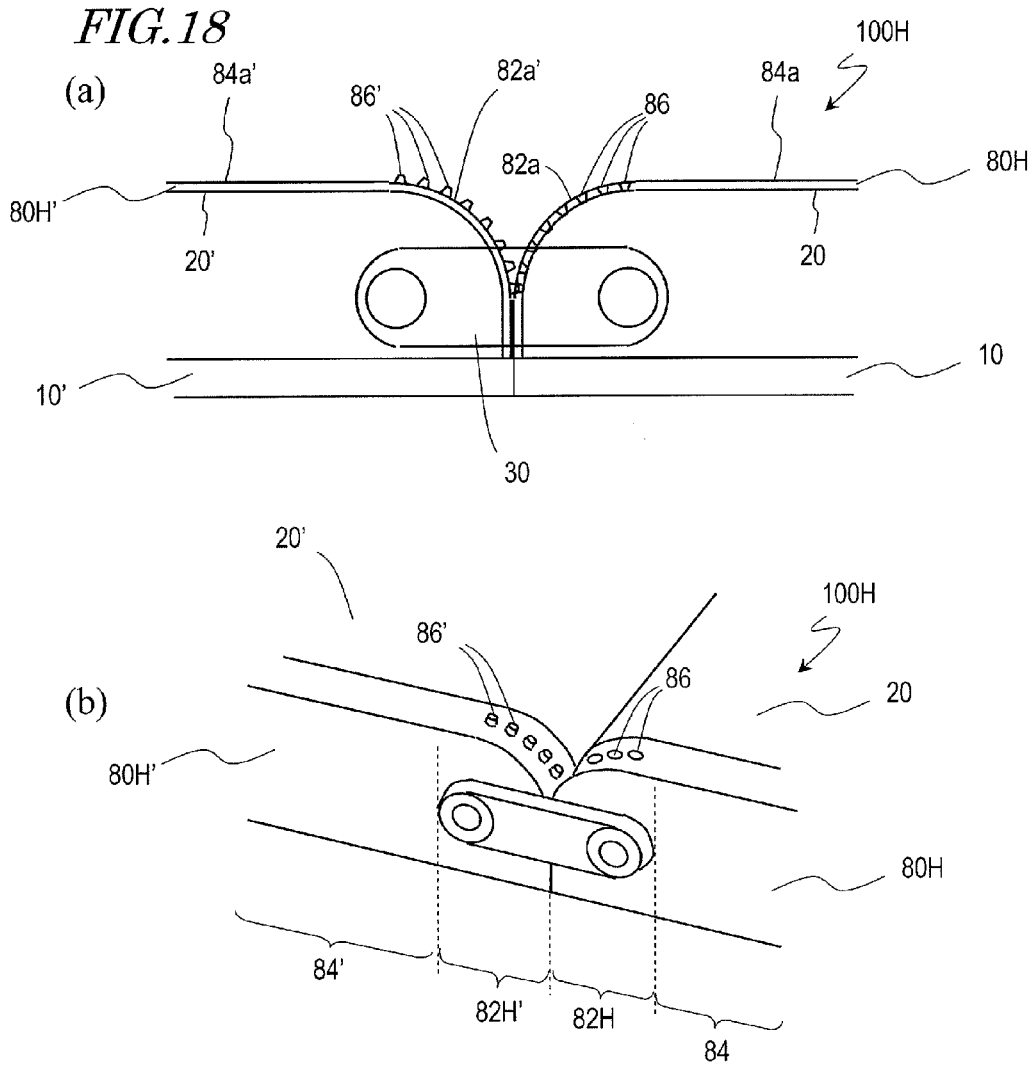
FIGS. 18(a) and (b) each show a liquid crystal display device 100H.
FIG. 18(b) is a schematic isometric view.

The liquid crystal display device 100H shown in FIGS. 18(a) and (b) includes housings 80H each including a curved housing portion 82H having a plurality of concaved portions 86 formed in a viewer-side surface 82a and housings 80H' each including a curved housing portion 82H' having a plurality of convexed portions 86' formed on a viewer-side surface 82a', instead of the housings 80 and 80' of the liquid crystal display device 100G shown in FIG. 16. By providing the convexed portions 86' and the concaved portions 86 so as to be engaged with each other, the liquid crystal display units can be stably rotated uniformly.

Figure 19:
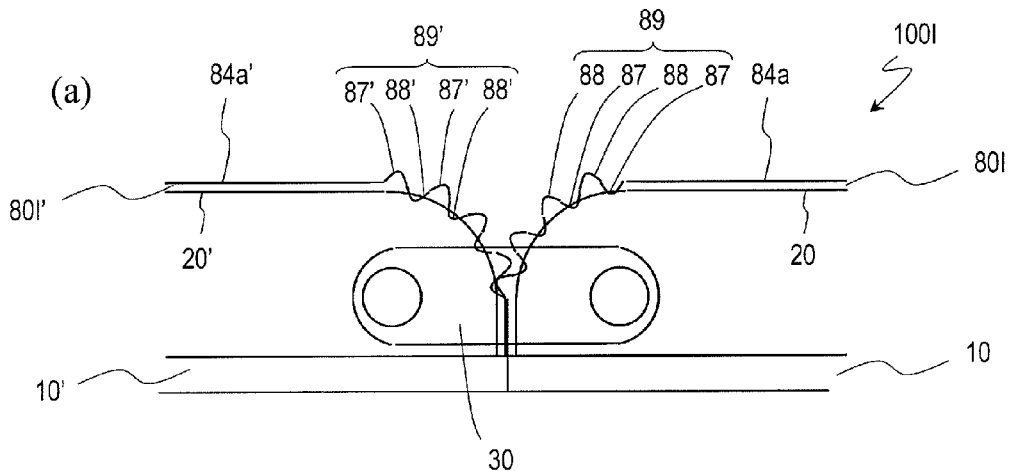
FIGS. 19(a) and (b) each show a liquid crystal display device 100I.
FIG. 19(b) is a schematic isometric view.

The liquid crystal display device 100I shown in FIGS. 19(a) and (b) includes housings 80I each including a housing portion 82I having a first convexed-concaved structure 89 and housings 80I' each including a housing portion 82I' having a second convexed-concaved structure 89'. The first convexed-concaved structure 89 includes a plurality of concaved portions 87 and a plurality of convexed portions 88 alternately located. The second convexed-concaved structure 89' includes a plurality of convexed portions 87' and a plurality of concaved portions 88' alternately located. By providing the first convexed-concaved structure 89 and the second convexed-concaved structure 89' so as to be engaged with each other, the liquid crystal display units can be stably rotated uniformly.

The concaved portions 86 and the convexed portions 86' of the above-described liquid crystal display device 100H (FIG. 18), and the concaved portions 87, the convexed portions 88, the convexed portions 87' and the concaved portions 88' of the above-described liquid crystal display device 100I (FIG. 19), have a height/depth of, for example, 0.1 mm or greater and 1 mm or less, and a cross-sectional width of 0.5 mm or greater and 3 mm or less.

Regarding the liquid crystal display device 100G shown in FIG. 15, in order to stably rotate the liquid crystal display units 100g and 100g' uniformly for the opening/closing operation, the friction between the viewer-side surface 82a of the curved housing portion 82 and the viewer-side surface 82a' of the curved housing portion 82' may be increased. For example, a high friction layer of a rubber material may be provided on the viewer-side surfaces 82a and 82a' of the curved housing portions 82 and 82'. Alternatively, the viewer-side surfaces 82a and 82a' of the curved housing portions 82 and 82' may be provided with a convexed-concaved structure smaller than the concaved portions 86 and the convexed portions 86' of the liquid crystal display device 100H (FIG. 18) or the concaved portions 87, the convexed portions 88, the convexed portions 87' and the concaved portions 88' of the above-described liquid crystal display device 100I (FIG. 19) (e.g., a convexed-concaved structure having a height of 5 μm or greater and 100 μm or less and a two-dimensional size of 5 μm or greater and 100 μm or less). Thus, the viewer-side surfaces 82a and 82a' have an aventurine face.

In the liquid crystal display device 100G, the viewer-side surfaces 22a and 22a' of the curved portions 22 and 22' of the light-transmissive covers 20 and 20' are each a curved surface having a cross-section defined by a circular arc. Like a liquid crystal display device 100J shown in FIG. 20, viewer-side surfaces 28a and 28a' of curved portions 28 and 28' may each be a curved surface having a cross-section defined by a curved line which is not a circular arc.

Figure 20:
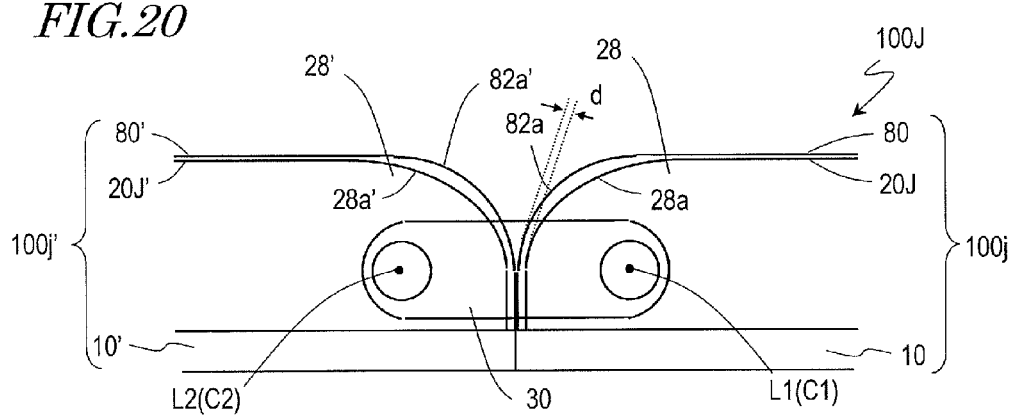
FIG. 20 is a schematic cross-sectional view of a liquid crystal display device 100J.

FIG. 20 is a schematic cross-sectional view of a direct-viewing type liquid crystal display device 100J in an embodiment according to the present invention. The liquid crystal display device 100J includes a liquid crystal display unit 100j, a liquid crystal display unit 100j', and biaxial hinge devices 30. The liquid crystal display unit 100j includes a liquid crystal display panel 10, a light-transmissive cover 20J located on the viewer's side with respect to the liquid crystal display panel 10 and housings 80. Similarly, the liquid crystal display unit 100j' includes a liquid crystal display panel 10', a light-transmissive cover 20J' and housings 80'. The light-transmissive cover 20J has a curved portion 28 having a viewer-side surface 28a, a cross-section of which is a curved line defined by an aspherical function. Similarly, the light-transmissive cover 20J' has a curved portion 28' having a viewer-side surface 28a', a cross-section of which is a curved line defined by an aspherical function. The housings 80, the housings 80', and the biaxial hinge devices 30 of the liquid crystal display device 100J have substantially the same structure as that of the housings 80, the housings 80', and the biaxial hinge devices 30 of the liquid crystal display device 100G (FIG. 15). Accordingly, in the liquid crystal display device 100J, like in the liquid crystal display device 100G, the liquid crystal display units 100j and 100j' are opened or closed in the state where a viewer-side surface 82a of a curved housing portion 82 and a viewer-side surface 82a' of a curved housing portion 82' are in contact with each other.

Figure 21:
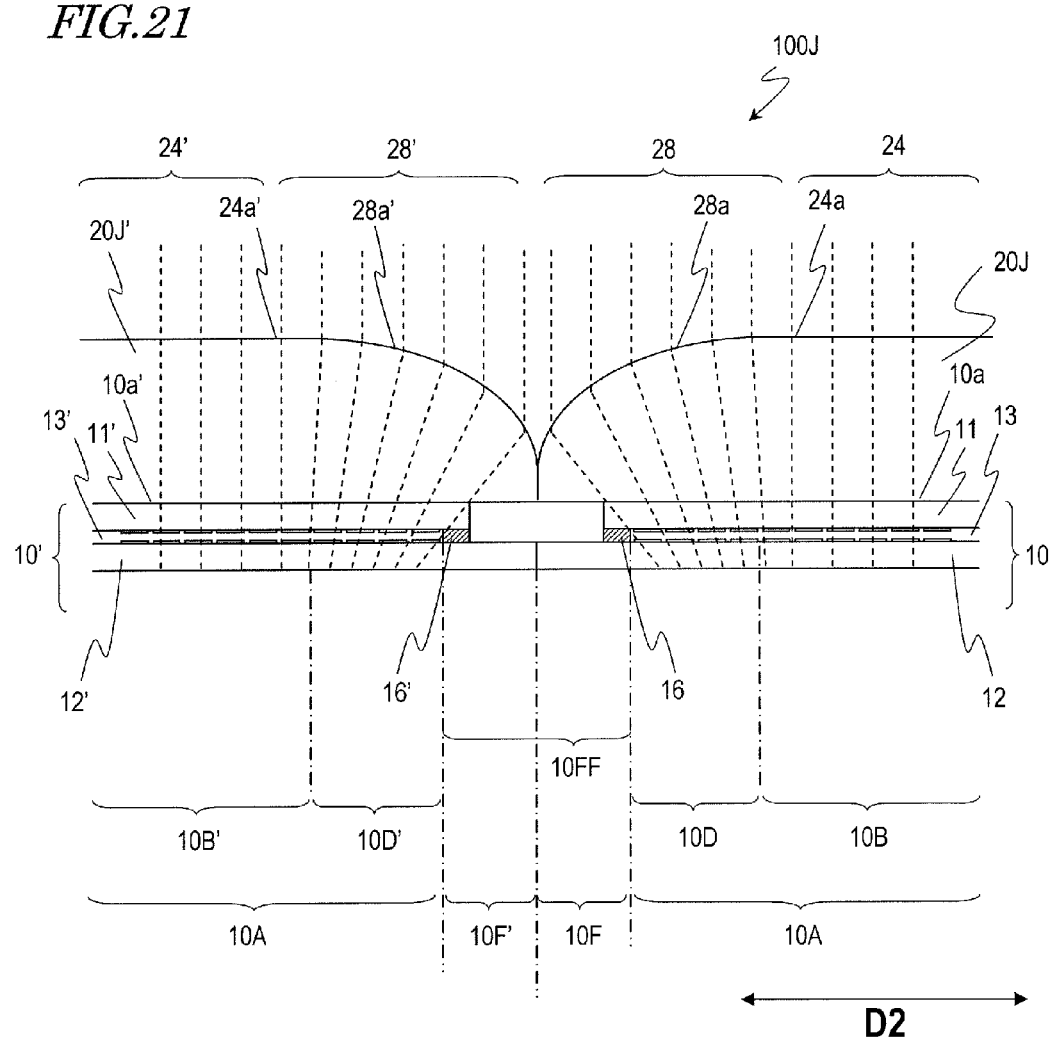
FIG. 21 is a schematic cross-sectional view of the liquid crystal display device 100J.

FIG. 21 is a schematic cross-sectional view of the liquid crystal display device 100J. Hereinafter, with reference to FIG. 21, it will be described that the liquid crystal display device 100J can display an undistorted image. In FIG. 21, the housings 80 and the housings 80' are omitted.

As shown in FIG. 21, the liquid crystal display panels 10 and 10' respectively include display regions 10A and 10A' having a plurality of pixels arranged in an array, and frame regions 10F and 10F' provided outer to the display regions 10A and 10A'. A non-display region 10FF which does not contribute to display includes the frame regions 10F and 10F', and also includes a gap therebetween and a section for connecting these regions when the gap and the section are existent. In the display regions 10A and 10A' of the liquid crystal display panels 10 and 10', the plurality of pixels are arranged in a matrix in a first direction (direction perpendicular to the sheet of paper of FIG. 21) and a second direction (represented by D2 in FIG. 21) which is perpendicular to the first direction and parallel to display planes 10a and 10a' of the liquid crystal display panels 10 and 10'. The pixels are arranged at an equal pitch in each of the first direction and the second direction.

The liquid crystal display panel 10 includes a top substrate 11 and a bottom substrate 12, and a liquid crystal layer 13 is provided between the top substrate 11 and the bottom substrate 12. In the top substrate 11, a color filter layer and a counter electrode, for example, are provided. In the bottom substrate 12, transparent electrodes are formed in a matrix, and also TFTs, bus lines, a driving circuit for supplying signals to these elements, for example, are provided. In the frame region 10F of the liquid crystal display panel 10, a sealing section 16 for holding the liquid crystal layer 13 between the top substrate 11 and the bottom substrate 12, a driving circuit for driving the pixels, and the like are included. Similarly to the liquid crystal display panel 10, the liquid crystal display panel 10' includes a top substrate 11', a bottom substrate 12', a liquid crystal layer 13', and a sealing section 16'.

The light-transmissive covers 20J and 20J' respectively include the curved portions 28 and 28' and flat portions 24 and 24'. The flat portions 24 and 24' are respectively located on the viewer's side with respect to central display regions 10B and 10B'. Viewer side surfaces 24a and 24a' of the flat portions 24 and 24' are flat. The curved portion 28 is located so as to stride over a border, between the display region 10A and the frame region 10F of the liquid crystal display panel 10, extending in the first direction. Similarly, the curved portion 28' is located so as to stride over a border, between the display region 10A' and the frame region 10F' of the liquid crystal display panel 10', extending in the first direction. In other words, the curved portion 28 is located on the viewer's side with respect to an area including a part of the frame region 10F and a part of a peripheral display region 10D in the display region 10A, the part adjoining the part of the frame region 10F in the second direction D2. Similarly, the curved portion 28' is located on the viewer's side with respect to an area including a part of the frame region 10F' and a part of a peripheral display region 10D' in the display region 10A', the part adjoining the part of the frame region 10F' in the second direction D2.

In the case where the viewer-side surface 28a of the curved portion 28 has a cross-section which is a curved line defined by an aspherical function described in International Publication WO2009/157150, an undistorted image can be displayed as described below. The entirety of International Publication WO2009/157150 is incorporated herein by reference.

A shape of the viewer-side surface 28a of the curved portion 28, which enables an image, compressed by an image compression rate "a" as compared with an image formed on the central display region 10B, to be formed on the peripheral display region 10D and enables the image formed on the peripheral display region 10D to be enlarged by 1/a times and displayed on the viewer-side surface 28 of the curved portion 28, is found as follows.

As the aspherical function f(x), the following function is used.

$$f(x) = h - cx^2/(1+(1-(1+k)c^2x^2)^{1/2}) + A_4x_4 + A_6x^6 + A_8x^8 + A_{10}x^{10}$$

In the expression,
c: radius of curvature of the curved portion 28 (inverse to the radius of curvature);
h: thickness of the flat portion 24; and
k: conic constant.
x represents the position of each point on the viewer-side surface 28a of the curved portion 28 (position in the second direction D2). The value of x is zero (0) on the central display region 10B side, and increases as becoming closer to the frame region 10F.

For example, where
width W2 of the peripheral display region 10D: 12 mm,
width W1 of the frame region 10F: 3 mm,
image compression rate a: 0.8,
thickness h of the flat portion 24: 13 mm,
radius of curvature (inverse to the curvature c of the curved portion 28; i.e., 1/c): 23 mm, and
refractive index n of the curved portion 28: 1.49 (acrylic resin);
k=1.15,
$A_4 = -7.86 \times 10^{-7}$,
$A_6 = 1.89 \times 10^{-8}$,
$A_8 = -1.62 \times 10^{-10}$, and
$A_{10} = 4.95 \times 10^{-13}$.
The value of k is given by the following expression.

$$k = 89.918a^4 - 194.57a^3 + 159.82a^2 - 57.099a + 7.1865$$

When the image compression rate is small (e.g., a<0.7), the value of 1/a is large and each pixel is greatly enlarged. This may make the black matrix between adjoining pixels conspicuous, often resulting in inferior display. A large image compression rate (e.g., a>0.9) is not very preferable because this requires a curved portion which is large for the width of the frame region. For example, when the image compression rate a=0.95, a=W2/(W1+W2)=0.95. Thus, the width of the curved portion, (W1+W2), is 20 times the width W1 of the frame region. When the width W1 of the frame region is 3 mm as in the above example, the width of the curved portion, i.e., W1+W2, is 60 mm. For example, many of display devices for use in mobile phones have a device width equal to or less than 60 mm, and therefore cannot have a member having a curved portion width (W1+W2) of 60 mm located therein. Accordingly, the image compression rate "a" is preferably about 0.7 to 0.9. Based on the above expression, the values of conic constant k for the image compression rate a=0.7 and 0.9 are calculated to be k≈0.38 and 2.4, respectively. Thus, a preferred range of the conic constant k is 0.38 or larger and 2.4 or less.

The above aspherical function f(x) may be found using the above value of k, and the curved portions 28 and 28' having the viewer-side surfaces 28a and 28' represented by f(x) may be produced. Thus, an undistorted image can be displayed in an area including the peripheral display regions 10D and 10D' and the frame regions 10F and 10F'.

FIG. 21 also schematically shows light rays which are output from the liquid crystal display panels 10 and 10' and incident on the light-transmissive covers 20J and 20J'. The light output from the pixels arranged in the central display regions 10B and 10B' of the liquid crystal display panels 10 and 10' is incident on the flat portions 24 and 24', proceeds straight in a direction perpendicular to the display planes 10a and 10a' of the liquid crystal display panels 10 and 10' through the flat portions 24 and 24', is output toward the viewer's side, and proceeds in a direction perpendicular to the display planes 10a and 10a'. Therefore, on the viewer's side of the flat portions 24 and 24', an image formed on the central display regions 10B and 10B' is displayed. Light output from the pixels arranged in the peripheral display regions 10D and 10D' is incident on the curved portions 28 and 28', is refracted outward (toward the border with the liquid crystal display panels 10 and 10') to be output toward the viewer's side, and proceeds in a direction perpendicular to the display planes 10a and 10a'. Thus, the light output from the peripheral display regions 10D and 10D' of the liquid crystal display panels 10 and 10' is refracted, and therefore an image is displayed on front surfaces of the frame regions 10F and 10F'.

The cross-sectional shape of each of the viewer-side surfaces 28a and 28a' of the curved portions 28 and 28' is a curved line defined by the above-described aspherical function f(x). Accordingly, images formed on the peripheral display region 10D can be displayed on the viewer's side of the curved portions 28 and 28' as being enlarged by 1/a times, and an undistorted image can be displayed on the viewer's side of the curved portion 28. As described above, on the viewer's side of the flat portions 24 and 24', images formed on the central display regions 10B and 10B' are displayed. On the peripheral display regions 10D and 10D', images compressed by the image compression rate "a" as compared with images formed on the central display regions 10B and 10B' are formed, and the images formed on the peripheral display regions 10D and 10D' are displayed on the viewer-side surfaces 28a and 28a' of the curved portions 28 and 28' as being enlarged by 1/a times. Thus, an undistorted image can be displayed on the viewer's side of the flat portions 24 and 24' and the curved portions 28 and 28'. Namely, an undistorted image can be displayed on the entire display plane of the liquid crystal display device 100J.

As shown in FIG. 20, also in the liquid crystal display device 100J, the distance between the viewer-side surface 82a of the curved housing portion 82 of the housing 80 and a first central axis C1 is longer than the distance between the viewer-side surface 28a of the curved portion 28 of the light-transmissive cover 20 and the first central axis C1. A difference between the distance from the viewer-side surface 82a to the first central axis C1 and the viewer-side surface 28a to the first central axis C1 (represented by "d" in FIG. 20) is preferably 0.05 mm or greater and 0.5 mm or less, like $dr_1$ (FIG. 16(b)) of the liquid crystal display device 100G.

The present invention is also applicable to a touch-panel type display device. As the touch panel, any known touch panel of an electrostatic capacitance system, a resistance film system, an electromagnetic coupling system, an infrared system, an ultrasonic system or the like is usable. Hereinafter, an embodiment of a display device including a touch panel of an electrostatic capacitance system will be described. FIG. 22(a) is a schematic cross-sectional view of a folding type liquid crystal display device 300A including a touch panel of an electrostatic capacitance system will be described.

As shown in FIG. 22(a), the liquid crystal display device 300A includes a liquid crystal display unit 300a, a liquid crystal display unit 300a', and biaxial hinge devices (not shown). The liquid crystal display unit 300a is located to be rotatable around a first rotation axis L1, and the liquid crystal display unit 300a' is located to be rotatable around a second rotation axis L2. The liquid crystal display unit 300a includes a liquid crystal display panel 10, a touch panel 310 located on the viewer's side with respect to the liquid crystal display panel 10, a light-transmissive cover 90 located on the viewer's side with respect to the touch panel 310, an optical film section 62 located between the liquid crystal display panel 10 and the touch panel 310, and a backlight device 40. Similarly, the liquid crystal display unit 300a' includes a liquid crystal display panel 10', a touch panel 310', a light-transmissive cover 90', an optical film section 62', and a backlight device 40'.

The touch panel 310 includes a top transparent electrode 311, a bottom transparent electrode 312, and a resin substrate 313 located between the top transparent electrode 311 and the bottom transparent electrode 312. The light-transmissive cover 90 includes a curved portion 92 and a flat portion 94. A viewer-side surface 92a of the curved part 92 is a part of a cylindrical curved surface centered around a first central axis C1. The touch panel 310 has an end surface 310a, which is a part of a cylindrical curved surface centered around the first central axis C1. The end surface 310a is an end surface, among end surfaces of the touch panel 310, which is on the side of the border between the liquid crystal display unit 300a and the liquid crystal display unit 300a'. The viewer-side surface 92a of the curved portion 92 and the end surface 310a of the touch panel 310 are formed so as to form a continuous cylindrical curved surface as shown in FIG. 22(a). Similarly, in the liquid crystal display unit 300a', a viewer-side surface 92a' of the curved part 92' of the light-transmissive cover 90' is a part of a cylindrical curved surface centered around a second central axis C2. An end surface 310a' of the touch panel 310' is a part of a cylindrical curved surface centered around the second central axis C2. The viewer-side surface 92a' of the curved portion 92' and the end surface 310a' of the touch panel 310' are formed so as to form a continuous cylindrical curved surface. The liquid crystal display unit 300a is located such that the first rotation axis L1 of the biaxial hinge devices matches the first central axis C1. Similarly, the liquid crystal display unit 300a' is located such that the second rotation axis L2 matches the second central axis C2. Accordingly, like the liquid crystal display device 100A, the liquid crystal display device 300A is opened or closed in the state where the viewer-side surface 92a of the curved portion 92 and the viewer-side surface 92a' of the curved portion 92' are in contact with each other, or in the state where the end surface 310a of the touch panel 310 and the end surface 310a' of the touch panel 310' are in contact with each other. Therefore, the folding type liquid crystal display device 300A with the touch panel can decrease the non-display area in an intermediate state between the open state and the closed state.

When the top transparent electrode 311 of the touch panel 310 and the top transparent electrode 311' of the touch panel 310' contact each other, or when the bottom transparent electrode 312 and the bottom transparent electrode 312' contact each other, in an intermediate state between the open state and the closed state, an operational error may occur. In order to avoid an operational error, it is preferable to form an insulating layer (not shown) such as a resin layer or the like to a thickness of, for example, 1 to 50 μm on at least one of the end surface 310a of the touch panel 310 and the end surface 310a' of the touch panel 310'. The insulating layer may also act as a hardcoat layer for preventing rubbing or scratching at the time of opening or closing. The insulating layer also acting as a hardcoat layer may be formed also on the viewer-side surface 92a of the curved portion 92 of the light-transmissive cover 90 or on the viewer-side surface 92a' of the curved portion 92' of the light-transmissive cover 90'. With such a structure, the viewer-side surfaces 92a and 92a' can be protected against rubbing or scratching.

In the case where the light-transmissive cover 90 is thick, the sensitivity of the touch panel may be lowered. Therefore, it is preferable that the light-transmissive cover 90 is as thin as possible. For example, in the case where the light-transmissive cover 90 is formed of an acrylic resin, the thickness thereof is preferably 2 mm or less.

In the liquid crystal display device 300A shown in FIG. 22(*a*), the curved portion 92 of the light-transmissive cover 90 is located on the viewer's side with respect to a part of the frame region 10F of the liquid crystal display panel 10. As in a liquid crystal display device 300B shown in FIG. 22(*b*), a curved portion 96 of a light-transmissive cover 90b of a liquid crystal display unit 300b may be located on the viewer's side with respect to an area including a part of a frame region 10F and a peripheral display region 10D. In FIG. 22(*b*), like the curved portion 96, a curved portion 96' of a light-transmissive cover 90b' of a liquid crystal display unit 300b' is also located on the viewer's side with respect to an area including a part of a frame region 10F' and a peripheral display region 10D'. The liquid crystal display device 100B can obscure a non-display region 10FF in substantially the same manner as the liquid crystal display device 100B described above with reference to FIG. 7 and FIG. 8.

In the liquid crystal display unit 300b of the liquid crystal display device 300B, light output from the peripheral display region 10D is refracted by a viewer-side surface 96a of the curved portion 96 and an end surface 310a of a touch panel 310 and output toward the viewer's side. Accordingly, a part of an image formed on the peripheral display region 10D is displayed on the viewer-side surface 96a of the curved portion 96 as being enlarged. The remaining part of the image formed on the peripheral display region 10D is displayed on the end surface 310a of the touch panel 310 as being enlarged. Therefore, in the case where the positioning precision of the light-transmissive cover 90b is low in a production process of the liquid crystal display device 300B, defective display may occur as described below.

When the positioning precision of the light-transmissive cover 90b is low in the production process of the liquid crystal display device 300B, the following may occur. For example, as in a liquid crystal display device 400A shown in FIG. 23(*a*), an end side 96d (line of intersection of the viewer-side surface 96a and a rear-side surface 96c) of the curved portion 96 protrudes outward from an end surface 310a of a touch panel 310. This forms a step between the viewer-side surface 96a of the curved portion 96 and the end surface 310a of the touch panel 310. At the end side 96d and in the vicinity thereof, an image displayed on the end surface 310a of the touch panel 310 and an image displayed on viewer-side surface 96a of the curved portion 96 are observed as being discontinuous, resulting in defective display.

In the liquid crystal display device 300B, the top transparent electrode 311 and the top transparent electrode 311' may contact each other at the time of opening or closing. In order to avoid this, a liquid crystal display device 400B shown in FIG. 23(*b*) includes an insulating layer 91 for covering an exposed portion of the top transparent electrode 311. In this case, a part of light output from the pixels in a peripheral display region 10D is incident on the insulating layer 91, refracted by a surface thereof, and output toward the viewer's side. Therefore, an image on the insulating layer 91 is distorted, resulting in defective display.

A liquid crystal display device 300C shown in FIG. 24 has a structure in which a concaved portion 99 is formed in a part of a light-transmissive cover 90c on the side of a display panel 10 so that a touch panel 360 is located between a viewer-side surface (display plane) of the liquid crystal display panel 10 and the concaved portion 99. With such a structure, the defective display which may occur in the liquid crystal display device 400A does not occur. The liquid crystal display device 300C does not allow a top transparent electrode 361 and a top transparent electrode 361' to contact each other, and therefore prevents an operational error. Thus, the defective display which may occur in the liquid crystal display device 400B does not occur.

As shown in FIG. 24, the light-transmissive cover 90c of a liquid crystal display unit 300c of the liquid crystal display device 300C includes the concaved portion 99 which is defined by a flat portion 94 and a curved portion 97. The touch panel 360 is located between the viewer-side surface 10a of the liquid crystal display panel 10 and the concaved portion 99. The liquid crystal display unit 300c further includes an optical film section 62, and the touch panel 360 is bonded to the light-transmissive cover 90c and the optical film section 62 with an adhesive layer 316.

The curved portion 97 has a rear-side surface (surface on the liquid crystal display panel 10 side) parallel to a surface of the optical film section 62 and a side surface 97b formed between the rear-side surface 97c and a rear-side surface 94c of the flat portion 94. As shown in FIG. 24, the concaved portion 99 is defined by the rear-side surface 94c of the flat portion 94 and the side surface 97b of the curved portion 97. The rear-side surface 97c of the curved portion 97 is a plane parallel to a viewer-side surface 94a and the rear-side surface 94c of the flat portion 94, and the side surface 97b is, for example, a plane perpendicular to the rear-side surface 97c as shown in FIG. 24. The touch panel 360 is bonded to the rear-side surface 94c of the flat portion 94, the side surface 97b of the curved portion 97 and a viewer-side surface of the optical film section 62 with an adhesive layer 316 as shown in FIG. 24.

Like the liquid crystal display unit 300c, a liquid crystal display unit 300c' includes a light-transmissive cover 90c' having a concaved portion 99' formed on the liquid crystal display panel 10' side. A touch panel 360' is located between the concaved portion 99', defined by a rear-side surface 94c' of a flat portion 94' and a side surface 97b' of a curved portion 97', and a viewer-side surface (display plane) 10a' of the liquid crystal display panel 10'.

In the liquid crystal display unit 300c of the liquid crystal display device 300C, the touch panel 360 is located between the concaved portion 99 of the light-transmissive cover 90 and the viewer-side surface 10a of the liquid crystal display panel 10. Therefore, the liquid crystal display device 300C does not have a step as included in the liquid crystal display device 400A (FIG. 23(*a*)) (step between the viewer-side surface 96a of the curved portion 96 and the end surface 310a of the touch panel 310 shown in FIG. 23(*a*)). Accordingly, the defective display which may occur in the liquid crystal display device 400A does not occur.

The liquid crystal display device 300C is opened or closed in the state where the viewer-side surface 97a of the curved portion 97 and a viewer-side surface 97a' of the curved portion 97' are in contact with each other. Accordingly, the transparent electrode 361 of the touch panel 360 and the transparent electrode 361' of the touch panel 360' do not contact each other at the time of opening or closing. Therefore, an operational error due to the contact between the transparent electrode 361 and the transparent electrode 361' does not occur. In addition, it is not necessary to provide an insulating layer for preventing contact between the transparent electrode 361 and the transparent electrode 361'. Accordingly, the defective display which may occur in the liquid crystal display device 400B (FIG. 23(b)) does not occur.

The liquid crystal display device 300C also has an advantage of being opened or closed more smoothly than the liquid crystal display devices 400A and 400B. In the liquid crystal display device 400A (FIG. 23(a)), the end side 96d of the curved portion 96 protrudes. Therefore, the viewer-side surface 96a of the curved portion 96 and the end surface 310a of the touch panel 310 do not form a continuous cylindrical curved surface. For this reason, the liquid crystal display device 400A may occasionally not be opened or closed smoothly. Also in the liquid crystal display device 400B (FIG. 23(b)), the insulating layer 91 protrudes from the cylindrical curved surface formed of the viewer-side surface 96a of the curved portion 96 and the end surface 310a of the touch panel 310. Therefore, like the liquid crystal display device 400A, the liquid crystal display device 400B may occasionally not be opened or closed smoothly. The liquid crystal display device 300C does not have a portion protruding from the cylindrical curved surface unlike the liquid crystal display devices 400A and 400B, and therefore can be opened or closed more smoothly than the liquid crystal display devices 400A and 400B.

In the liquid crystal display device 400A, the shape of the light-transmissive cover 90b can be adjusted by, for example, polishing so that the viewer-side surface 96a of the curved portion 96 and the end surface 310a of the touch panel 310 form a continuous cylindrical curved surface. However, this raises the cost. The liquid crystal display device 300C does not need such polishing.

In the liquid crystal display unit 300c, an end surface 360a of the touch panel 360 is inner to a side surface of the liquid crystal display unit 300c (side surface on the side of the border between the liquid crystal display unit 300c and the liquid crystal display unit 300c'). Therefore, as shown in FIG. 24, the liquid crystal display unit 300c includes a region 30n in which the touch panel does not react. It is preferable that a width (width in a direction perpendicular to the border between the liquid crystal display unit 300c and the liquid crystal display unit 300c') of the region 30n is designed to be, for example, 5 mm or less. Similarly, the liquid crystal display unit 300c' includes a region 30n' in which the touch panel does not react. It is also preferable that a width of the region 30n' 5 mm or less.

The light-transmissive covers 90c and 90c' can be mass-produced easily at low cost by, for example, injection molding. As a material of the light-transmissive covers 90c and 90c', for example, a polycarbonate resin or an acrylic resin is usable. Glass is also usable.

Preferably, the adhesive layers 316 and 316' of the liquid crystal display units 300c and 300c' have a refractive index which is approximately equal to that of members bonded together by the adhesive layers 316 and 316' (e.g., light-transmissive covers 90c and 90c'). The light-transmissive covers 90c and 90c' are formed of, for example, a material having a refractive index close to 1.5 (e.g., an acrylic resin, a polycarbonate resin or glass). Therefore, the refractive index of the adhesive layers 316 and 316' is preferably close to 1.5. In this case, the reflectance at an interface between the adhesive layers 316 and 316' and other members can be reduced. As a result, for example, the luminance or contrast ratio is raised, and the display performance is improved. However, in the case where a high display performance is not needed, the adhesive layers 316 and 316' may be partially air layers.

Figure 27:
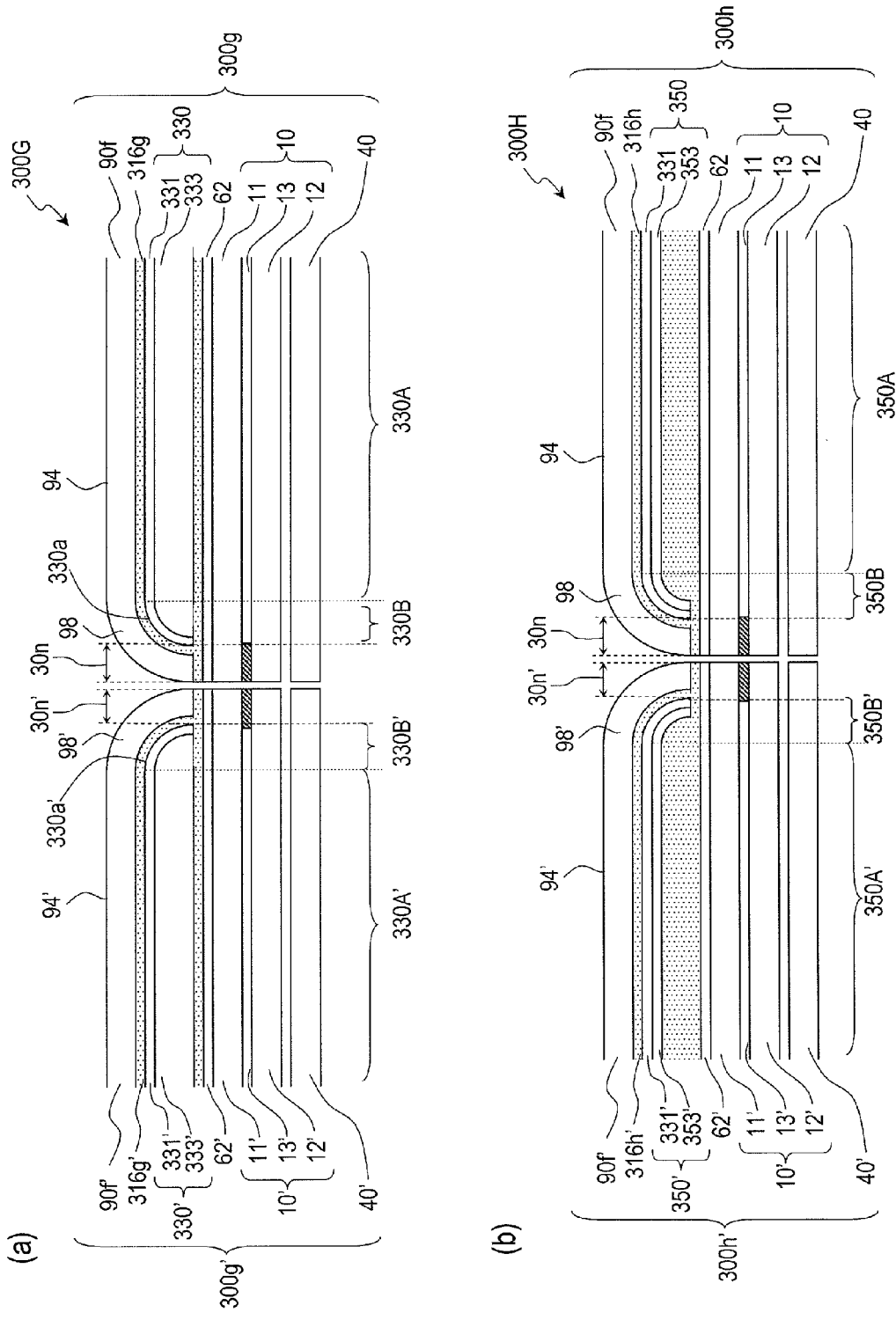

The touch panel 360 shown in FIG. 24 includes a resin substrate 363 and the transparent electrode 361 formed on the resin substrate 363. On a rear surface of the resin substrate 363, no transparent electrode is formed. As is well known, when a touch panel is located on a display panel, a fluctuation of the signal voltage generated in the display panel may occasionally act as noise against a signal for position detection. In the touch panels 310 and 310' shown in FIGS. 22(a) and (b), the bottom transparent electrodes 312 and 312' act as, for example, shielding layers for reducing noise from the liquid crystal display panels 10 and 10'. In the case where, for example, the top transparent electrodes 311 and 311' are located sufficiently far from the liquid crystal display panels 10 and 10', the bottom transparent electrodes 312 and 312' may be omitted (see, for example, International Publication WO2006/043660). FIG. 26, FIG. 27 and FIG. 29 each show a liquid crystal display device using a touch panel which does not include a bottom transparent electrode.

FIG. 25(a) shows a liquid crystal display device 300D including liquid crystal display units 300d and 300d'. As in the liquid crystal display units 300d and 300d', transparent electrodes 321 and 321' for detecting the position of a contact point may be formed on rear-side surfaces 94c and 94c' of flat portions 94 and 94' of light-transmissive covers 90c and 90c'. As shown in FIG. 25(a), rear-side surfaces 97c and 97c' of curved portions 97 and 97' of the light-transmissive covers 90c and 90c' and the transparent electrodes 321 and 321' are bonded to surfaces of the optical film sections 62 and 62' with adhesive layers 316d and 316d'.

For producing the liquid crystal display device 300D, members integrally including the light-transmissive covers 90c and 90c' and the transparent electrodes 321 and 321' are bonded to the optical film sections 62 and 62' with the adhesive layers 316d and 316d'. By contrast, for producing the liquid crystal display device 300C (FIG. 24), the light-transmissive covers 90 and 90' and the touch panels 360 and 360' need to be fixed to the optical film sections 62 and 62'. Thus, the liquid crystal display device 300D has an advantage that the number of members required for the assembling process is smaller than for the liquid crystal display device 300C.

The liquid crystal display device 300D has an advantage that the regions 30n and 30n' in which the touch panel does not react are smaller, as compared with the liquid crystal display device 300C shown in FIG. 24. A reason for this is that in the liquid crystal display device 300C (FIG. 24), adhesive layers are existent between the side surfaces 97b and 97b' of the curved portions 97 and 97' and the touch panels 360 and 360', whereas the liquid crystal display device 300D shown in FIG. 25(a) does not include adhesive layers located at such positions.

Like the liquid crystal display device 300C, the liquid crystal display device 300D does not allow the transparent electrodes 321 and 321' to contact each other, and therefore can prevent an operational error. In the liquid crystal display device 300D, the defective display which may occur in the liquid crystal display device 400A (FIG. 23(a)) and the liquid crystal display device 400B (FIG. 23(b)) does not occur.

In the liquid crystal display device 300D also, when the transparent electrodes 321 and 321' receive noise, the precision of detecting the position of a contact point is reduced. As shown in FIG. 25(a), parts of the adhesive layers 316d and 316d' which are between the transparent electrodes 321 and 321' and the optical film sections 62 and 62' may be made relatively thick. With such a structure, the gap between the liquid crystal display panels 10 and 10' and the transparent electrodes 321 and 321' is enlarged. As a result, the influence of the noise from the liquid crystal display panels 10 and 10' can be alleviated.

Preferably, the adhesive layers 316d and 316d' have a refractive index which is set to reduce the reflectance at the interface, like the adhesive layers 316d and 316d' of the liquid crystal display device 300C. The refractive index of the adhesive layers 316d and 316d' is preferably close to 1.5.

As in a liquid crystal display device 300E shown in FIG. 25(b), light-transmissive substrates 323 and 323' may be located between transparent electrodes 321 and 321' and optical film sections 62 and 62'. Liquid crystal display units 300e and 300e' of the liquid crystal display device 300E are formed of, for example, a light-transmissive resin material or glass.

The liquid crystal display device 300E can be produced more easily and with higher precision than the liquid crystal display device 300D (FIG. 25(a)). As shown in FIGS. 25(a) and (b), the liquid crystal display panels 10 and 10' are parallel to the transparent electrodes 321 and 321'. In the liquid crystal display device 300E, the light-transmissive substrates 323 and 323' are located between the liquid crystal display panels 10 and 10' and the transparent electrodes 321 and 321'. Therefore, adhesive layers 316e and 316e' are thinner than the adhesive layers 316d and 316d' of the liquid crystal display device 300D, and thus are not made non-uniform easily. For this reason, in the liquid crystal display device 300E, the liquid crystal display panels 10 and 10' are made parallel to the transparent electrodes 321 and 321' easily.

In the case where the liquid crystal display panel 10 is not parallel to the transparent electrode 321, there occurs a discrepancy in the correspondence between the contact point formed by a finger or a pen on the surface of the light-transmissive cover 90c and the image displayed on the liquid crystal display panel 10. This causes a possibility that a wrong operation is made. For example, when a plurality of icons are displayed on the liquid crystal display panel 10, an icon different from the icon actually selected by the user may possibly be determined as having been selected.

As in a liquid crystal display device 300F shown in FIG. 26, side surfaces 98b and 98b' of curved portions 98 and 98' of liquid crystal display units 300f and 300f' may be curved. For example, as shown in FIG. 26, the side surface 98b of the curved portion 98 of a light-transmissive cover 90f of the liquid crystal display device 300F may be a cylindrical curved surface which is parallel to a viewer-side surface 98a. The side surface 98b of the curved portion 98 is a part of a cylindrical curved surface centered around a first central axis C1 not shown. The viewer-side surface 98a of the curved portion 98 is also a part of a cylindrical curved surface centered around the first central axis C1, but as shown in FIG. 26, the radius of the side surface 98b (distance between the side surface 98b and the first central axis C1) is shorter than the radius of the viewer-side surface 98a. The side surface 98b is a part of a cylindrical curved surface which is centered around the first central axis C1 and has a radius shorter than the radius of the viewer-side surface 98a.

It is preferable that an adhesive layer 316f has a refractive index which is equal to that of the light-transmissive cover 90f. By making the refractive index of the adhesive layer 316f equal to the refractive index of the light-transmissive cover 90f, a portion, of the adhesive layer 316f, which is enclosed by the side surface 98b of the curved portion 98, an end surface 360a of the touch panel 360 and the optical film section 62, and also the curved portion 98, act as a "lens portion". Therefore, an image formed on a peripheral display region 10D can be displayed on the viewer-side surface 98a of the curved portion 98 as being enlarged.

Similarly, in the liquid crystal display unit 300f', the side surface 98b' of the curved portion 98' of the light-transmissive cover 90f' is a part of a cylindrical curved surface centered around a first central axis C2. By making a refractive index of an adhesive layer 316f' equal to a refractive index of the light-transmissive cover 90f', an image formed on a peripheral display region 10D' can be displayed on the viewer-side surface 98a' of the curved portion 98' as being enlarged.

As in a liquid crystal display device 300G shown in FIG. 27(a), touch panels 330 and 330' having curved end surfaces 330a and 330a' may be located between light-transmissive covers 90f and 90f' and liquid crystal display panels 10 and 10'. The touch panel 330 includes a flat region 330A having a flat surface and a curved region 330B having a curved surface. As shown in FIG. 27(a), the touch panel 330 has a structure obtained by providing the curved region 330B on an end of the touch panel 360 of the liquid crystal display device 300F (FIG. 26). In the curved region 330B, a surface of a resin substrate 333 and a surface of a transparent electrode 331 are, for example, parts of cylindrical curved surfaces centered around a first central axis C1 and having different radii, and are parallel to each other. The touch panel 330 includes the resin substrate 333 and the transparent electrode 331 located on the viewer's side with respect to the resin substrate 333, and therefore the end surface 330a of the touch panel 330 is also a surface of the transparent electrode 331 in the curved region 330B. Similarly, the touch panel 330' includes a flat region 330A' and a curved region 330B'. In the curved region 330B', a surface of a resin substrate 333' and a surface of a transparent electrode 331' are, for example, parts of cylindrical curved surfaces centered around a second central axis C2, and are parallel to each other.

As shown in FIG. 27(a), in the liquid crystal display device 300G, the touch panel 330 is located such that the end surface 330a (i.e., surface of the touch panel 330 in the curved region 330B) is existent on the liquid crystal display panel 10 side with respect to the curved portion 98. Therefore, the region 30 can be made narrower than in the liquid crystal display device 300F (FIG. 26). The touch panel 330 of the liquid crystal display device 300G is located closer to a border between liquid crystal display units 300g and 300g' by the curved region 330B than the touch panel 360 of the liquid crystal display device 300F. Accordingly, the liquid crystal display device 300G can make the region 30n narrower by the curved region 330B than the liquid crystal display device 300F. Similarly, a region 30n' can be made narrower.

In the liquid crystal display device 300G shown in FIG. 27(a), the touch panel 330 is located such that the curved region 330B thereof is entirely existent on the liquid crystal display panel 10 side with respect to the curved portion 98. However, as long as at least a part of the curved region 330B is existent on the liquid crystal display panel 10 side with respect to the curved portion 98, the region 30n can be narrowed. Similarly, as long as the touch panel 330' is located such that at least a part of the curved region 330B' is existent on the liquid crystal display panel 10' side with respect to a curved portion 98', the region 30n' can be narrowed.

As in a liquid crystal display device 300H shown in FIG. 27(b), a touch panel 350 including a resin substrate 353 thinner than the resin substrate 333 of the touch panel 330 of the liquid crystal display device 300G (FIG. 27(a)) may be used. As shown in FIG. 27(a), in the liquid crystal display device 300G, the resin substrate 333 of the touch panel 330 of the liquid crystal display unit 300g has a thickness, in the flat region 330A, which is equal to the radius of curvature of the cylindrical curved surface of the curved region 330B. By contrast, in the liquid crystal display device 300H, the resin substrate 353 of the touch panel 350 of a liquid crystal display unit 300h has an equal thickness in a flat region 350A and in a curved region 350B, and the thickness is smaller than the radius of curvature of a surface of the curved region 350B. Similarly, a touch panel 350' of a liquid crystal display unit 300h' includes a resin substrate 353' having an equal thickness in a flat region 350A' and in a curved region 350B', and the thickness is relatively small. The thickness of the resin substrates 353 and 353' is, for example, 100 µm.

As shown in FIG. 27(a), in the liquid crystal display device 300G, an adhesive layer 316g between the touch panel 330 and the optical film section 62 is thinner than an adhesive layer 316h of the liquid crystal display device 300H. Accordingly, the thickness of the adhesive layer 316g is not made non-uniform easily, and therefore the touch panel 330 can be made parallel to the liquid crystal display panel 10 easily. For this reason, the liquid crystal display device 300G can be produced more easily and with higher precision than the liquid crystal display device 300H (FIG. 27(b)).

In a production process of the touch panel 330 (FIG. 27(a)), the transparent electrode 331 is produced by forming an ITO (Indium Tin Oxide) film on the surface of the resin substrate 333 by, for example, sputtering or vapor deposition. The resin substrate 333 is thicker than the resin substrate 353 of the touch panel 350 (FIG. 27(b)), and has an advantage of being easy to handle in a step of forming the transparent electrode 331.

The structures of the liquid crystal display devices 300G and 300H are especially preferable for a large-sized display device (e.g., display device having a diagonal size of 30 inches or longer). A large-sized display device has a large frame region. Therefore, in order to obscure the frame region in the large-size display device, the curved portion needs to be made large. As shown in FIG. 26, in the structure of the liquid crystal display device 300F, the regions 30n and 30n' in which the touch panels 360 and 360' do not react have a width larger than the width of the curved portions 97 and 97'. Therefore, especially when the structure of the liquid crystal display device 300F is applied for a large-sized display device, the regions 30n and 30n' are made wide because the curved portions 97 and 97' are large. As described above, the width of each of the regions 30n and 30n' is preferably 5 mm or less. When the structure of the liquid crystal display device 300F is applied for a large-sized display device, the width of each of the regions 30n and 30n' is likely to exceed 5 mm. By using the touch panels 330 and 330' or 350 and 350' each having a curved end surface as in the liquid crystal display device 300G or 300H, the regions 30n and 30n' can be made narrow. Therefore, the structures of the liquid crystal display device 300G and 300H are especially preferable for a large-sized display device.

FIG. 28(a) shows a liquid crystal display device 300I. As in liquid crystal display units 300i and 300i' of the liquid crystal display device 300I, transparent electrodes 341 and 341' for detecting the position of a contact point may be formed on rear-side surfaces 94c and 94c' of flat portions 94 and 94' of light-transmissive covers 90f and 90f'. As is understood from a comparison of FIGS. 27(a) and (b) against FIG. 28(a), the liquid crystal display device 300G (FIG. 27(a)) includes the adhesive layers between the curved portions 98 and 98' and the touch panels 330 and 330', and the liquid crystal display device 300H (FIG. 27(b)) includes the adhesive layers between the curved portions 98 and 98' and the touch panels 350 and 350'. By contrast, the liquid crystal display device 300I (FIG. 28(a)) does not include adhesive layers located in such positions. Accordingly, the liquid crystal display device 300I can further narrow regions 30n and 30n', in which the touch panels do not react, as compared with the liquid crystal display device 300G (FIG. 27(a)) and the liquid crystal display device 300H (FIG. 27(b)).

As in a liquid crystal display device 300J shown in FIG. 28(b), light-transmissive substrates 343 and 343' may be located between transparent electrodes 341 and 341' and the optical film sections 62 and 62' of the liquid crystal display units 300j and 300j'. In the case where the light-transmissive substrates 343 and 343' are located, adhesive layers 316j and 316j' are thinner than adhesive layers 316i and 316i' of the liquid crystal display device 300I (FIG. 28(a)). Accordingly, the liquid crystal display device 300J allows liquid crystal display panels 10 and 10' to be parallel to the transparent electrodes 341 and 341' more easily than the liquid crystal display device 300I, and has an advantage of being produced more easily and with higher precision. Like the liquid crystal display device 300I, the liquid crystal display device 300J also has an advantage of making regions 30n and 30n' relatively narrow.

Folding type display devices have been described. A structure, as of the liquid crystal display device 300C (FIG. 24), in which a concaved portion is formed on the display panel side with respect to the light-transmissive cover and the touch panel is located between the viewer-side surface of the display panel and the concave portion, is applicable to a display device including a single display panel and a touch panel.

A liquid crystal display device 500 shown in FIG. 29 includes a single liquid crystal display panel 10, a light-transmissive cover 590, and a touch panel 360 located between a viewer-side surface 10a of the liquid crystal display panel 10 and light-transmissive cover 590. The liquid crystal display device 500 is, for example, a rectangular display device, and the light-transmissive cover 590 includes two curved portions 97 extending in two sides parallel to each other. The two curved portions 97 extend in a direction perpendicular to the sheet of paper of FIG. 29. The light-transmissive cover 590 is obtained by modifying the light-transmissive cover 90c of the liquid crystal display device 300C shown in FIG. 24 such that two curved portions 97 adjoin two sides of the flat portion 94 extending parallel to each other. As shown in FIG. 29, the liquid crystal display device 500 further includes an optical film section 62, and the touch panel 360 is bonded to the light-transmissive cover 590 and the optical film section 62 with an adhesive layer 516.

The liquid crystal display device 500 refracts light which is output from pixels in a peripheral display region 10D of the liquid crystal display panel 10 and thus enlarges an image formed on the peripheral display region 10D to cover an area including the peripheral display region 10D and a frame region 10F. In this manner, the liquid crystal display device 500 can obscure the frames along the two sides. Like the liquid crystal display device 300C, the liquid crystal display device 500 has an advantage of not easily causing defective display due to the positioning precision of the light-transmissive cover with respect to the touch panel, which is described with reference to FIG. 23(a).

In the liquid crystal display device 500, a light-transmissive cover including curved portions each having a side surface which is a part of a cylindrical curved surface (i.e., a light-transmissive cover obtained by modifying the light-transmissive cover 90f of the liquid crystal display device 300F shown in FIG. 26 such that two curved portions 98 adjoin two sides of the flat portion 94 extending parallel to each other). For example, a light-transmissive cover including curved portions each having a side surface which is a part of a cylindrical curved surface may be used, and a touch panel having a curved end surface like the touch panel 330 of the liquid crystal display device 300G shown in FIG. 27(a) may be used. In this manner, a region in which the touch panel does not react can be narrowed.

A mobile phone 600 (FIG. 30) including a touch panel having a single display may apply a structure in which a concaved portion is formed on the display panel side with respect to the light-transmissive cover and the touch panel is located between the viewer-side surface of the display panel and the concaved portion. The mobile phone 600 may have a cross-sectional taken along line X-X' which is substantially the same as the cross-sectional structure of the liquid crystal display device 500 shown in FIG. 29. In this manner, a mobile phone with a touch panel which suppresses generation of defective display can be obtained. FIG. 30 shows a region 601 in which an image is displayed. As shown in FIG. 30, the mobile phone 600 displays an image on frames along two sides, of the display plane, extending in a vertical direction, and therefore can obscure the frames along the two sides.

In the examples described with reference to FIGS. 22(b), 24 through 29, the curved portion of the light-transmissive cover is located in an area including the frame region and the peripheral display region of the display panel and acts as a lens portion. A display device in which the curved portion is located on the viewer's side with respect to a part of the frame region, like the liquid crystal display device 300A (FIG. 22(a)), may adopt a structure in which a light-transmissive cover having a concaved portion formed on the display side (e.g., the light-transmissive covers 90c and 90c' of the liquid crystal display device 300C (FIG. 24) or the light-transmissive covers 90f and 90f' of the liquid crystal display device 300F (FIG. 26)) is used. Thus, a structure in which the touch panel is located between the concaved portion and the display panel, or a structure in which a transparent electrode for detecting the position of a contact point is formed on the rear-side surface of the light-transmissive cover can be realized. With such a structure, the liquid crystal display device can be opened or closed relatively smoothly like the liquid crystal display device 300C (FIG. 24). In addition, an operational error caused by contact between the electrodes can be suppressed when the display device is opened or closed.

In the examples described with reference to FIGS. 22(b), 24 through 29, the viewer-side surface of the curved portion of the light-transmissive cover is a part of a cylindrical curved surface. Like in the liquid crystal display device 100J described with reference to FIG. 20, the viewer-side surface of the curved portion may have a cross-section which is a curved line defined by an aspherical function.

As the touch panels 310 and 310' (FIG. 22), 360 and 360' (FIGS. 24, 26 and 29), 330 and 330' (FIG. 27(a)), 350 and 350' (FIG. 27(b)), any known touch panel of an electrostatic capacitance system is usable. Using the touch panel 310 shown in FIG. 22 as an example, an example of a position detecting method performed by the touch panel 310 of an electrostatic capacitance system will be described.

In the touch panel 310 shown in FIG. 22, as described below, for example, when a contact point is formed by a finger or a pen, the position of the contact point is detected based on a change of an electric field caused in the top transparent electrode 311. The top transparent electrode 311 of the touch panel 310 includes, for example, position detecting terminals (not shown) at four corners thereof. AC voltages of the same phase and the same polarity are applied to the terminals, and thus the entirety of the top transparent electrode 311 is supplied with an approximately equal electric field. When a contact point is formed by a finger or a pen on a surface of the light-transmissive cover 90 on the top transparent electrode 311, an electric current flows in the four corners of the top transparent electrode 311. By measuring the current at the four corners, coordinates of the contact point (e.g., a coordinate on the display plane of the display device in a horizontal direction and a vertical direction) are detected. The top transparent electrodes 311 and 311' and the bottom transparent electrodes 312 and 312' are formed of, for example, ITO.

As described above, in the touch panel 310, the bottom transparent electrode 312 acts as a shielding layer for reducing the noise from, for example, the liquid crystal display panel 10. When the touch panel 310 is located on the liquid crystal display panel 10, a fluctuation of the signal voltage generated in the liquid crystal display panel 10 may occasionally act as noise against a signal for position detection. For example, an excited voltage generated in the top transparent electrode 311 due to a common voltage applied to the counter electrode provided in the top substrate 11 of the liquid crystal display panel 10 acts as noise. When the touch panel 310 receives noise, the precision of detecting the position of the contact point is reduced. The bottom transparent electrode 312 acts as a shielding layer and thus can reduce noise. Since noise can be avoided by a method other than providing the shielding layer, the bottom transparent electrode 312 can be omitted as described above. By omitting the bottom transparent electrode 312, an advantage that, for example, the transmittance can be raised as compared with a display device including the touch panel 310 having two transparent electrodes 311 and 312 is obtained.

In the case where the touch panel 310 having the top transparent electrode 311 and the bottom transparent electrode 312 is used, the position of a contact point may be detected by applying a vibration voltage to the bottom transparent electrode 312 and generating an excited voltage in the top transparent electrode 311 (e.g., International Publication WO2003/019346). In this case, the above-mentioned AC voltages for generating an electric field are not applied to the terminals at the four corners of the top transparent electrode 311.

International Publication WO2003/019346 also describes a method for detecting the position of a contact point by using the top transparent electrode and the bottom transparent electrode as position detecting electrodes for two different directions (e.g., the horizontal direction and the vertical direction of the display plane of the liquid crystal display device). For example, the top transparent electrode is usable as an electrode for detecting a Y coordinate (coordinate in the vertical direction). The top transparent electrode does not have terminals at four corners thereof, and includes, for example, a Y coordinate detecting conductive section in each of two areas separate from each other in the vertical direction. By contrast, the bottom transparent electrode is usable as an electrode for detecting an X coordinate (coordinate in the horizontal direction). The bottom transparent electrode includes an X coordinate detecting conductive section in each of two areas separate from each other in the horizontal direction. The X coordinate detecting conductive section and the Y coordinate detecting conductive section are connected to each other by a switching circuit. By switching the switching circuit, an AC voltage is selectively applied to either one of the X coordinate detecting conductive section and the Y coordinate detecting conductive section to form an electric field in one of the electrodes. Thus, the coordinate in the corresponding direction is detected.

Figure 25:
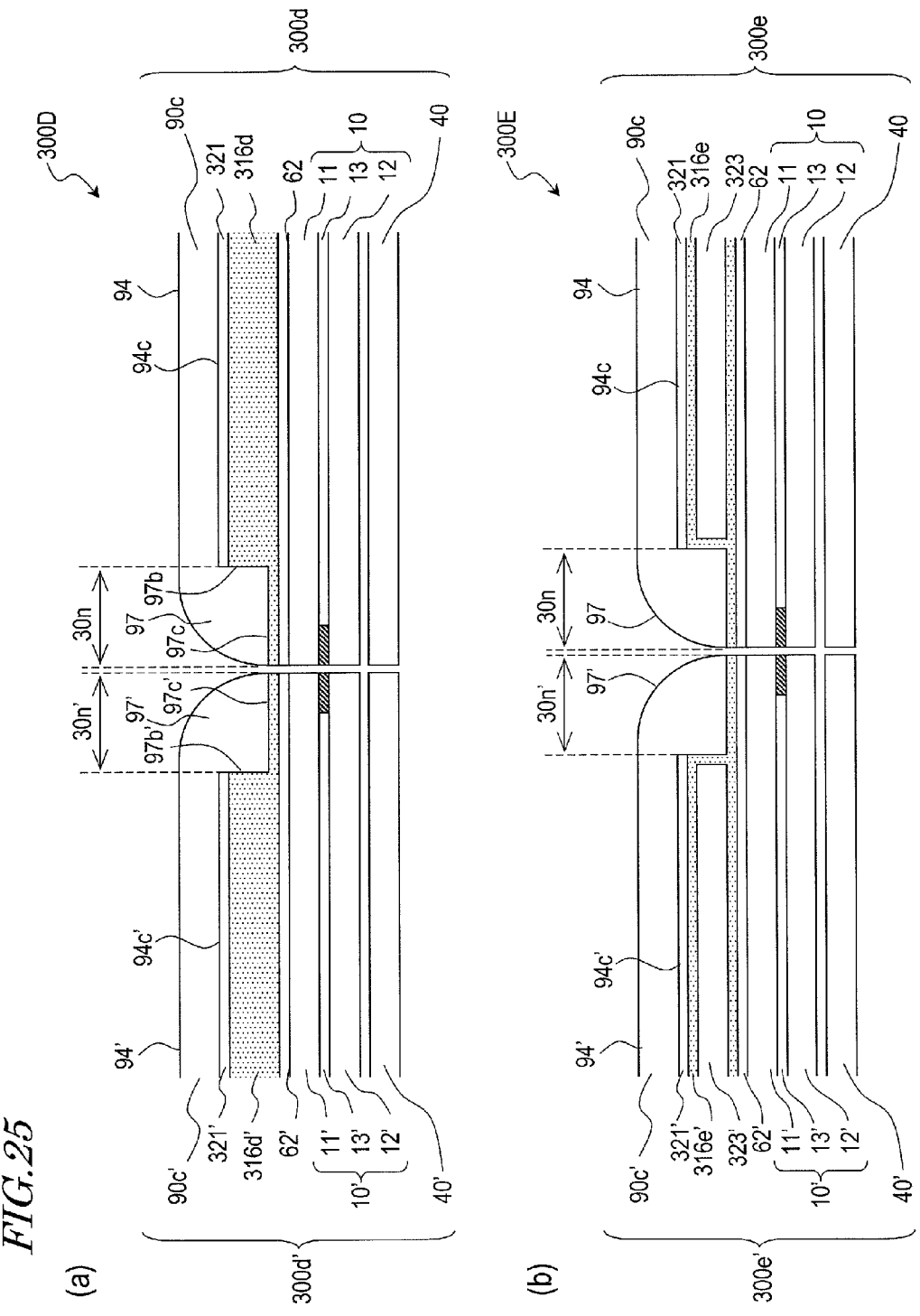

In the liquid crystal display device 300D (FIG. 25(a)) and the liquid crystal display device 300E (FIG. 25(b)), the transparent electrode 321 for detecting the position of a contact point is formed on the rear-side surface 94c of the flat portion 94 of the light-transmissive cover 90c. For example, terminals for applying an AC voltage to the transparent electrode 321 may be provided at four corners of the transparent electrode 321, and also a position detection circuit may be provided for connecting the four terminals. With such a structure, the transparent 321, the terminals and the like act as a touch panel. Similarly, in the transparent electrode 321', terminals and a position detecting circuit may be provided, so that the transparent electrode 321', the terminals and the like act as a touch panel. The same is true with the transparent electrodes 341 and 341' of the liquid crystal display device 300I (FIG. 28(a)) and the liquid crystal display device 300J (FIG. 28(b)). The transparent electrodes 321 and 321' (FIG. 25) and the transparent electrodes 341 and 341' (FIG. 28) are formed of, for example, ITO.

In the above examples, folding type display devices including two display panels coupled to each other so as to be foldable are described. The present invention is applicable to a display device including three or more display panels. A folding type display device according to the present invention is also usable for an electronic book or a mobile game machine. A display device according to the present invention is usable as a display device including a large screen and having a high level of portability, and uses thereof are not limited to a display device with a touch panel, an electronic book or a game machine.

INDUSTRIAL APPLICABILITY

The present invention is preferably usable as a display device for displaying information.

REFERENCE SIGNS LIST 10, 10' Liquid crystal display panel
10A, 10A' Display region
10B, 10B' Central display region
10D, 10D' Peripheral display region
10F, 10F' Frame region
10b, 10b' Side surface of a liquid crystal display panel
11, 11' Top substrate
12, 12' Bottom substrate
13, 13' Liquid crystal layer
16, 16' Sealing portion
20, 20' Light-transmissive cover
22, 22' Curved portion
24, 24' Flat portion
30 Biaxial hinge device
40, 40' Backlight device
62, 62' Optical film section
100A Liquid crystal display device
100a, 100a' Liquid crystal display unit
L1 First rotation axis
L2 Second rotation axis
C1 First central axis
C2 Second central axis

The invention claimed is:
1. A display device of a folding type, comprising:
a first display unit including a first display panel and a first light-transmissive cover located on a viewer's side with respect to the first display panel;
a second display unit including a second display panel and a second light-transmissive cover located on the viewer's side with respect to the second display panel; and
a biaxial hinge device for coupling the first display unit and the second display unit such that the first display unit is rotatable around a first rotation axis and such that the second display unit is rotatable around a second rotation axis parallel to the first rotation axis;
wherein:
the first light-transmissive cover includes a first flat portion and a first curved portion provided outer to the first flat portion;
the second light-transmissive cover includes a second flat portion and a second curved portion provided outer to the second flat portion;
a viewer-side surface of the first flat portion is flat, and a viewer-side surface of the first curved portion is a part of a cylindrical curved surface centered around a first central axis;
a viewer-side surface of the second flat portion is flat, and a viewer-side surface of the second curved portion is a part of a cylindrical curved surface centered around a second central axis;
the first rotation axis of the biaxial hinge device matches the first central axis of the first light-transmissive cover;
the second rotation axis of the biaxial hinge device matches the second central axis of the second light-transmissive cover;
wherein the first display unit further includes a first flat housing portion having a flat viewer-side surface and a first curved housing portion having a viewer-side surface which is a part of a cylindrical curved surface centered around the first central axis;
the second display unit further includes a second flat housing portion having a flat viewer-side surface and a second curved housing portion having a viewer-side surface which is a part of a cylindrical curved surface centered around the second central axis;
the first flat housing portion is located so as to adjoin the first flat portion of the first light-transmissive cover;
the second flat housing portion is located so as to adjoin the second flat portion of the second light-transmissive cover;
the first curved housing portion is located so as to adjoin the first curved portion of the first light-transmissive cover;
the second curved housing portion is located so as to adjoin the second curved portion of the second light-transmissive cover;
a distance between the viewer-side surface of the first curved housing portion and the first central axis is longer than a distance between the viewer-side surface of the first curved portion and the first central axis; and
a distance between the viewer-side surface of the second curved housing portion and the second central axis is longer than a distance between the viewer-side surface of the second curved portion and the second central axis.
2. The display device of claim 1, wherein:
when the first display unit and the second display unit are opened or closed, the viewer-side surface of the first curved portion and the viewer-side surface of the second curved portion contact each other, and the first display unit and the second display unit rotate in opposite directions to each other so as to fulfill the relationship that an angle at which the first display unit rotates around the first rotation axis and an angle at which the second display unit rotates around the second rotation axis are equal to each other.
3. The display device of claim 1, wherein:
the first display panel includes a first display region and a first frame region provided outer to the first display region;
the second display panel includes a second display region and a second frame region provided outer to the second display region;

the first curved portion causes a part of light output from a first peripheral region, in the first display region, which adjoins the first frame region, to be refracted toward the first frame region; and the second curved portion causes a part of light output from a second peripheral region, in the second display region, which adjoins the second frame region, to be refracted toward the second frame region.

4. The display device of claim 2, wherein:

the first display unit further includes a first light-transmissive housing located on a side surface, of the first display panel, which extends parallel to the first central axis;

the second display unit further includes a second light-transmissive housing located on a side surface, of the second display panel, which extends parallel to the second central axis;

the first light-transmissive housing is located such that an end side of the first curved portion of the first light-transmissive cover is existent on the viewer's side with respect to an end surface of the first light-transmissive housing;

the second light-transmissive housing is located such that an end side of the second curved portion of the second light-transmissive cover is existent on the viewer's side with respect to an end surface of the second light-transmissive housing;

the first light-transmissive housing and the first light-transmissive cover are integrally formed;

the second light-transmissive housing and the second light-transmissive cover are integrally formed;

toward the viewer's side with respect to the first light-transmissive housing, a part of the light output from the first peripheral display region of the first display panel is output; and toward the viewer's side with respect to the second light-transmissive housing, a part of the light output from the second peripheral display region of the second display panel is output.

5. The display device of claim 4, wherein:

the end surface of the first light-transmissive housing is formed such that a distance between the end surface of the first light-transmissive housing and the side surface of the first display panel is increased toward a rear side from the viewer's side; and the end surface of the second light-transmissive housing is formed such that a distance between the end surface of the second light-transmissive housing and the side surface of the second display panel is increased toward the rear side from the viewer's side.

6. The display device of claim 1, wherein:

the viewer-side surface of the first curved housing portion has a first convexed-concaved structure; and the viewer-side surface of the second curved housing portion has a second convexed-concaved structure engageable with the first convexed-concaved structure.

7. The display device of claim 1, wherein:

the first display unit further includes a first touch panel; and the second display unit further includes a second touch panel.

8. The display device of claim 7, wherein:

the first light-transmissive cover has a first concaved portion on the side of the first display panel;

the second light-transmissive cover has a second concaved portion on the side of the second display panel;

the first touch panel is located between the first concaved portion and a viewer-side surface of the first display panel; and the second touch panel is located between the second concaved portion and a viewer-side surface of the second display panel.

9. The display device of claim 7, wherein:

the first touch panel has an end surface which is a part of a cylindrical curved surface centered around the first central axis; and the second touch panel has an end surface which is a part of a cylindrical curved surface centered around the second central axis.

10. The display device of claim 7, wherein:

the first touch panel includes a first transparent electrode;

the second touch panel includes a second transparent electrode;

the first transparent electrode is formed on a surface of the first light-transmissive cover, the surface being on the side of the first display panel; and the second transparent electrode is formed on a surface of the second light-transmissive cover, the surface being on the side of the second display panel.

11. A display device of a folding type, comprising:

a first display unit including a first display panel, a first light-transmissive cover located on a viewer's side with respect to the first display panel, and a first housing;

a second display unit including a second display panel, a second light-transmissive cover located on the viewer's side with respect to the second display panel, and a second housing; and a biaxial hinge device for coupling the first display unit and the second display unit such that the first display unit is rotatable around a first rotation axis and such that the second display unit is rotatable around a second rotation axis parallel to the first rotation axis;

wherein:

the first housing includes a first flat housing portion having a flat viewer-side surface and a first curved housing portion having a viewer-side surface which is a part of a cylindrical curved surface centered around a first central axis;

the second housing includes a second flat housing portion having a flat viewer-side surface and a second curved housing portion having a viewer-side surface which is a part of a cylindrical curved surface centered around a second central axis;

the first light-transmissive cover includes a first flat portion having a flat viewer-side surface and a first curved portion having a viewer-side surface, of which a cross-section perpendicular to the first central axis is a curved line defined by an aspherical function;

the second light-transmissive cover includes a second flat portion having a flat viewer-side surface and a second curved portion having a viewer-side surface, of which a cross-section perpendicular to the second central axis is a curved line defined by an aspherical function;

the first rotation axis of the biaxial hinge device matches the first central axis of the first housing;

the second rotation axis of the biaxial hinge device matches the second central axis of the second housing;

the first light-transmissive cover is located such that the first curved portion adjoins the first curved housing portion and such that the first flat portion adjoins the first flat housing portion; and the second light-transmissive cover is located such that the second curved portion adjoins the second curved housing portion and such that the second flat portion adjoins the second flat housing portion.

12. The display device of claim 11, wherein:
the first display unit further includes a first touch panel; and
the second display unit further includes a second touch panel.

13. The display device of claim 12, wherein:
the first light-transmissive cover has a first concaved portion on the side of the first display panel;
the second light-transmissive cover has a second concaved portion on the side of the second display panel;
the first touch panel is located between the first concaved portion and a viewer-side surface of the first display panel; and
the second touch panel is located between the second concaved portion and a viewer-side surface of the second display panel.

14. The display device of claim 12, wherein:
the first touch panel has an end surface which is a part of a cylindrical curved surface centered around the first central axis; and
the second touch panel has an end surface which is a part of a cylindrical curved surface centered around the second central axis.

15. The display device of claim 12, wherein:
the first touch panel includes a first transparent electrode;
the second touch panel includes a second transparent electrode;
the first transparent electrode is formed on a surface of the first light-transmissive cover, the surface being on the side of the first display panel; and
the second transparent electrode is formed on a surface of the second light-transmissive cover, the surface being on the side of the second display panel.

* * * * *